May 30, 1933.      A. M. ROBINSON      1,911,207
AUTOMATIC VENDING MACHINE
Filed July 14, 1928      39 Sheets-Sheet 1
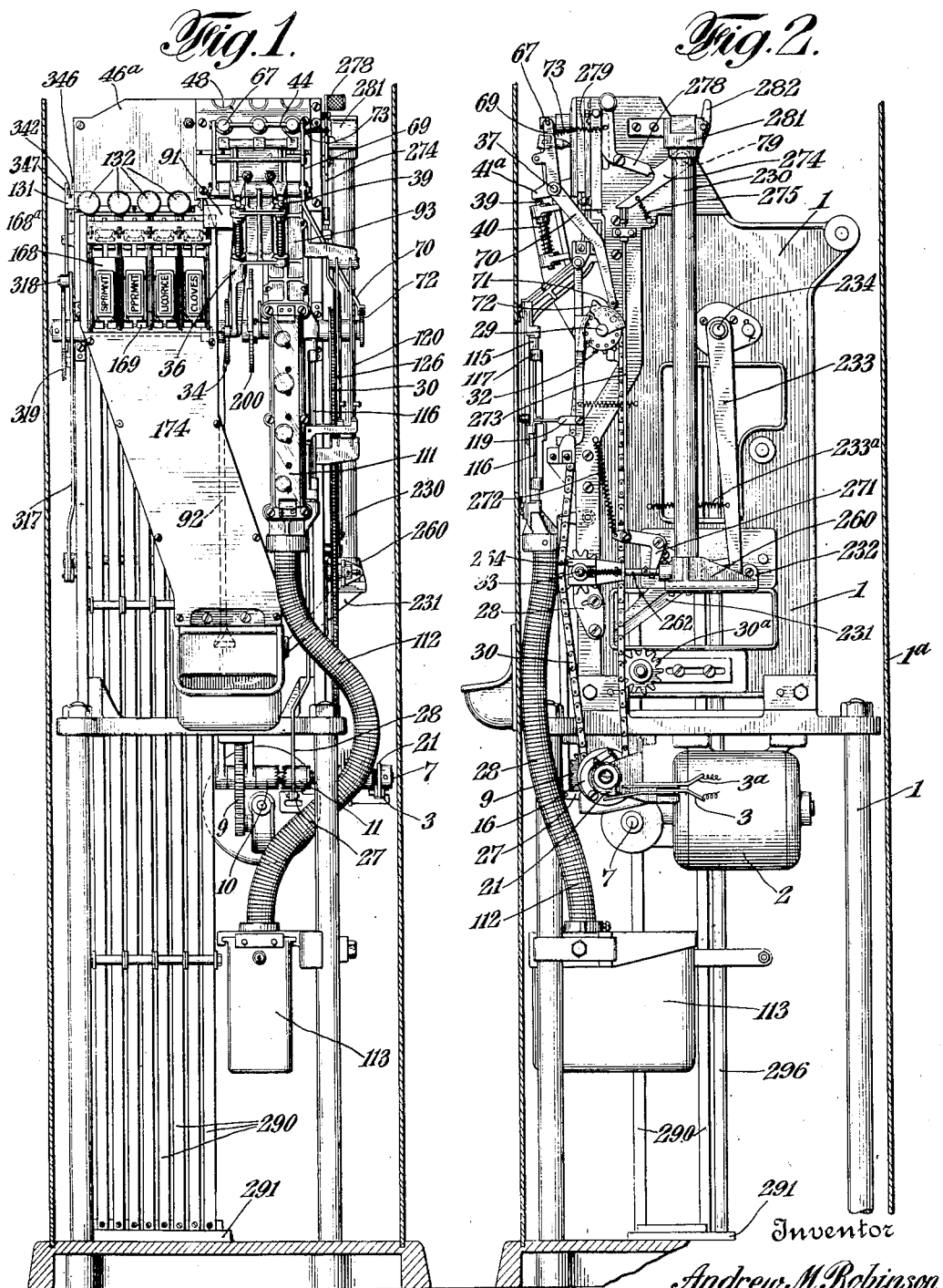
Inventor
Andrew M. Robinson
By his Attorneys
Kenyon & Kenyon May 30, 1933. A. M. ROBINSON 1,911,207
AUTOMATIC VENDING MACHINE
Filed July 14, 1928 39 Sheets-Sheet 2
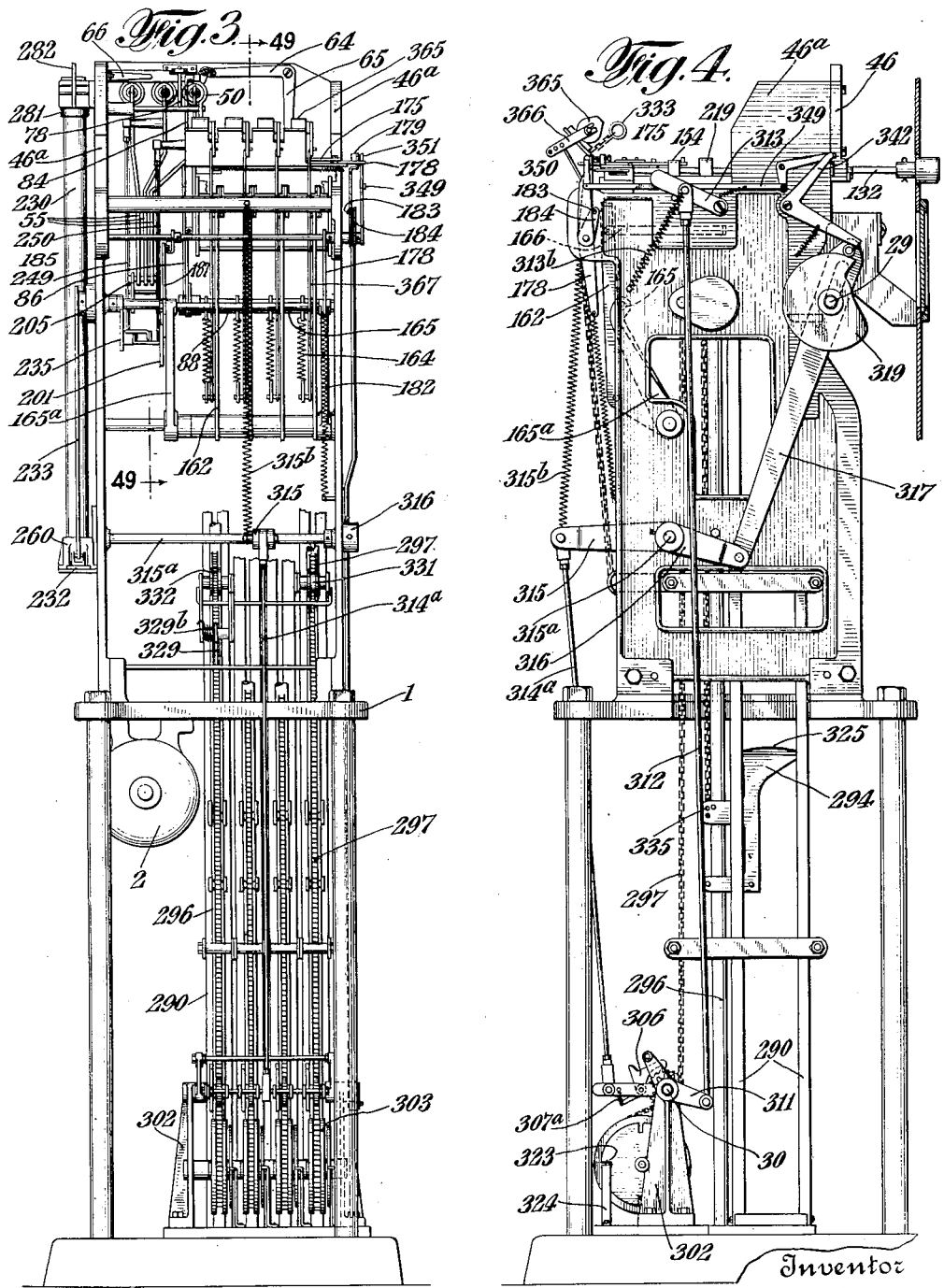

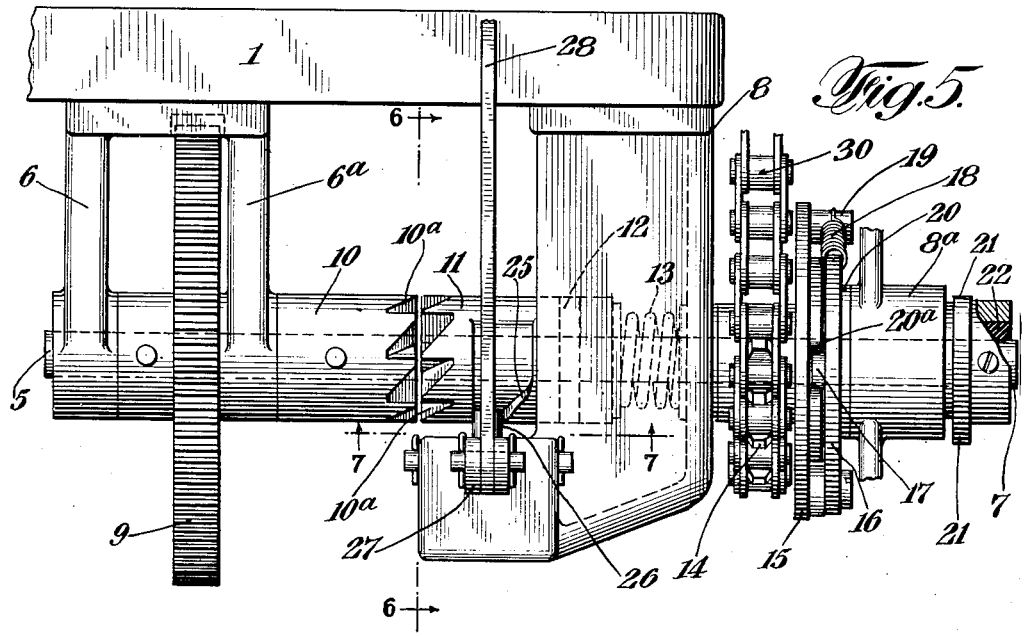
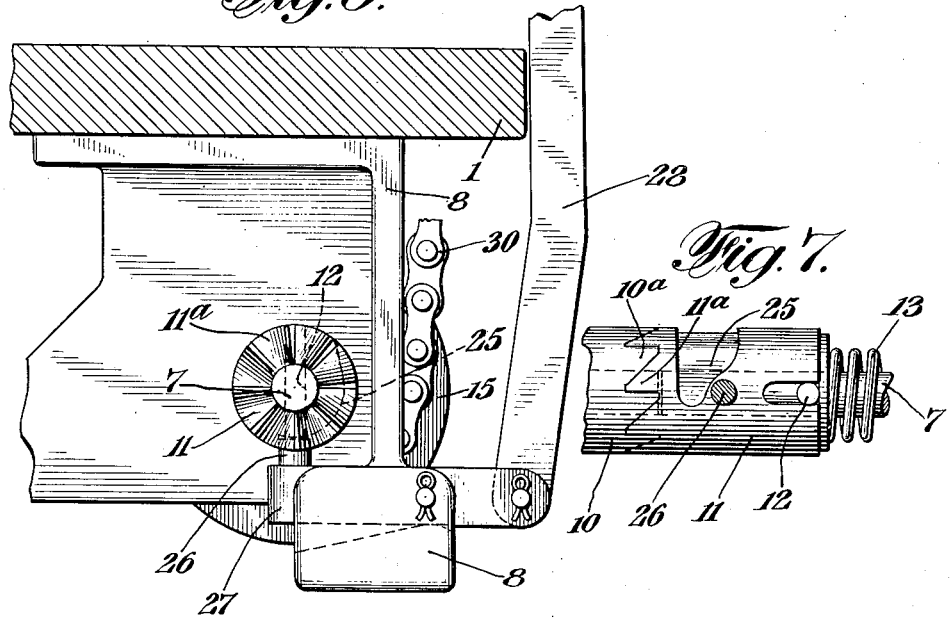

May 30, 1933.　　A. M. ROBINSON　　1,911,207
AUTOMATIC VENDING MACHINE
Filed July 14, 1928　　39 Sheets-Sheet 4
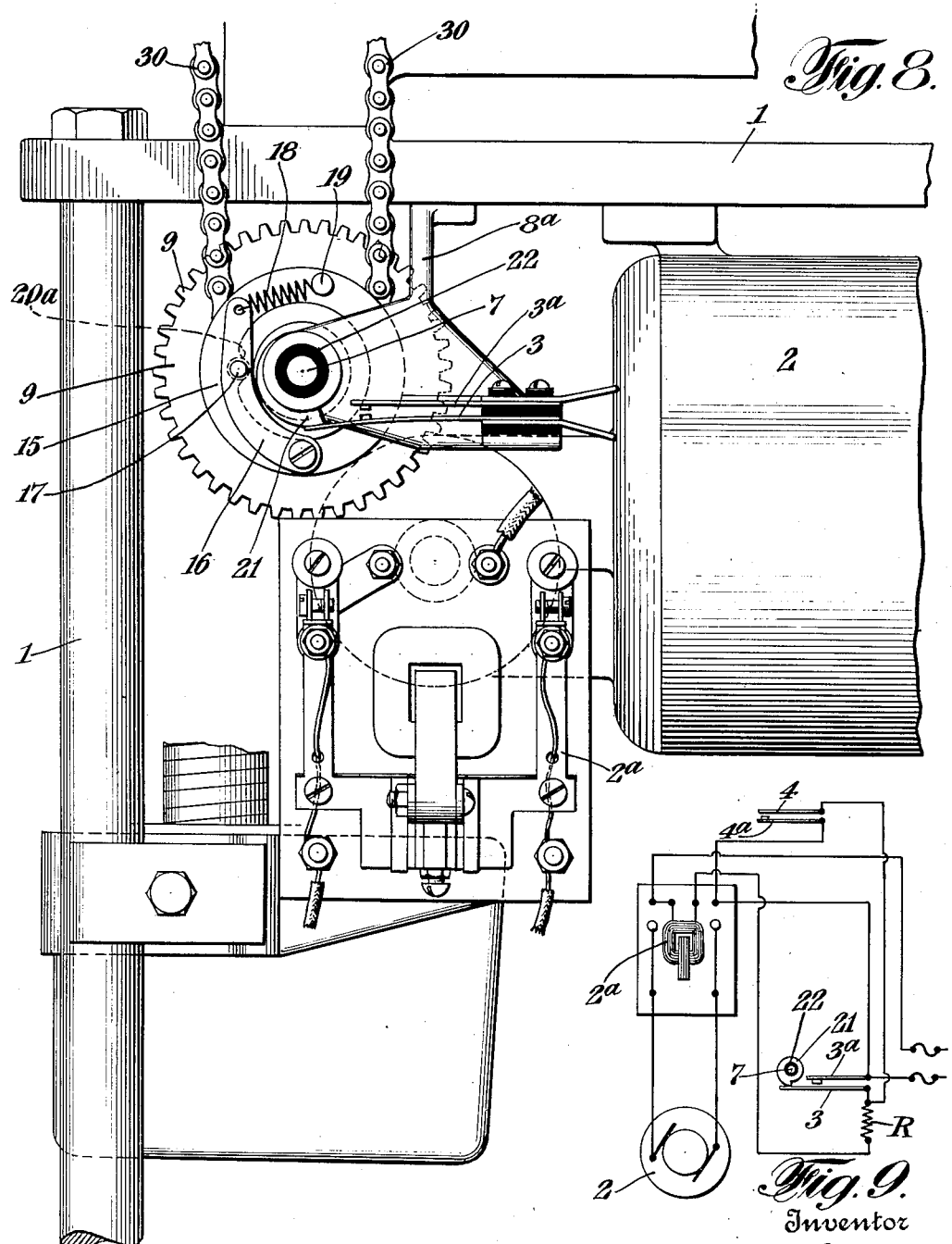
Inventor
Andrew M. Robinson
By his Attorneys
Kenyon & Kenyon

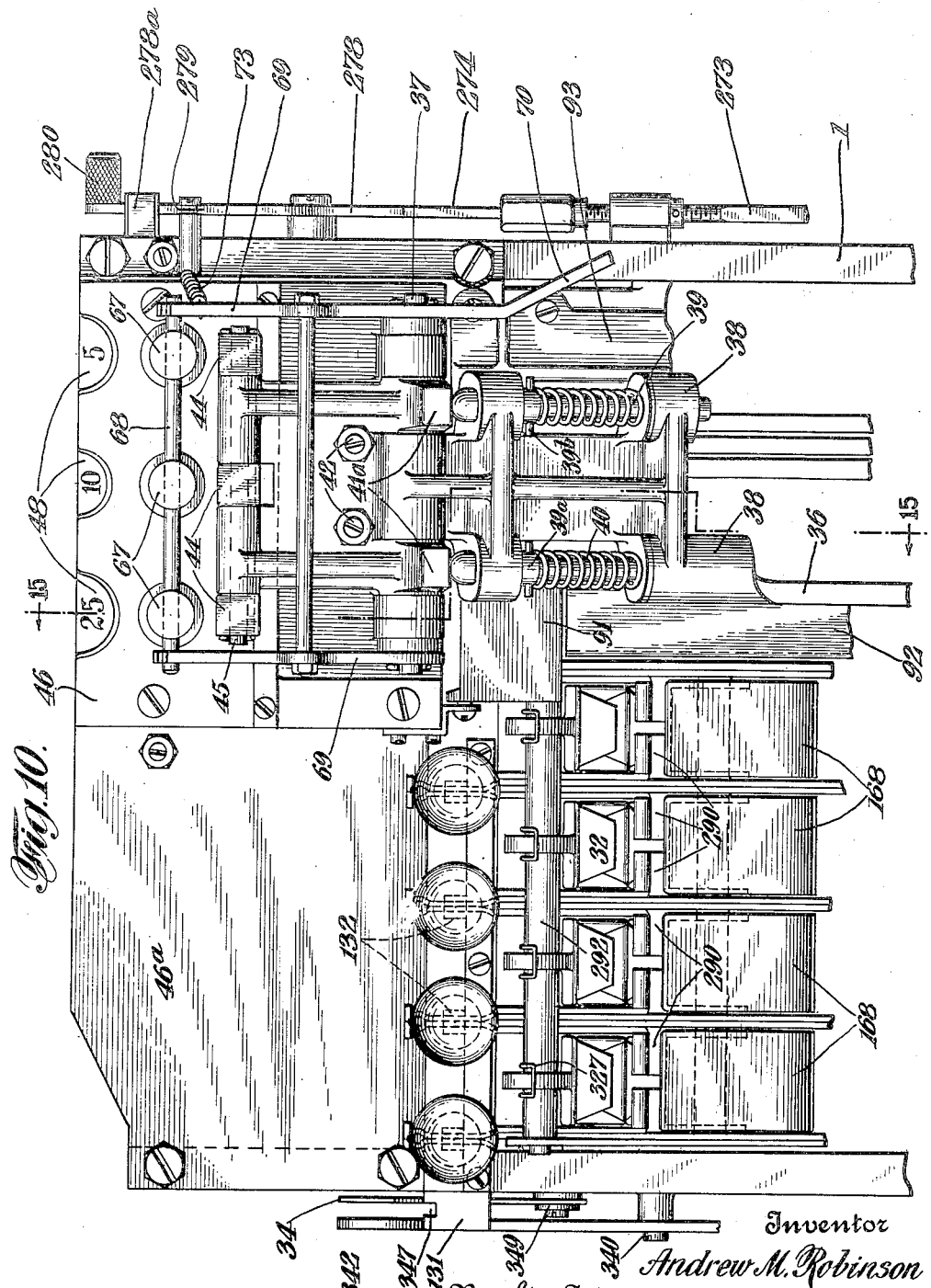

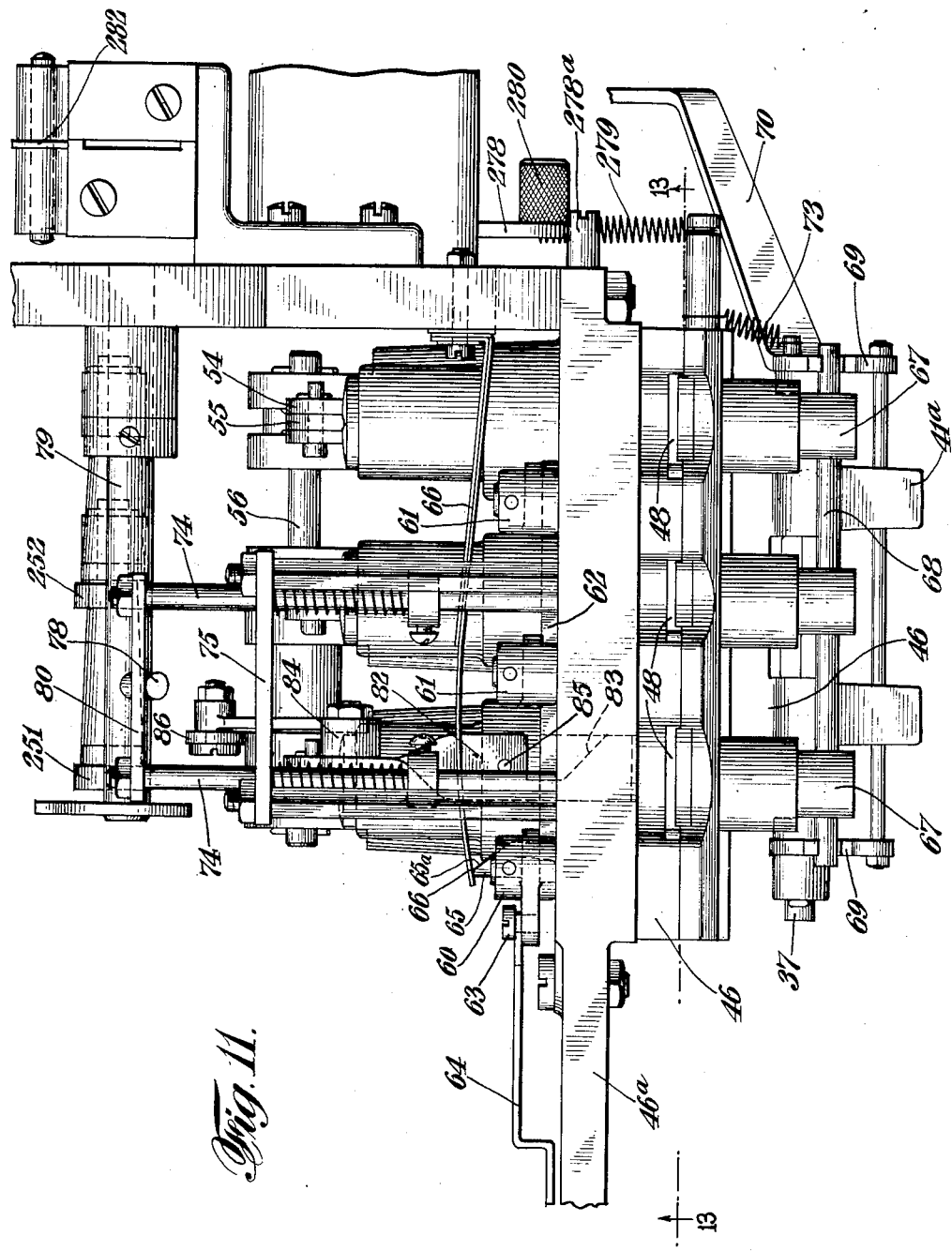

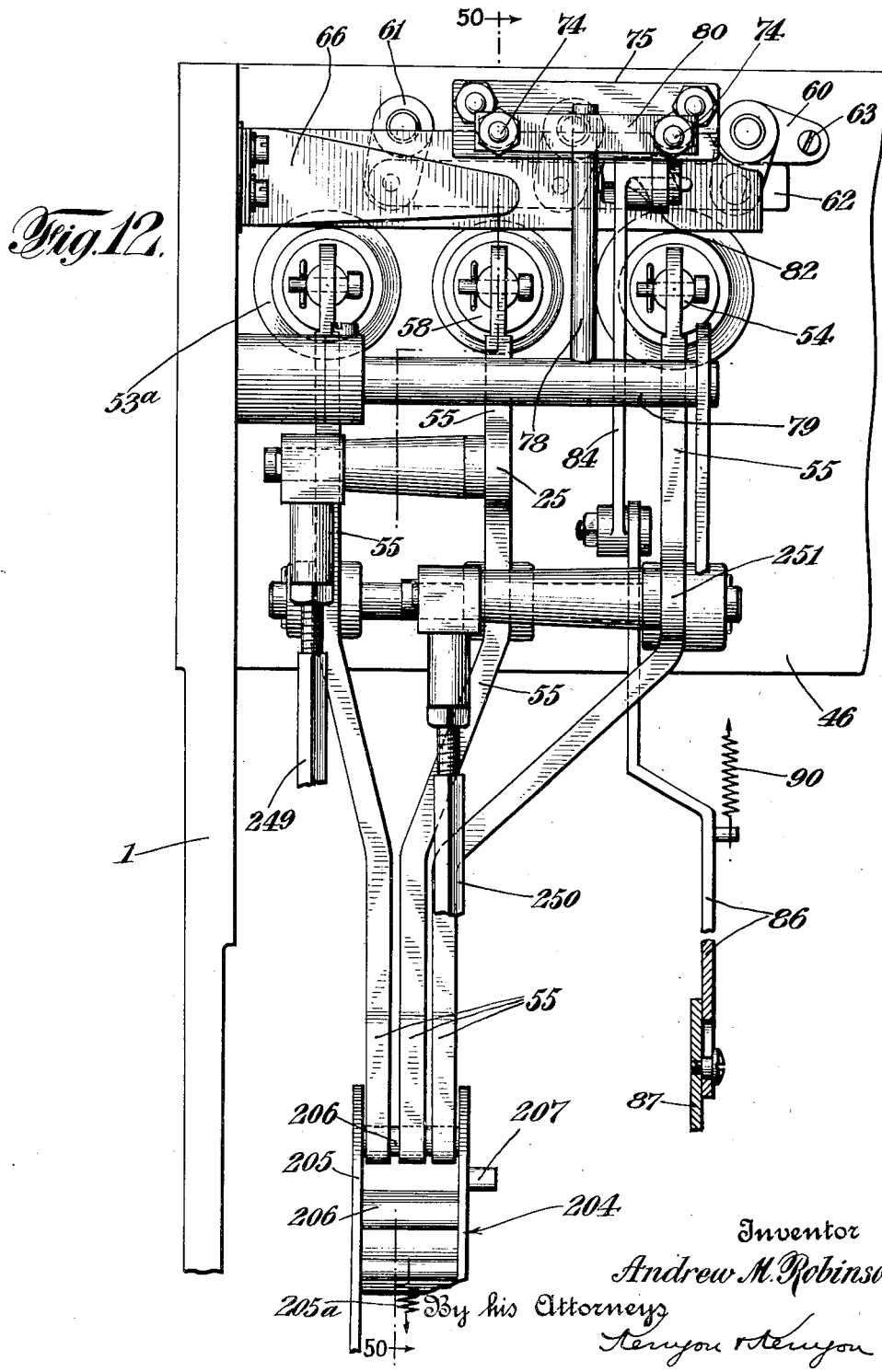

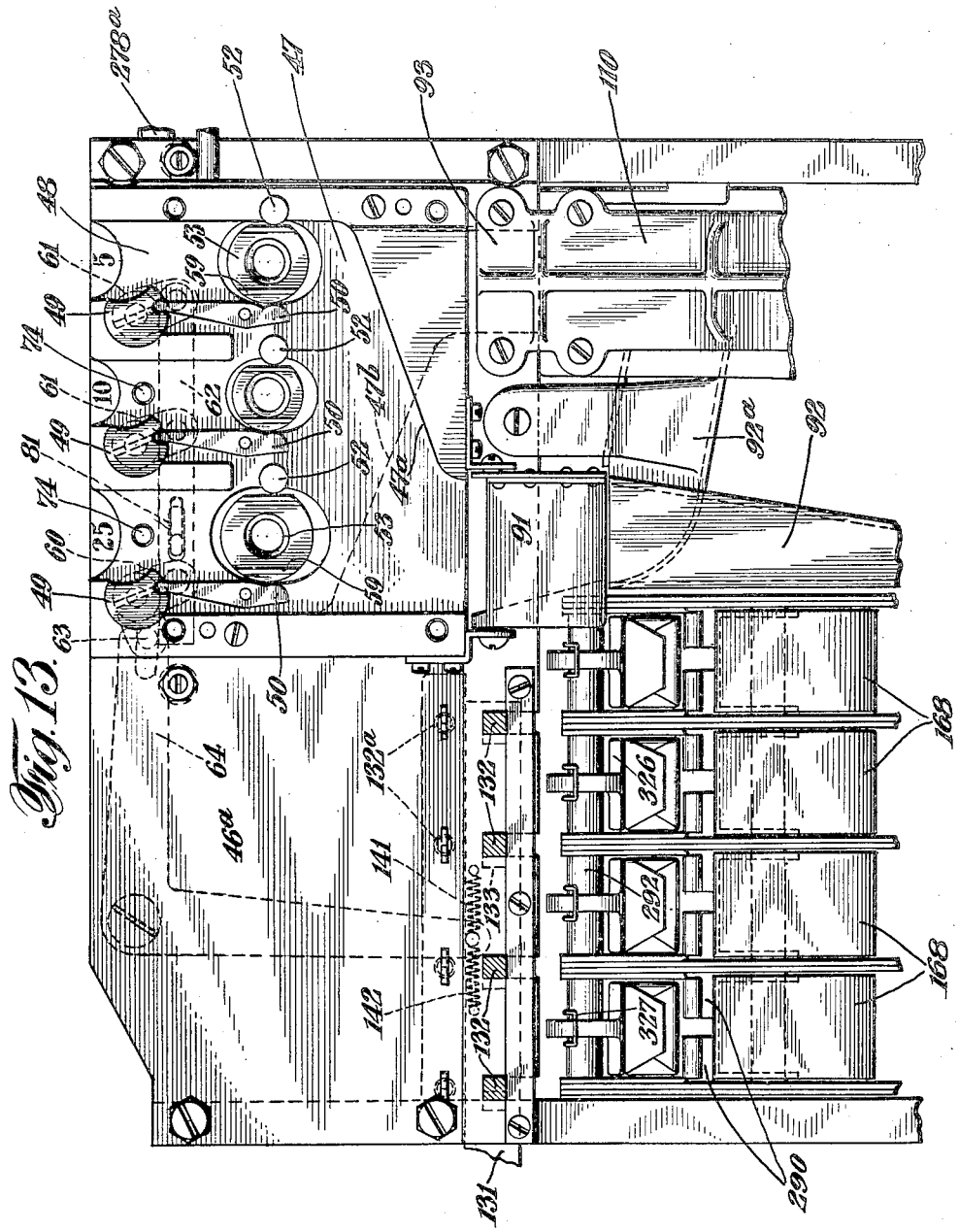

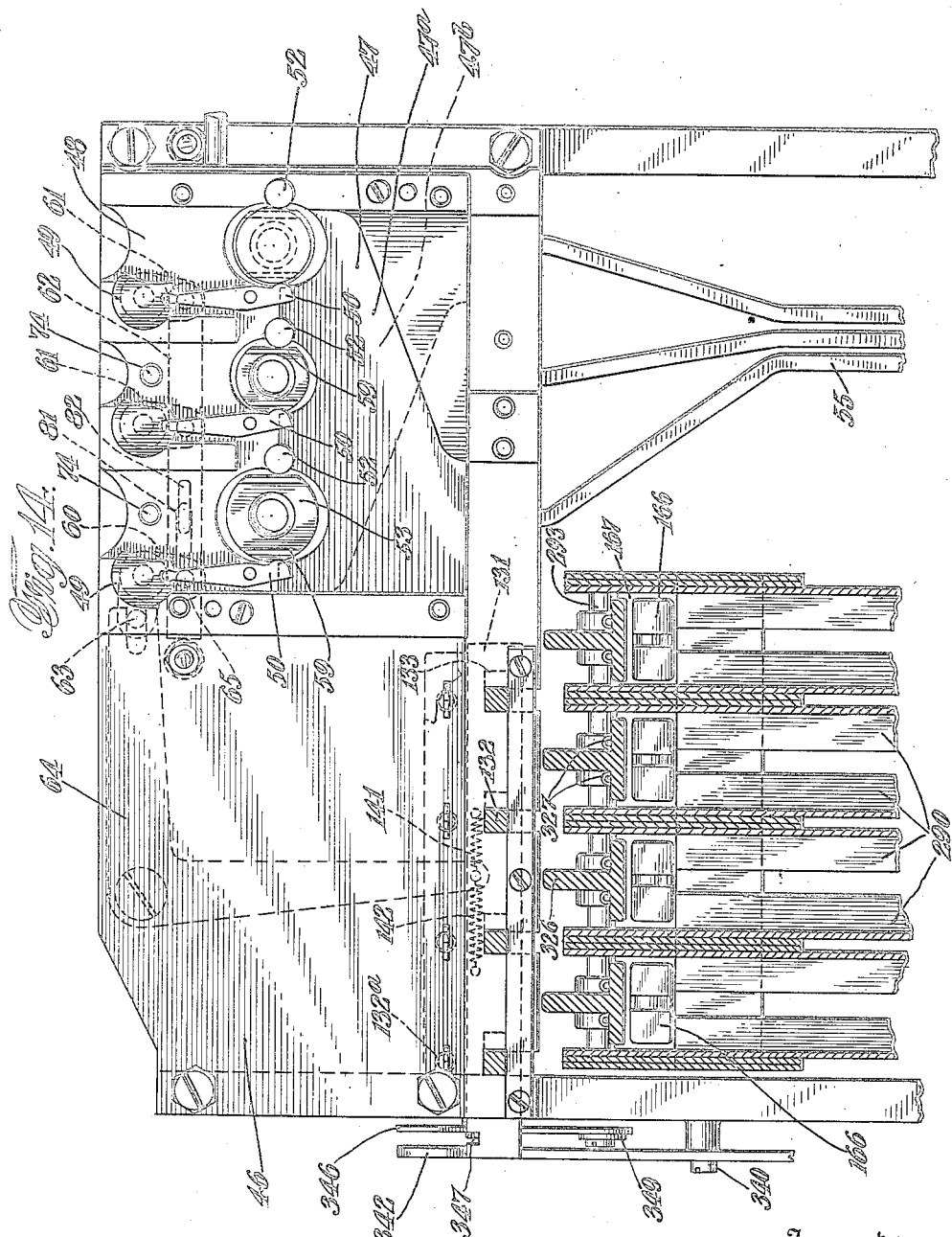

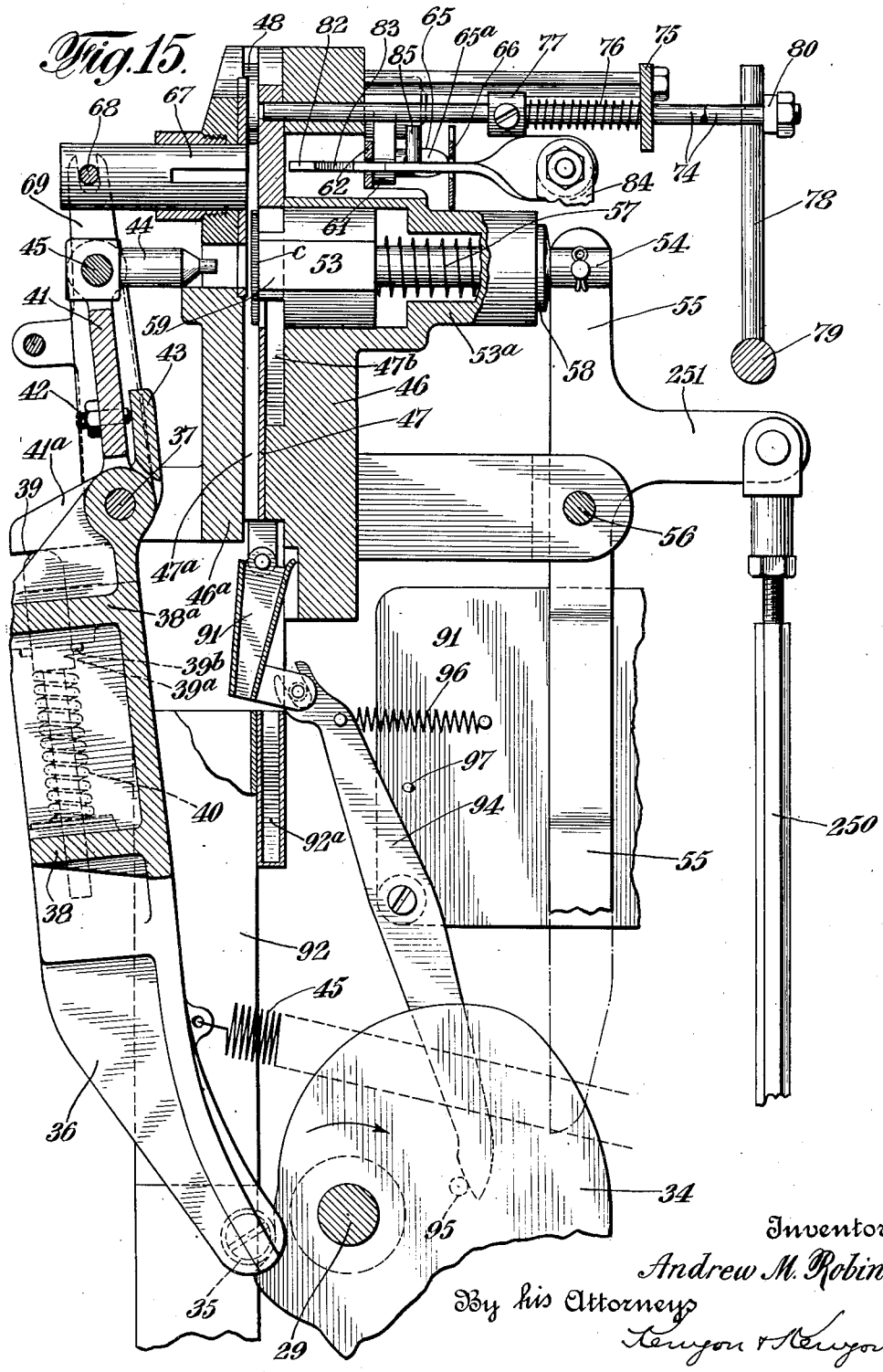

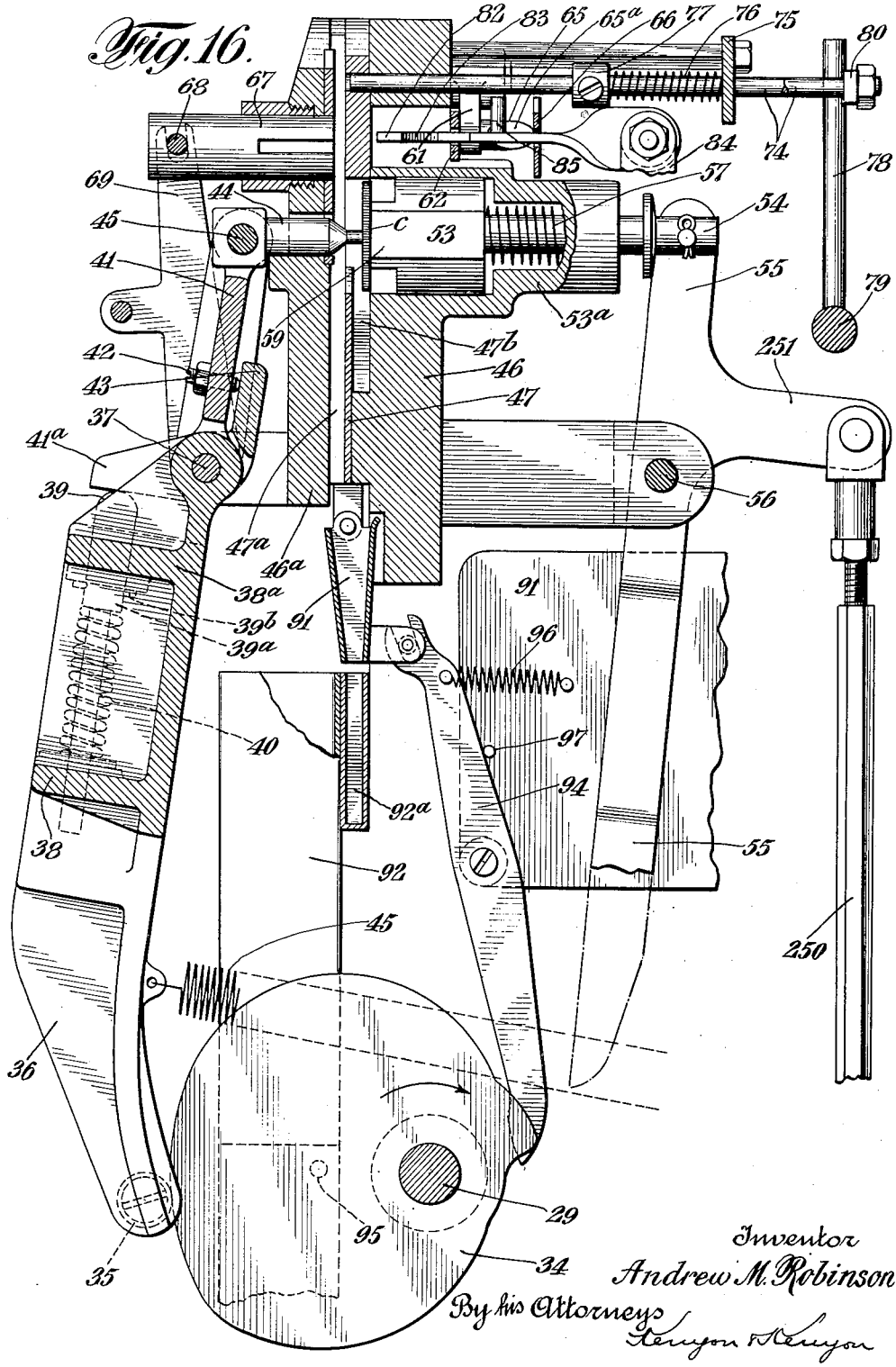

May 30, 1933. A. M. ROBINSON 1,911,207
AUTOMATIC VENDING MACHINE
Filed July 14, 1928 39 Sheets-Sheet 12

Inventor
Andrew M. Robinson
By his Attorneys
Kenyon & Kenyon

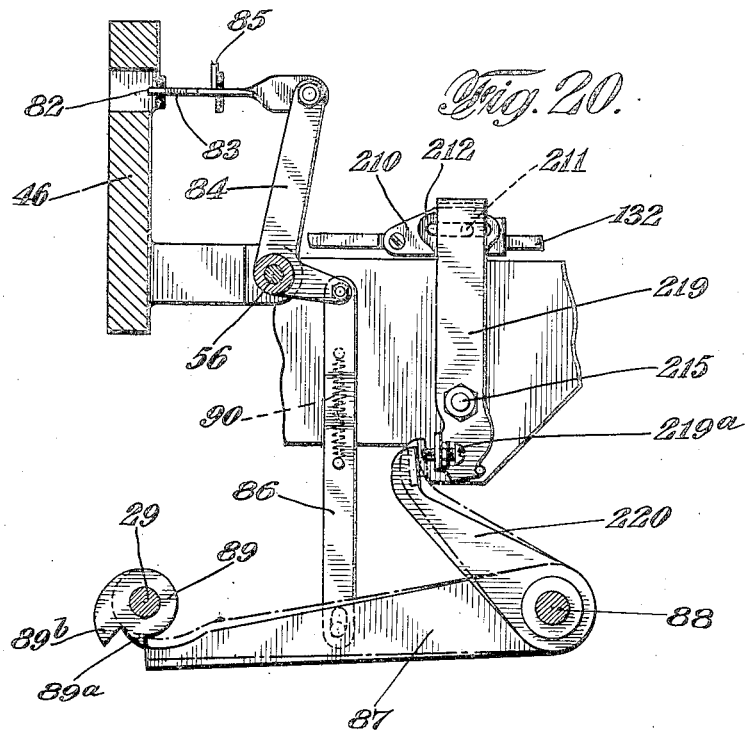
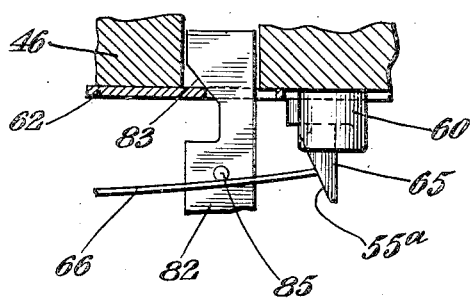
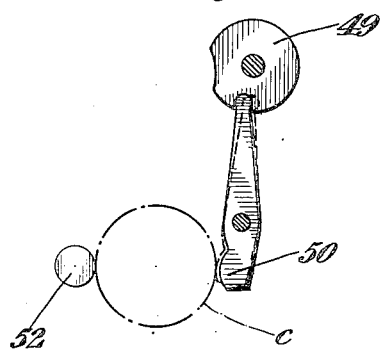

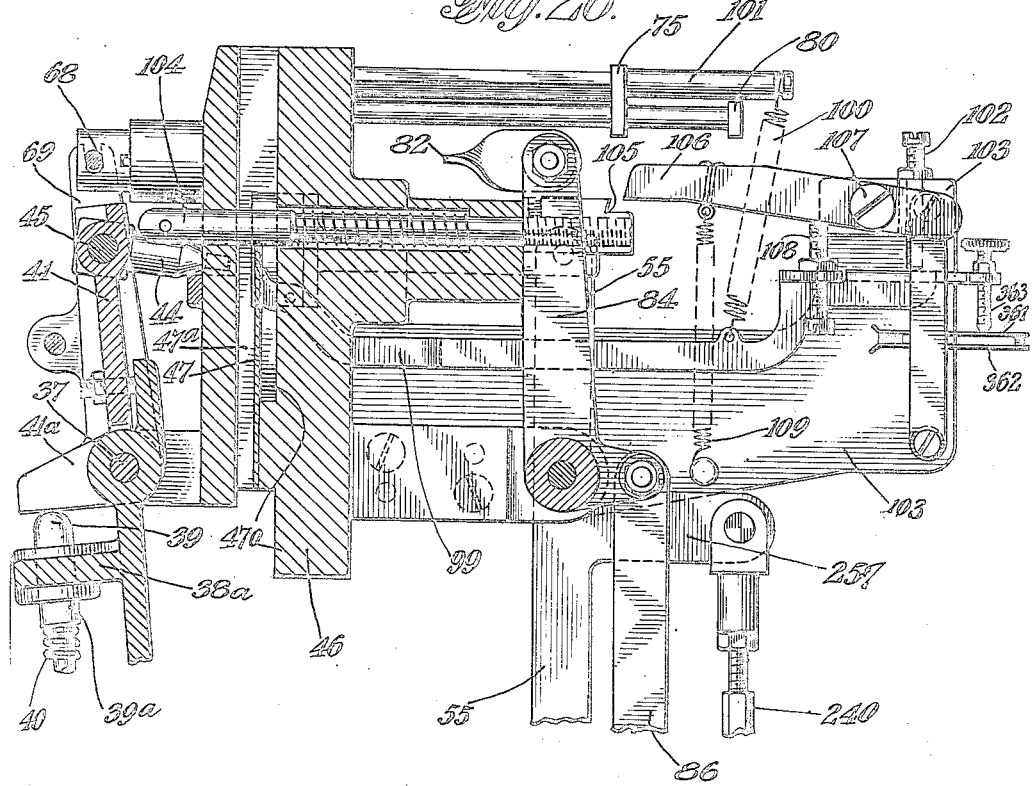
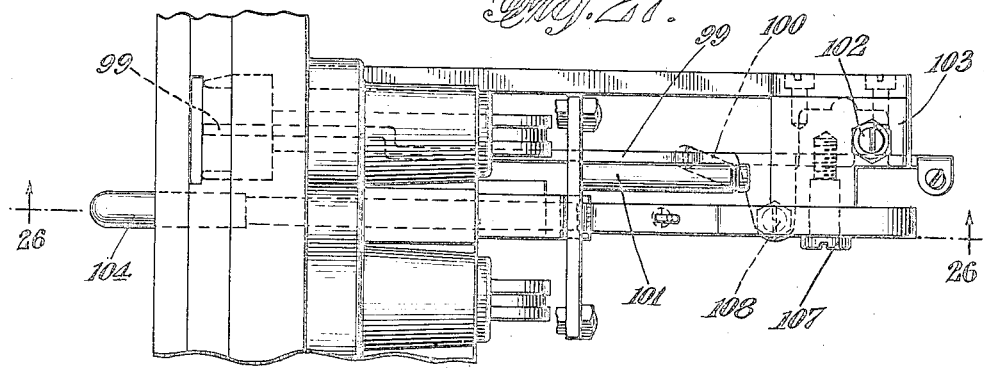

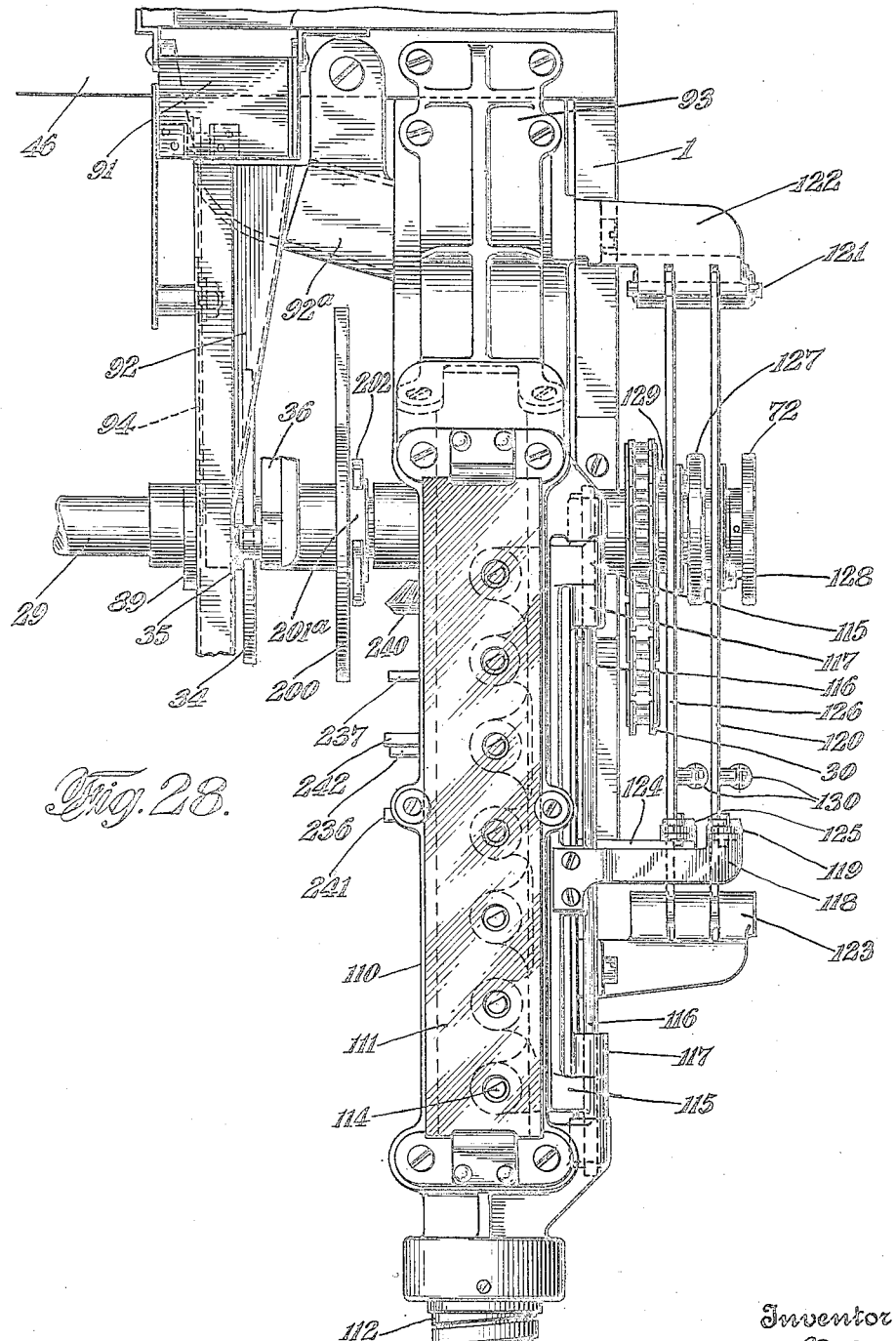

May 30, 1933.  A. M. ROBINSON  1,911,207
AUTOMATIC VENDING MACHINE
Filed July 14, 1928    39 Sheets-Sheet 17
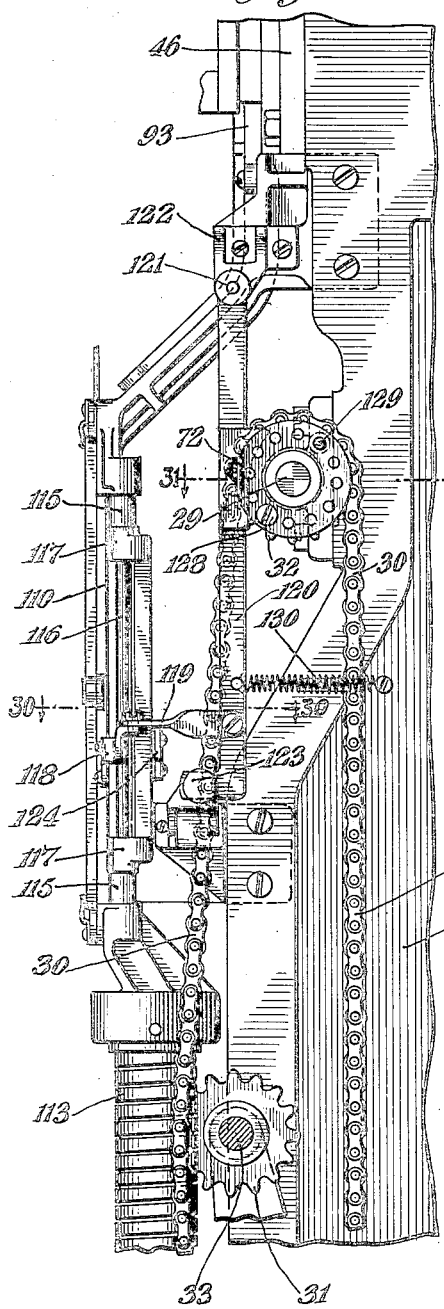
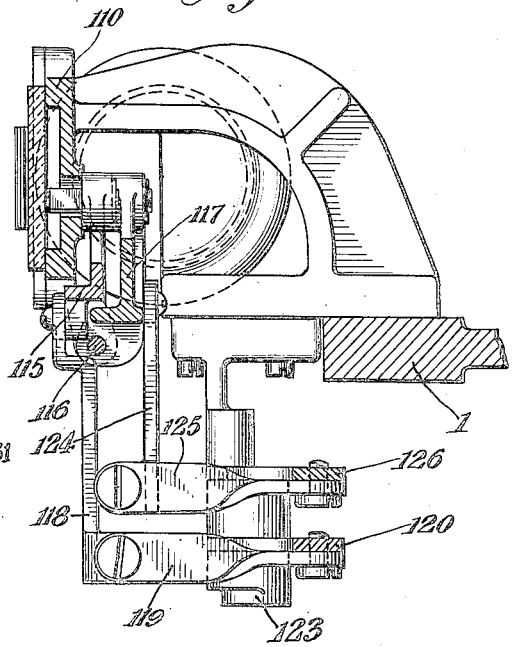
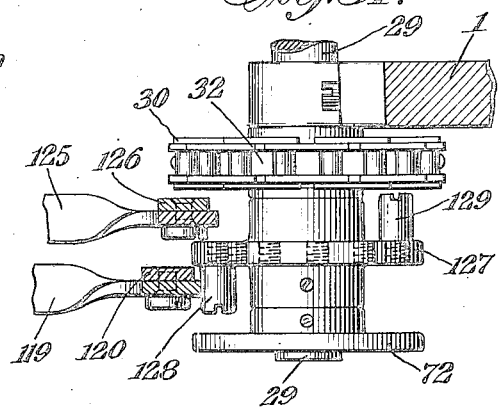
Inventor
Andrew M. Robinson
By his Attorneys
Kenyon & Kenyon

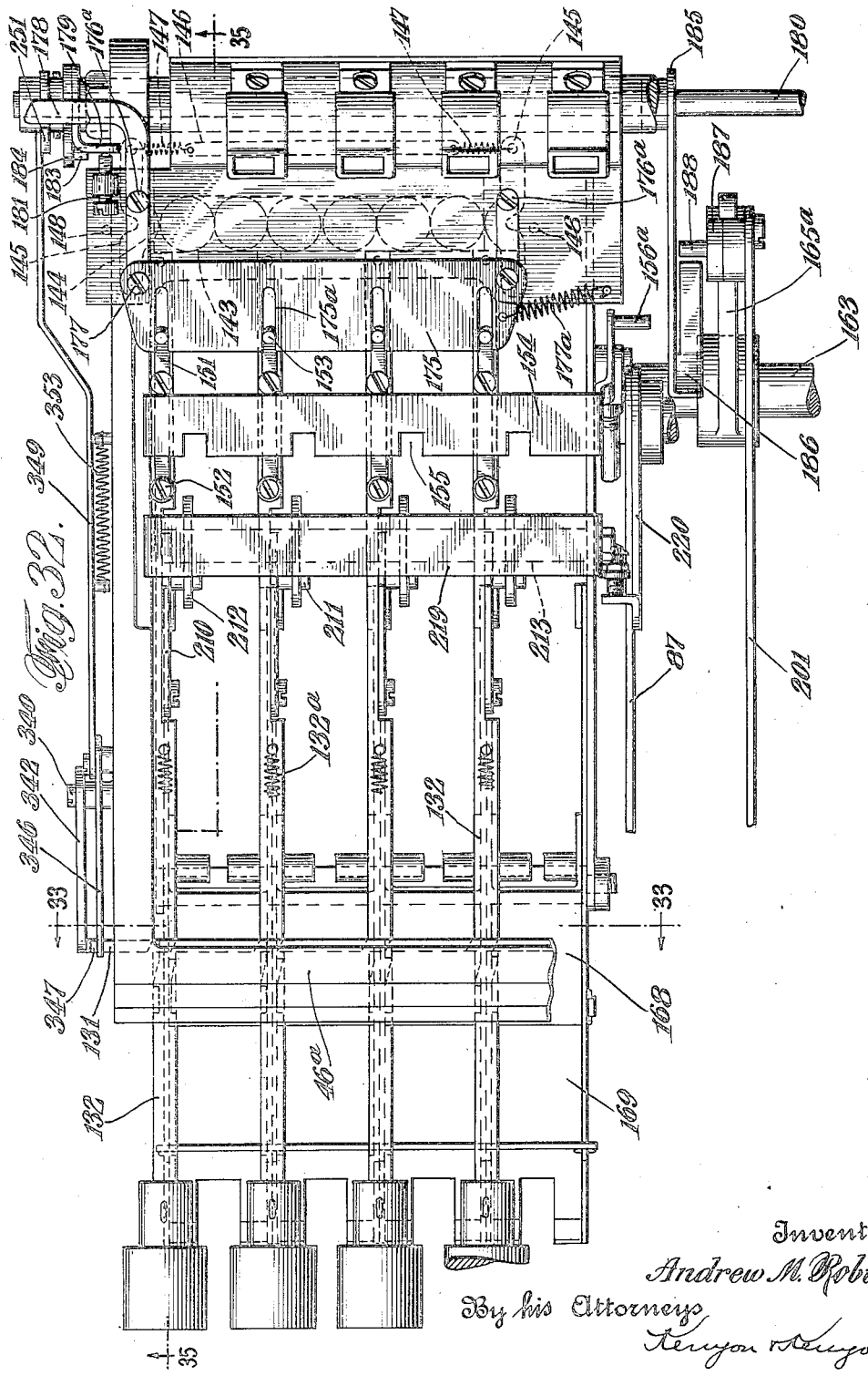

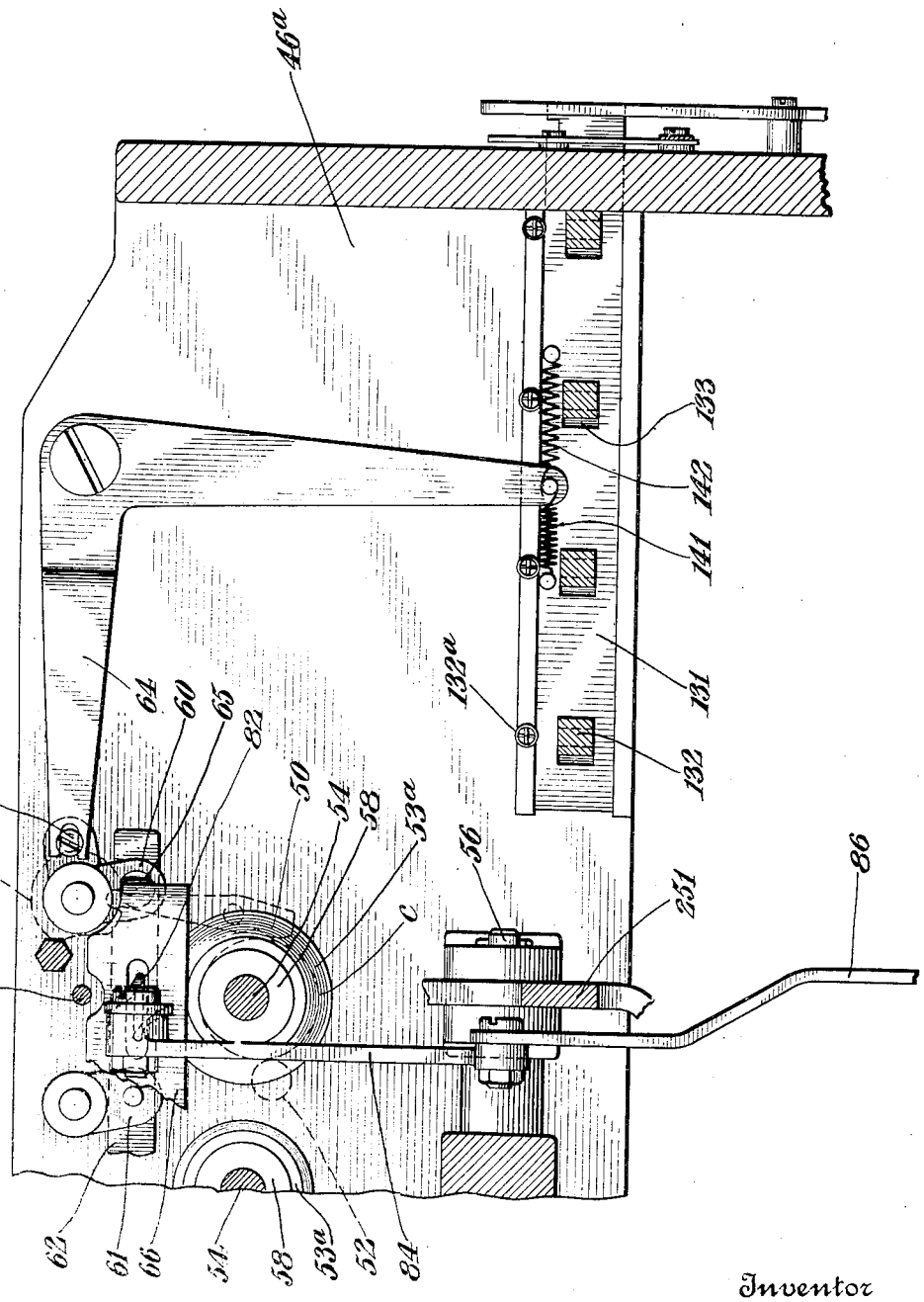

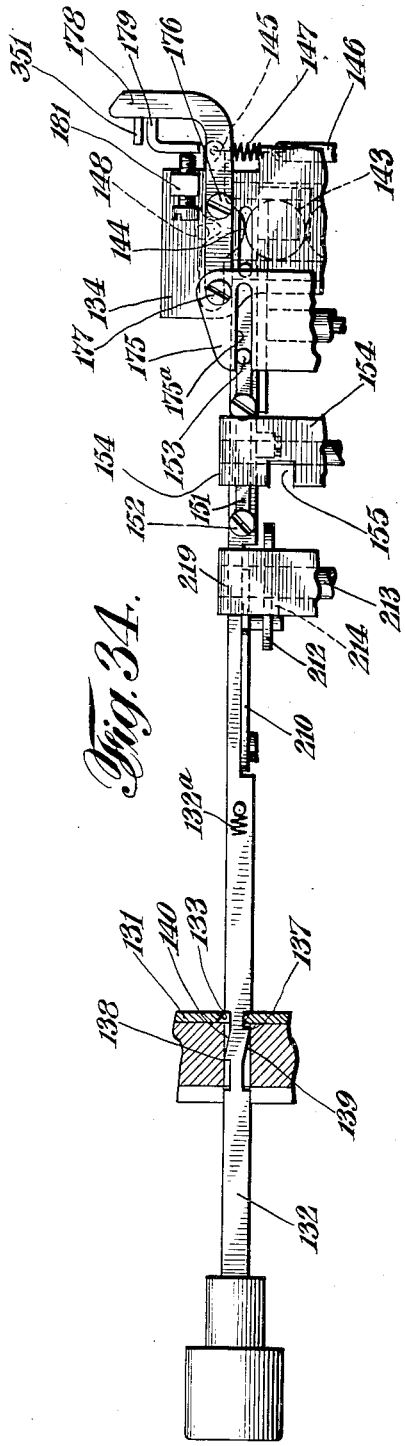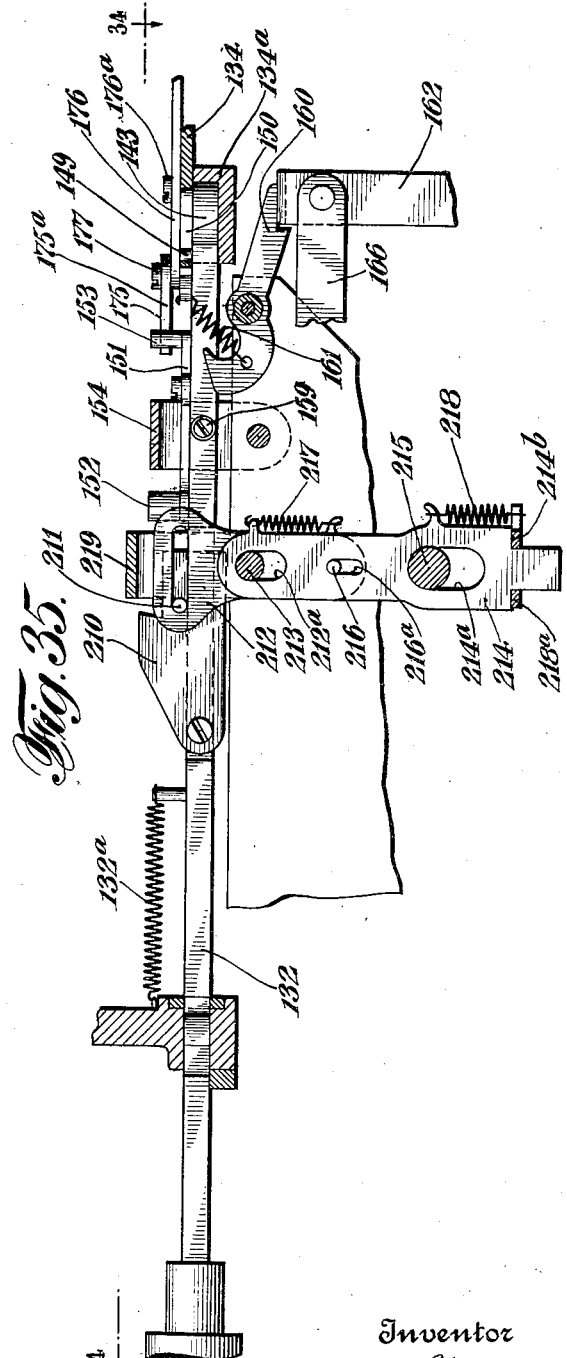

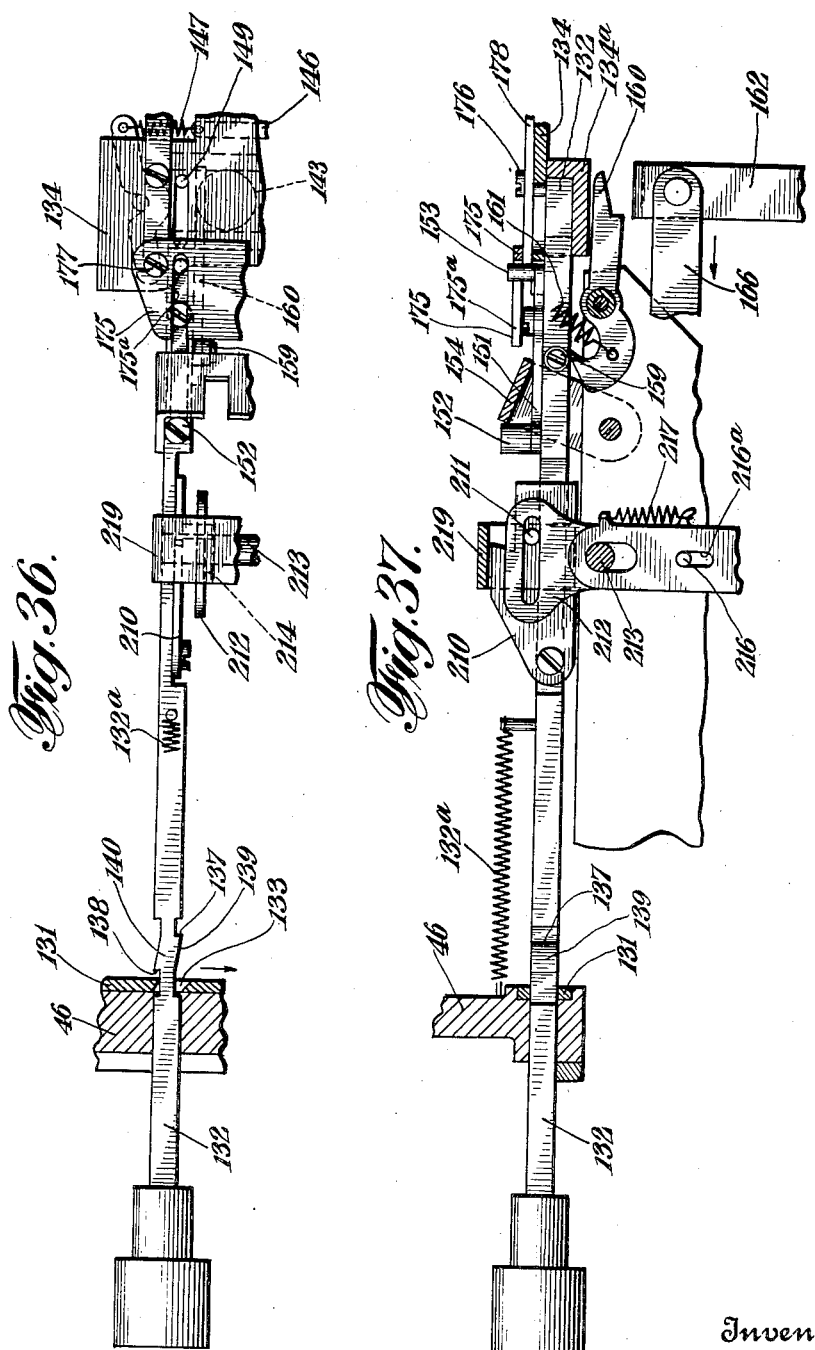

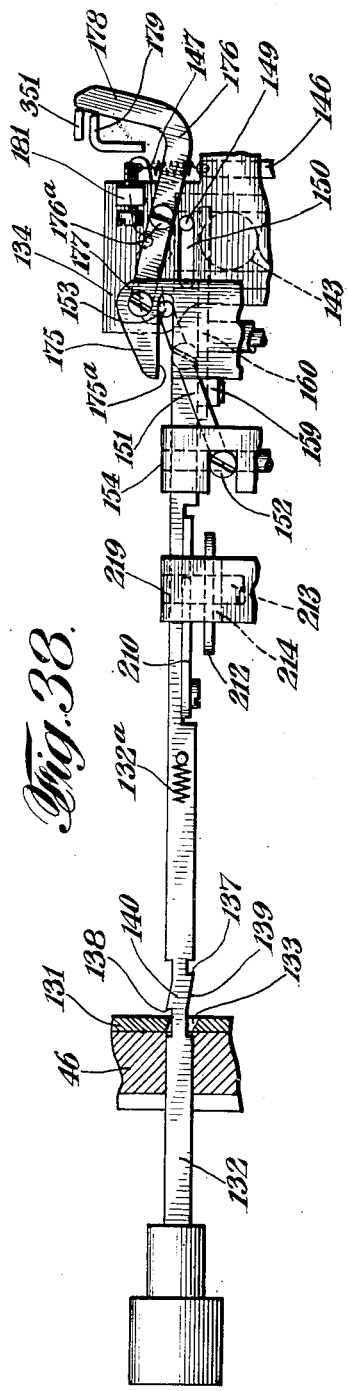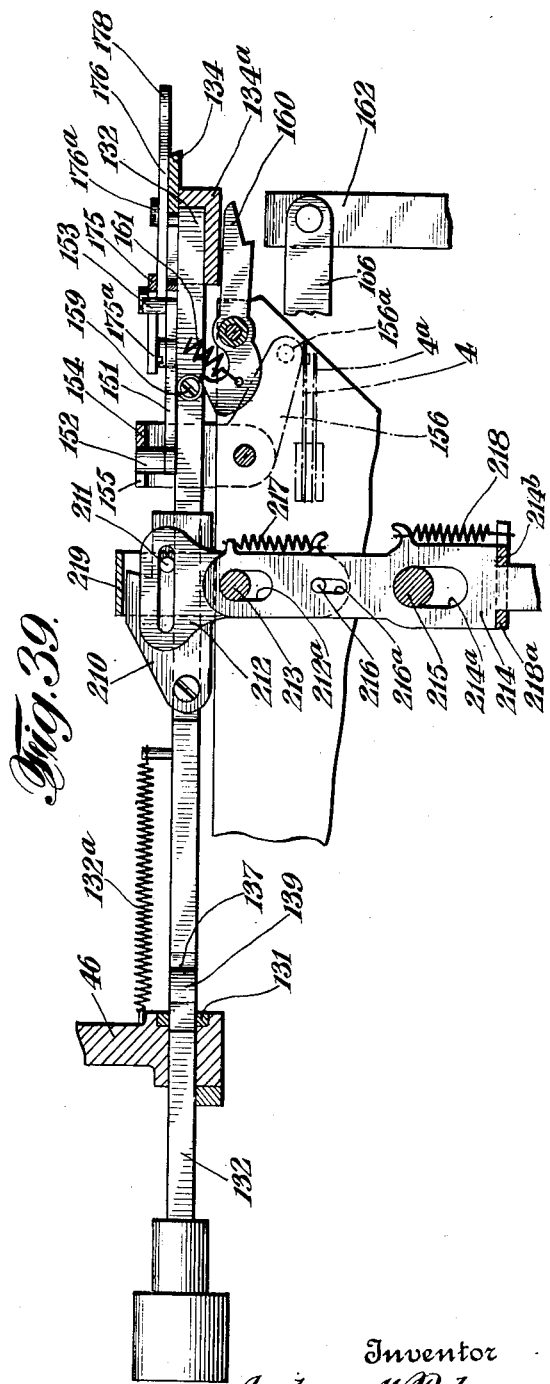

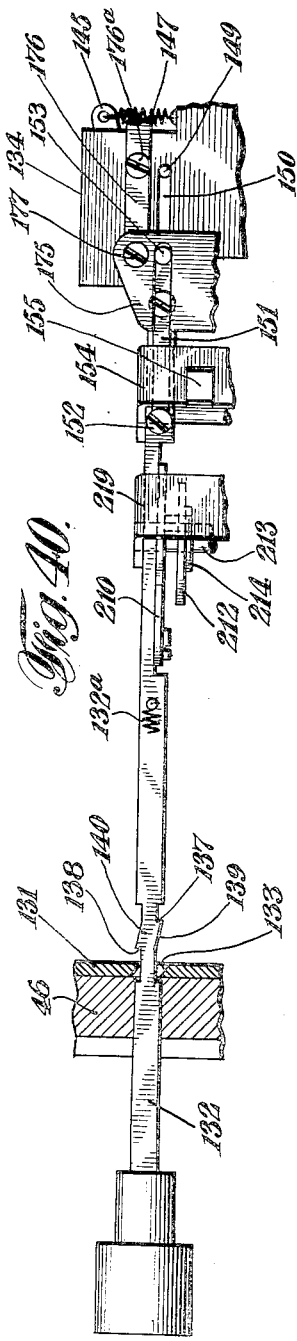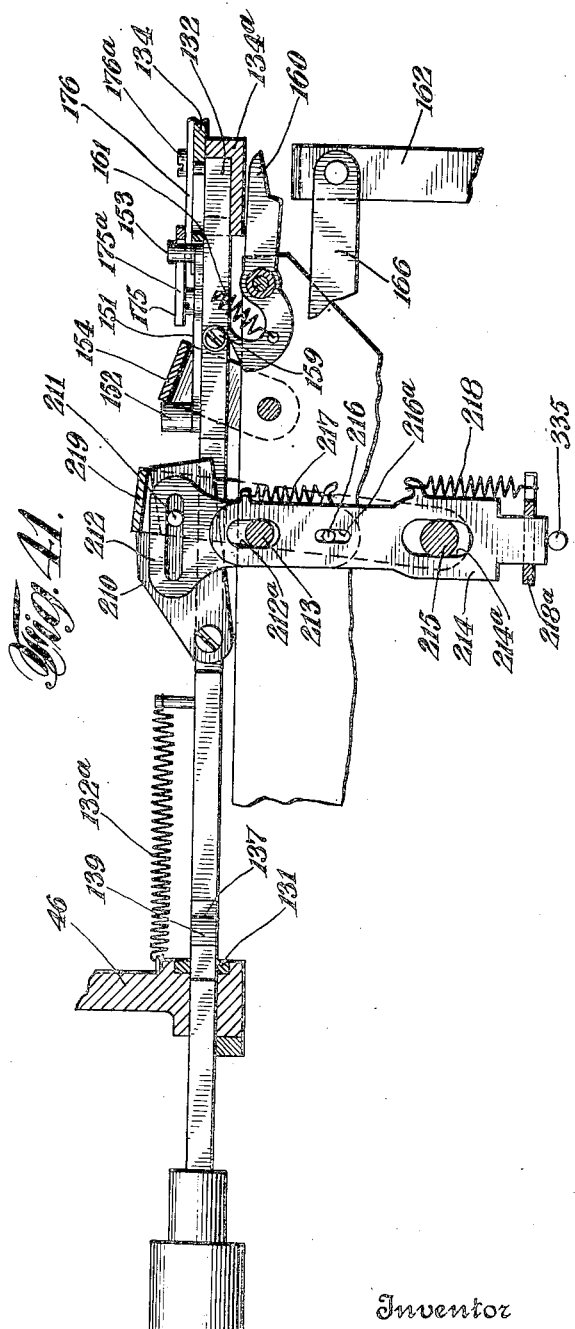

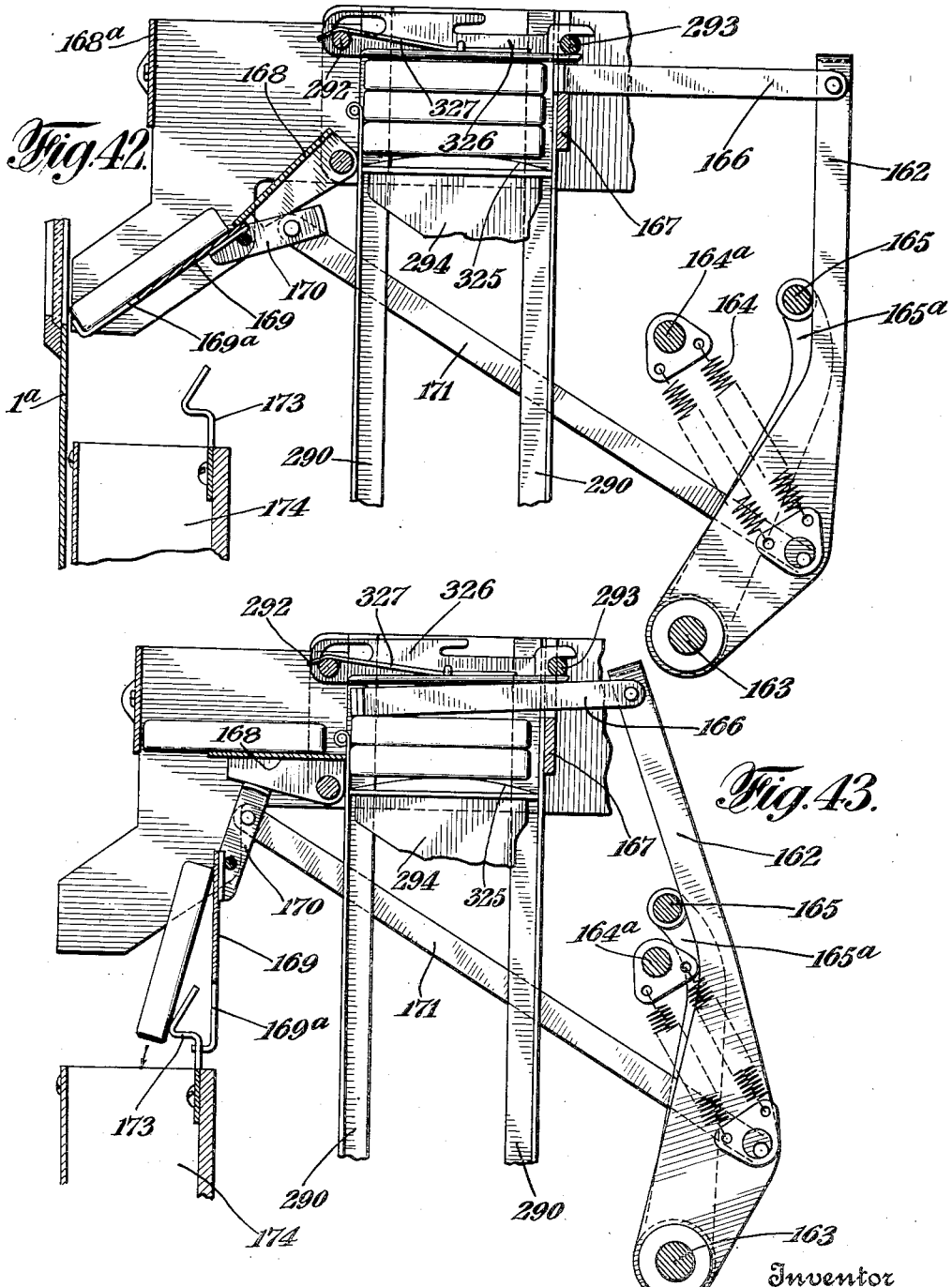

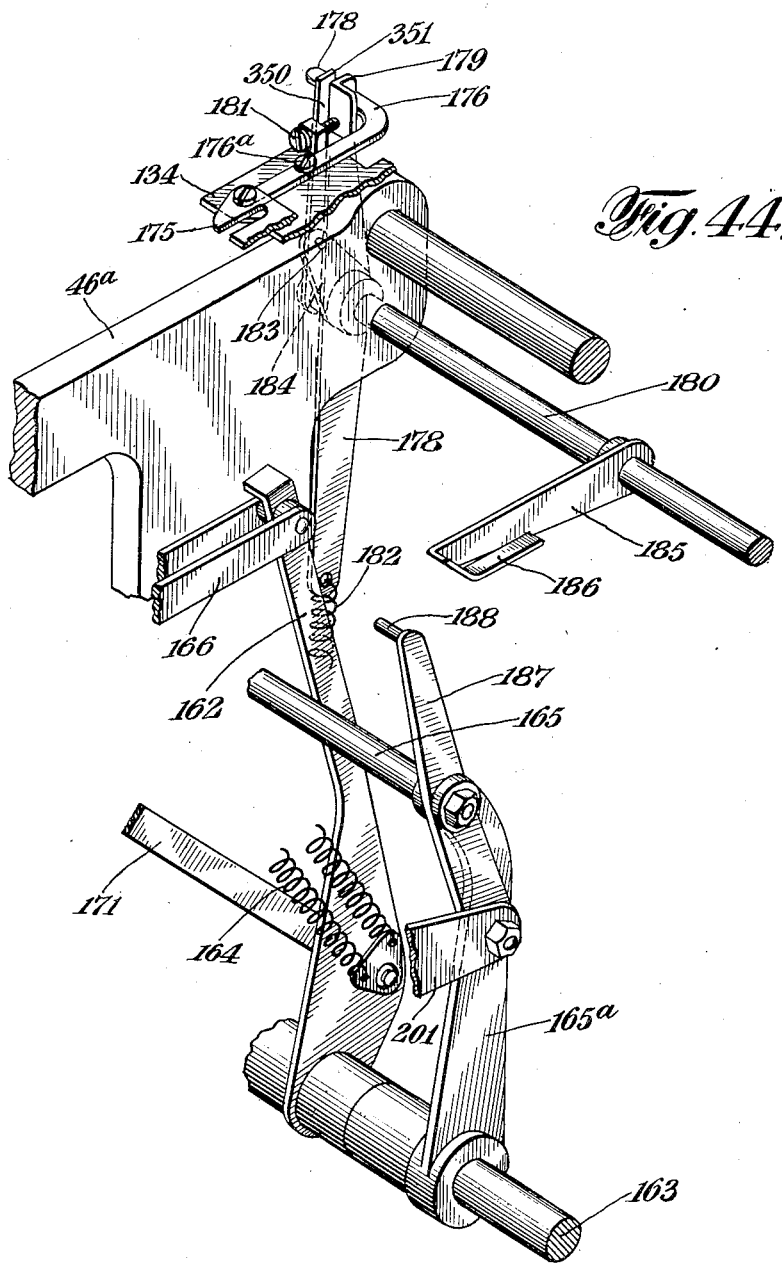

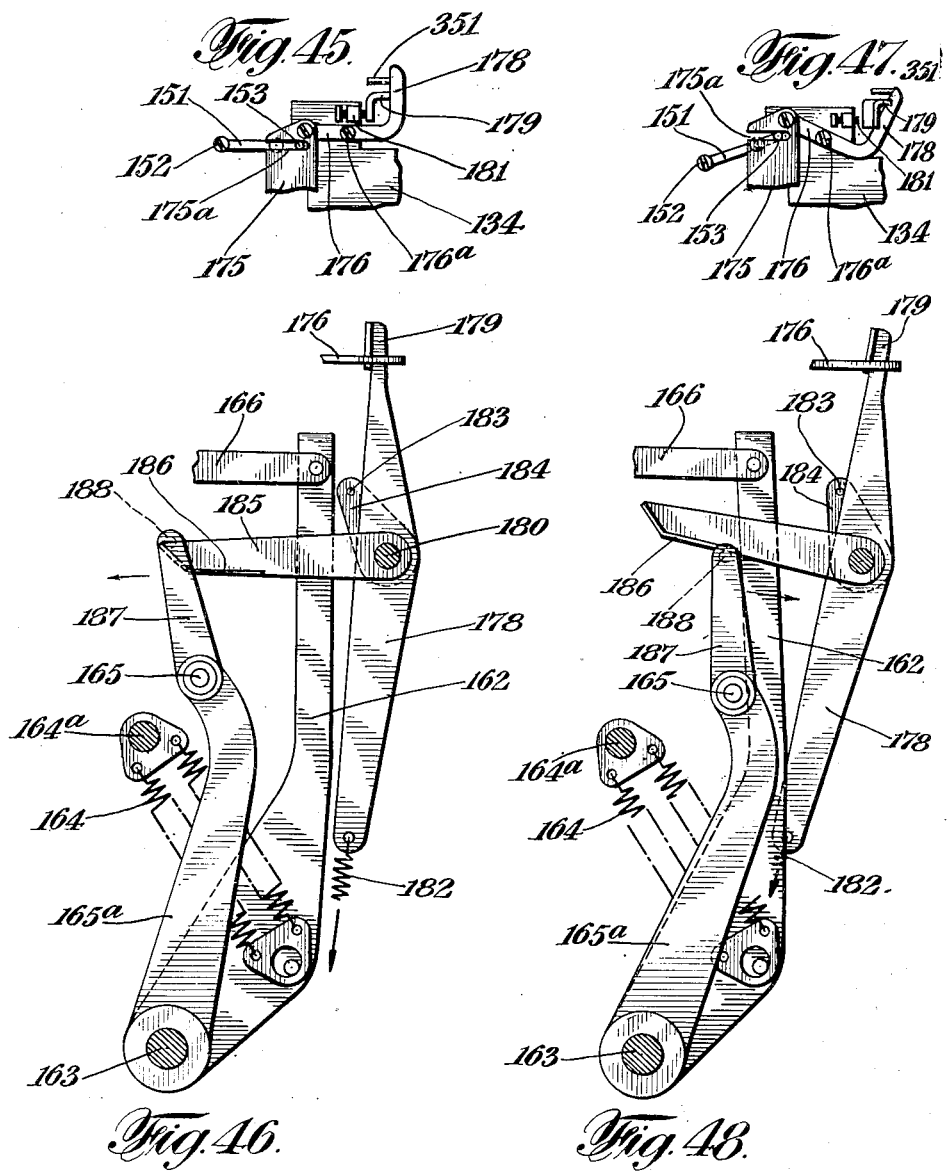

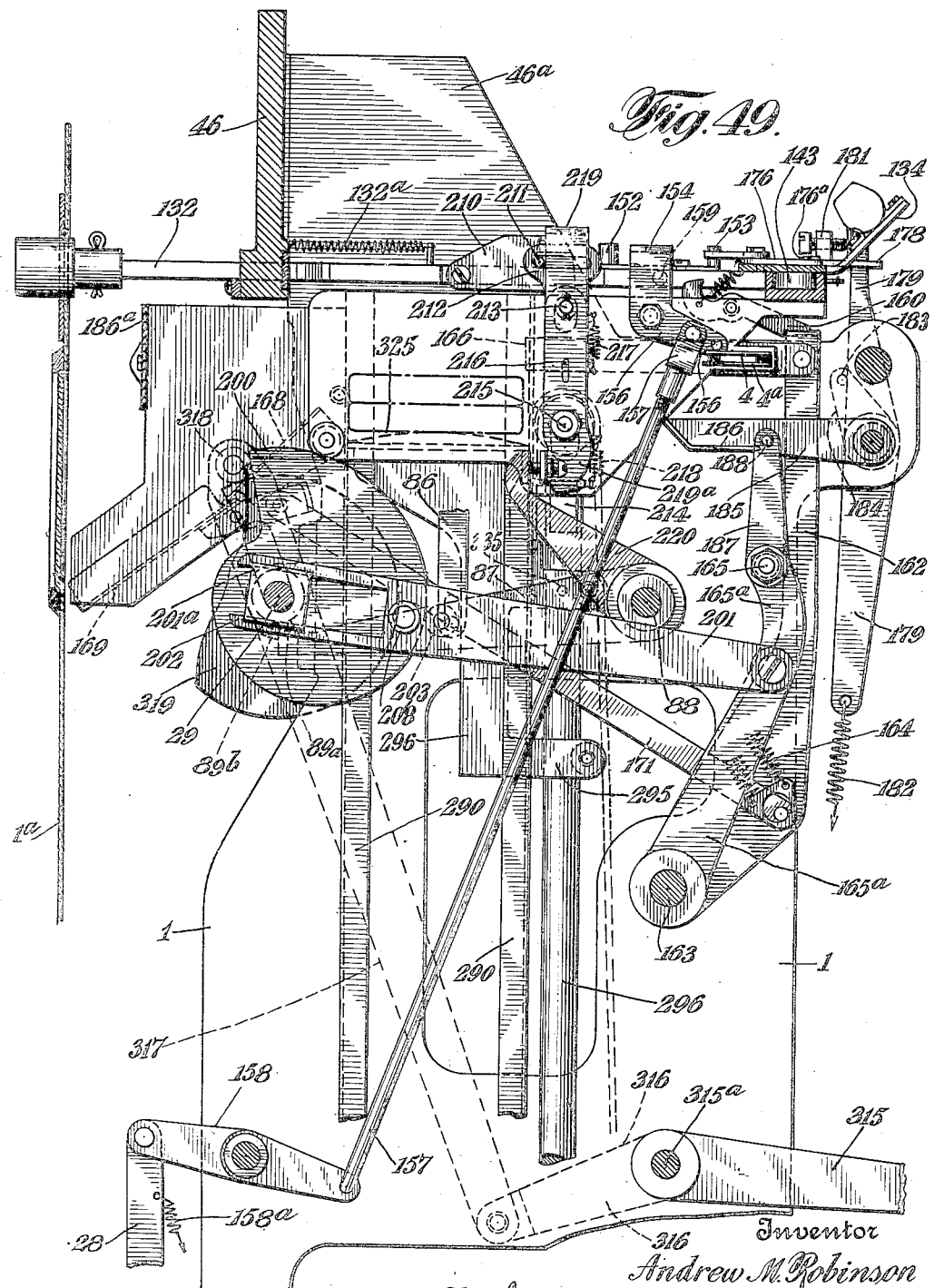

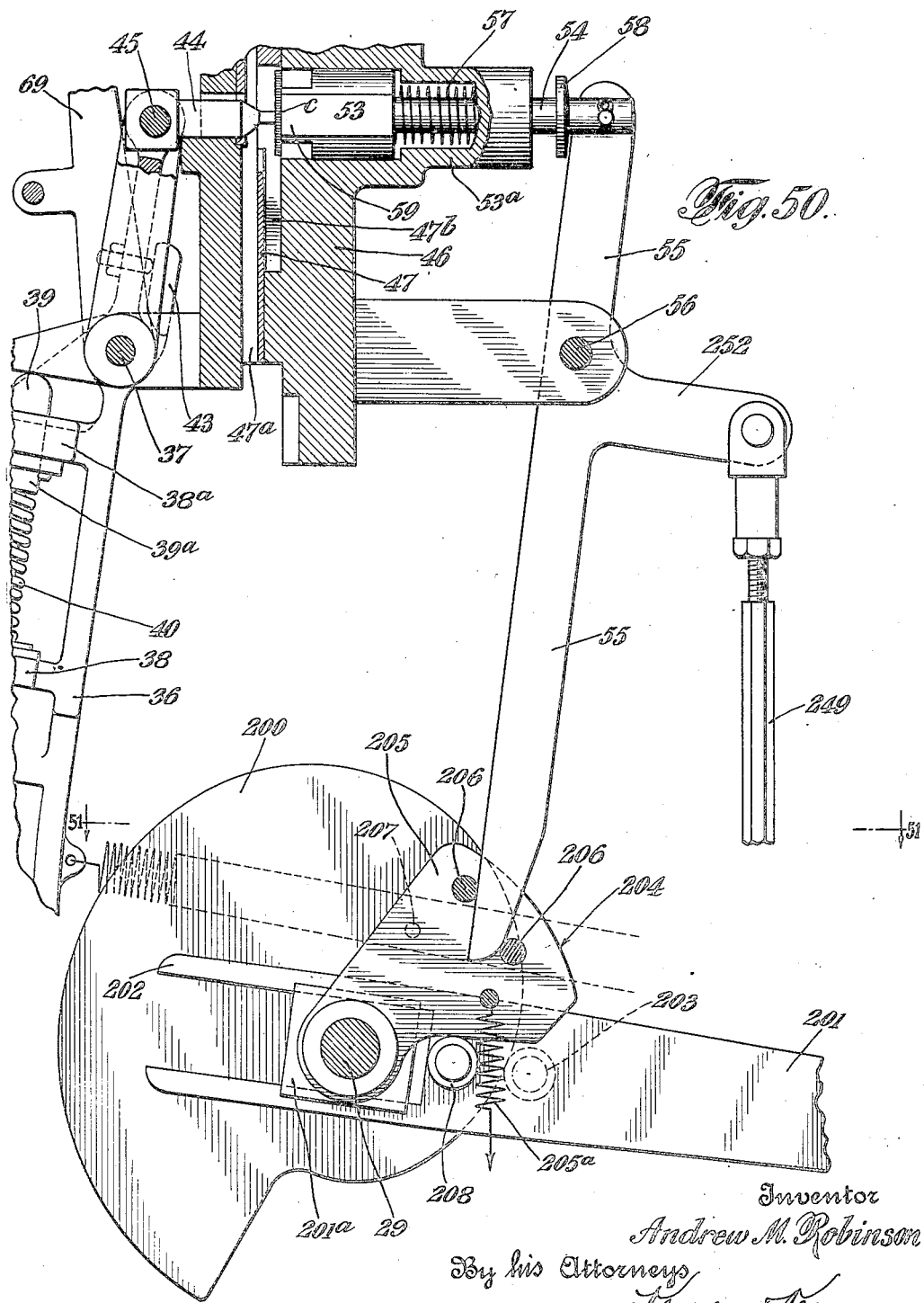

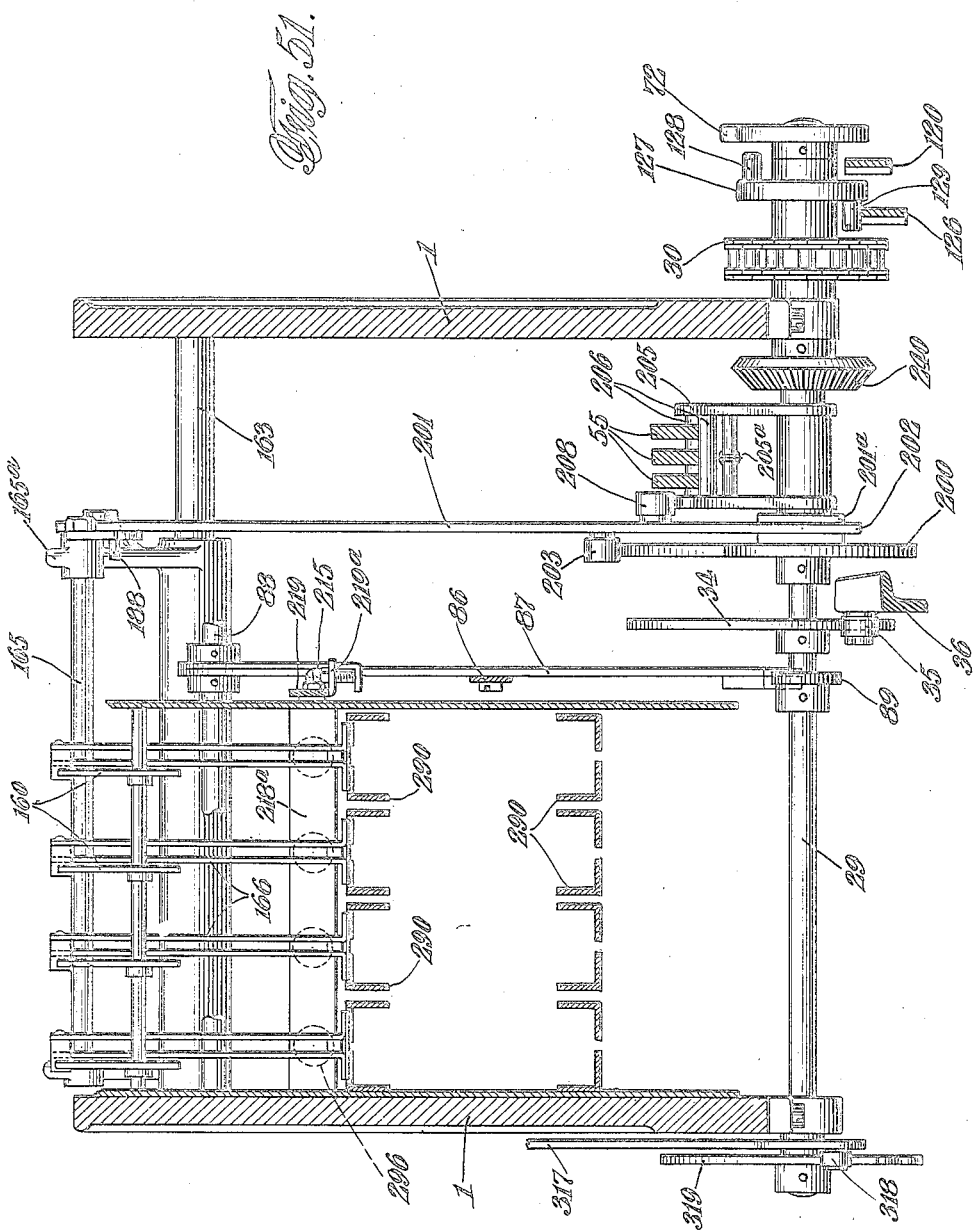

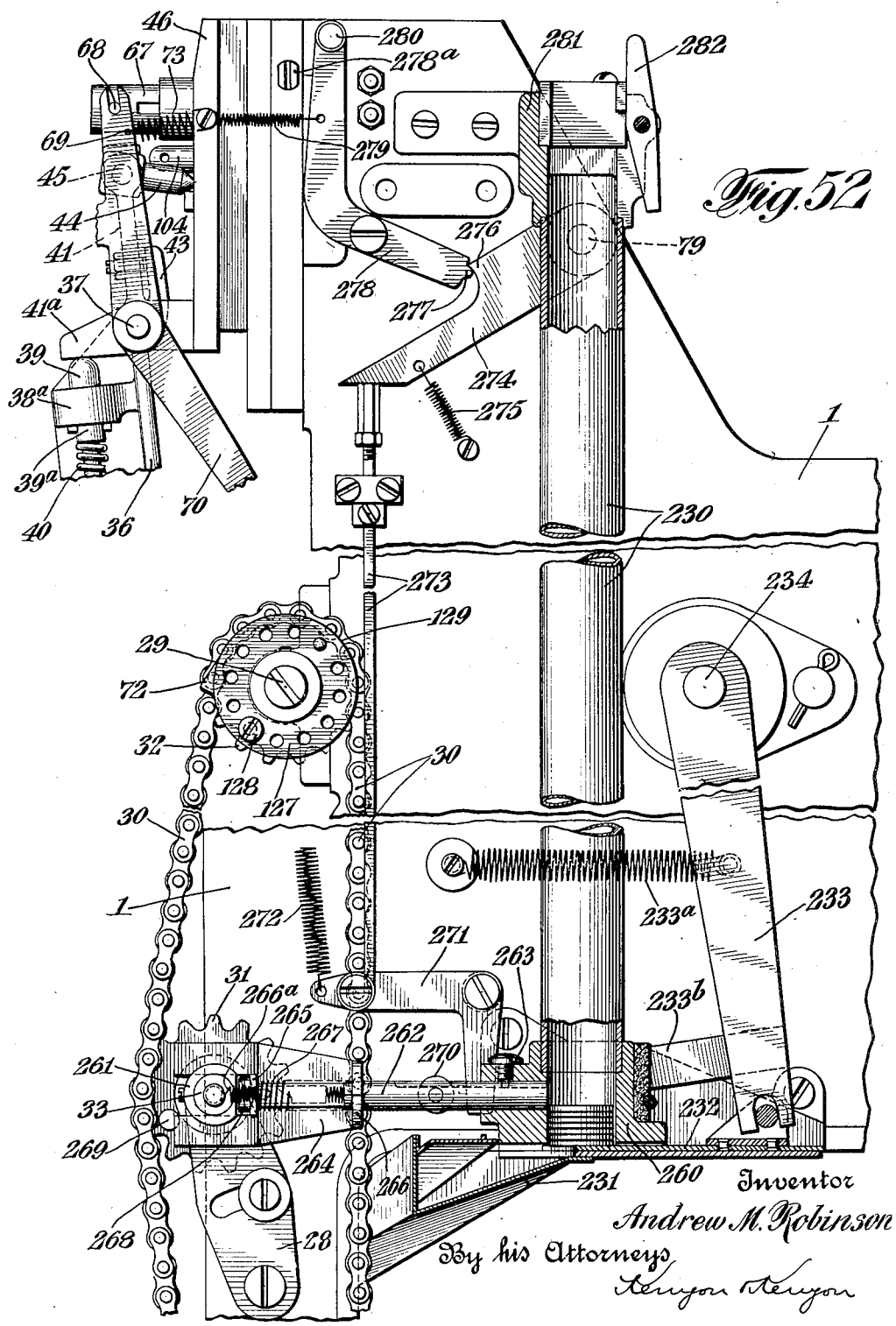

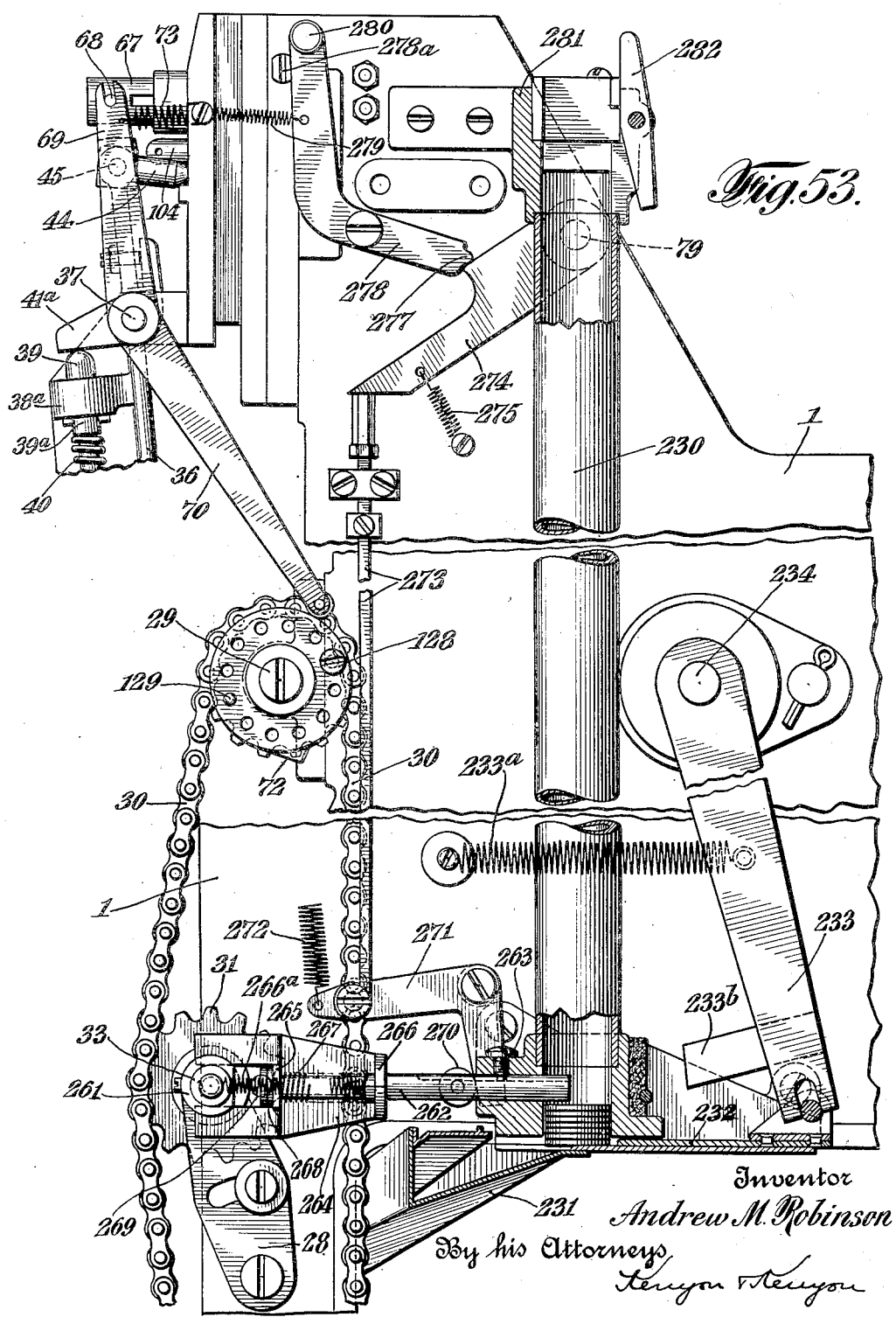

May 30, 1933.    A. M. ROBINSON    1,911,207
AUTOMATIC VENDING MACHINE
Filed July 14, 1928    39 Sheets-Sheet 32
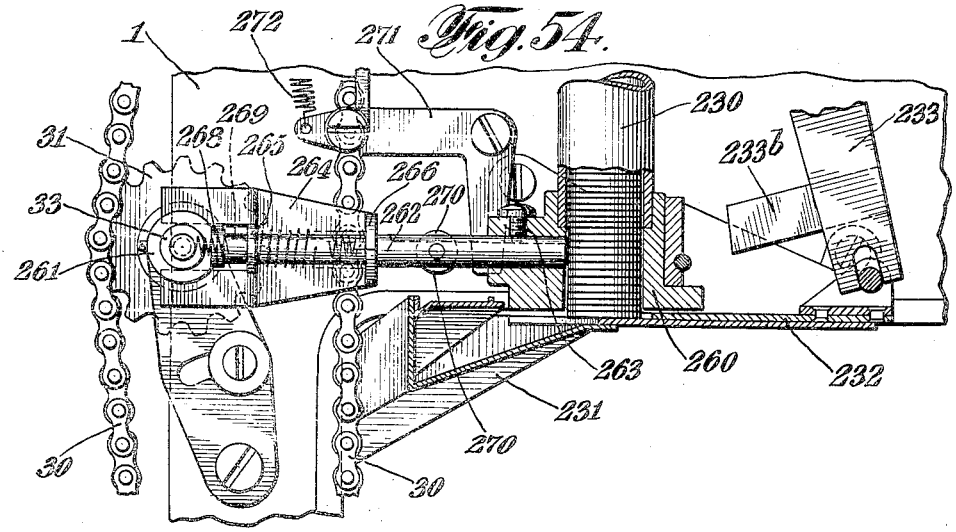
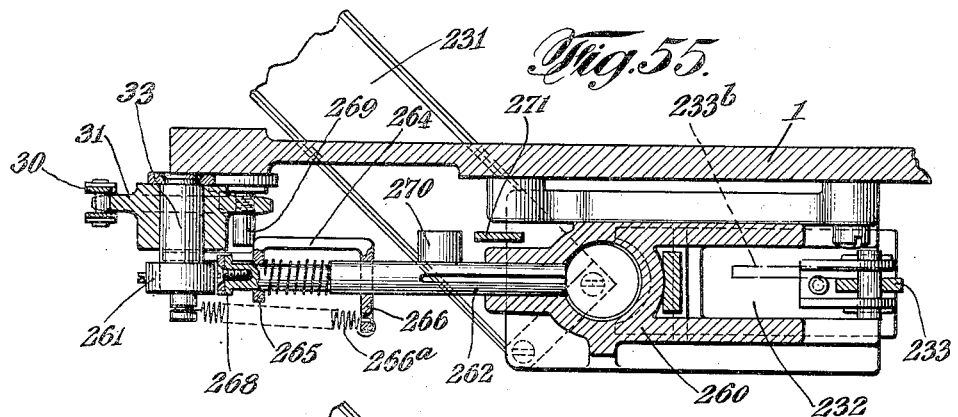
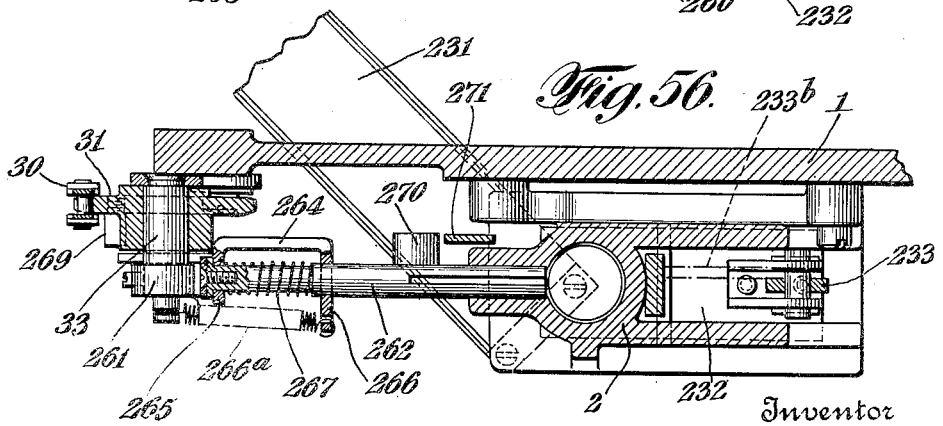
Inventor
Andrew M. Robinson
By his Attorneys
Kenyon & Kenyon

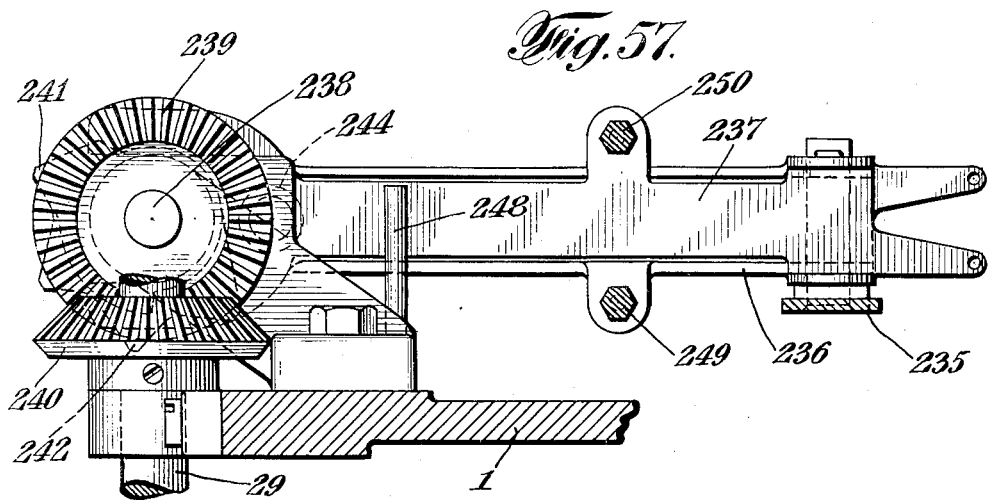
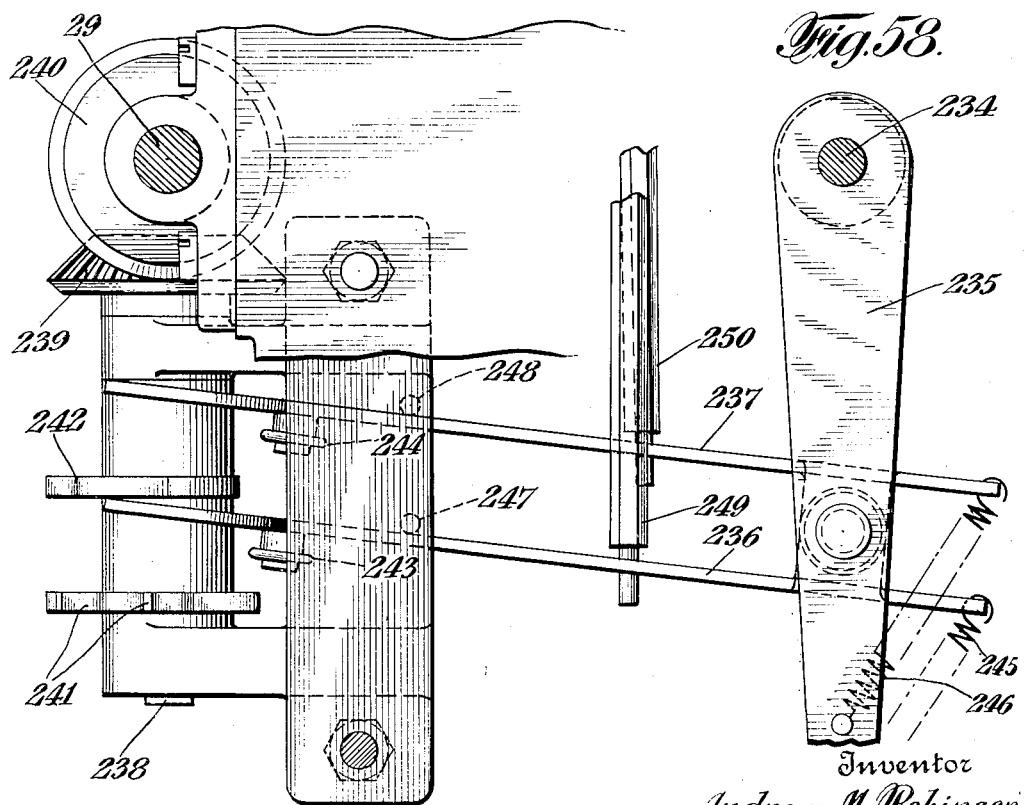

May 30, 1933.   A. M. ROBINSON   1,911,207
AUTOMATIC VENDING MACHINE
Filed July 14, 1928   39 Sheets-Sheet 34
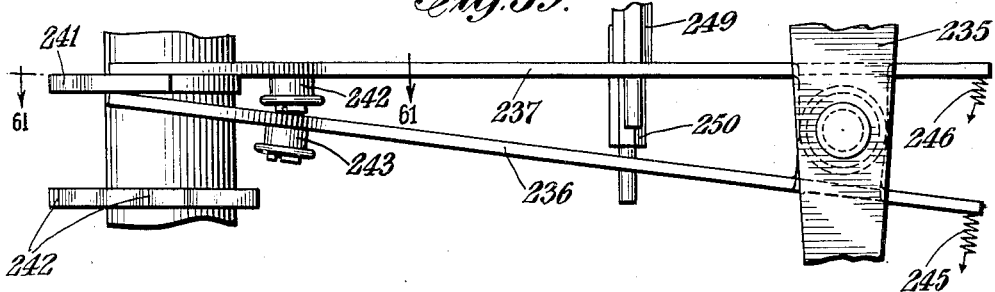
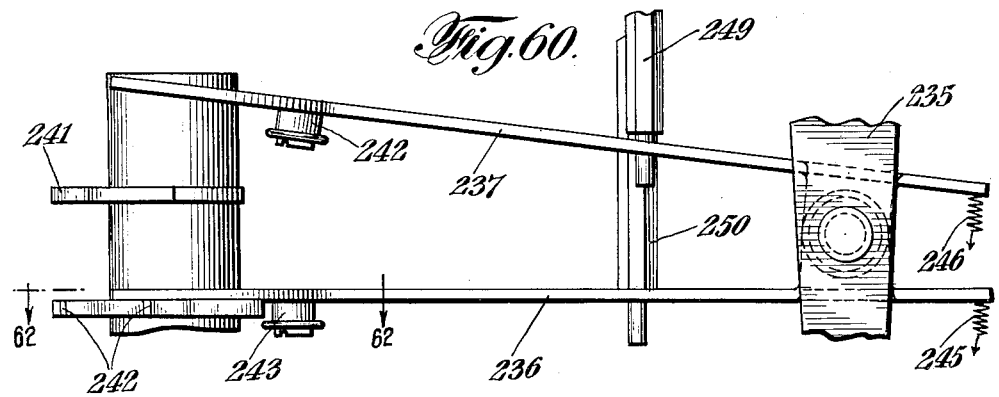
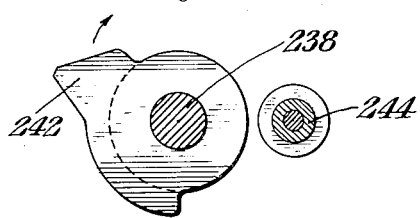
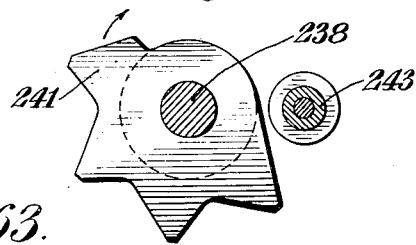
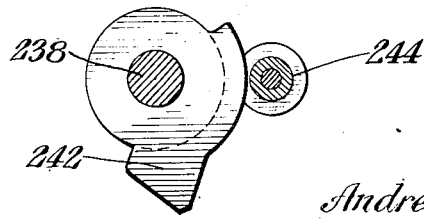
Inventor
Andrew M. Robinson
By his Attorneys
Kenyon & Kenyon

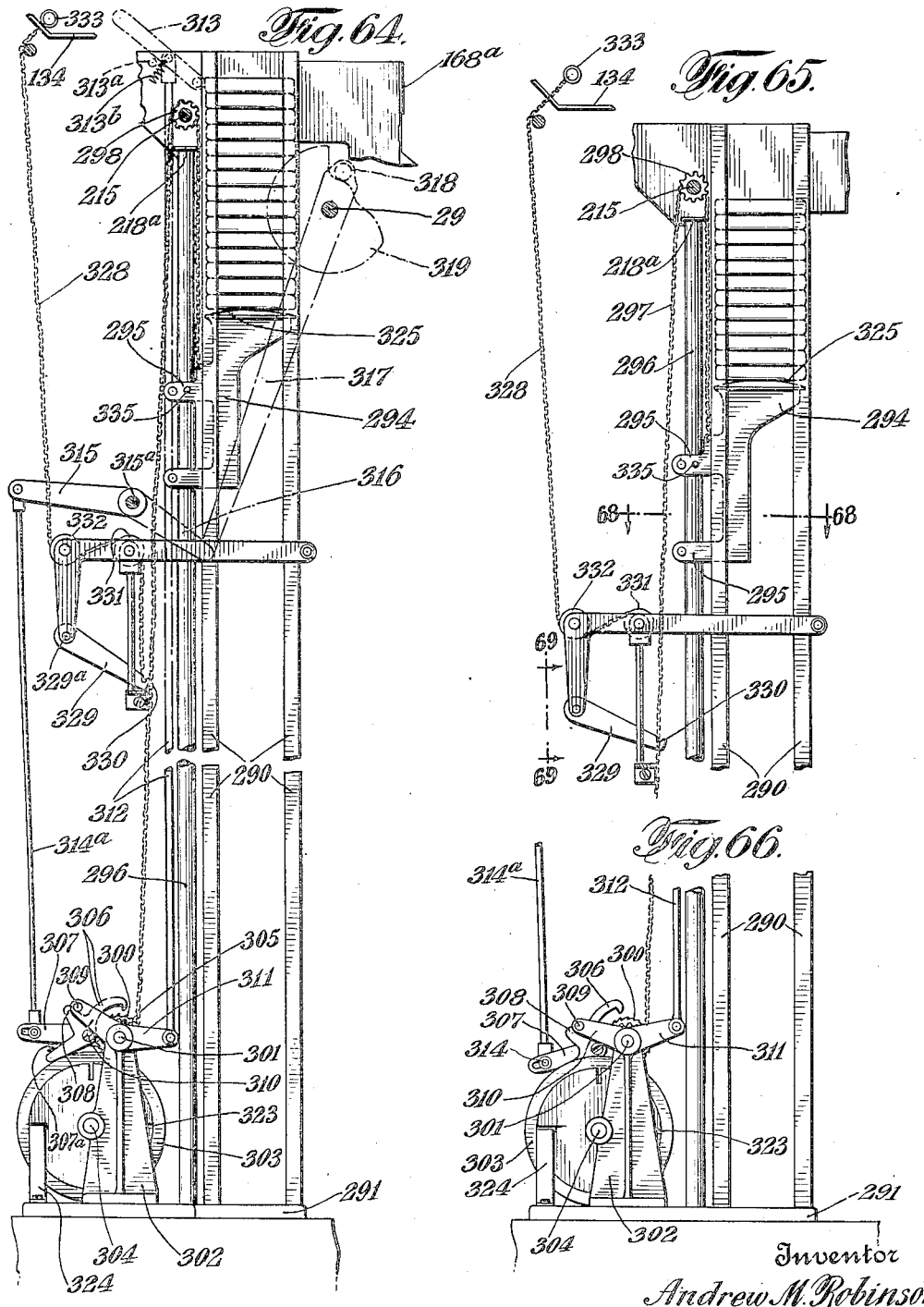

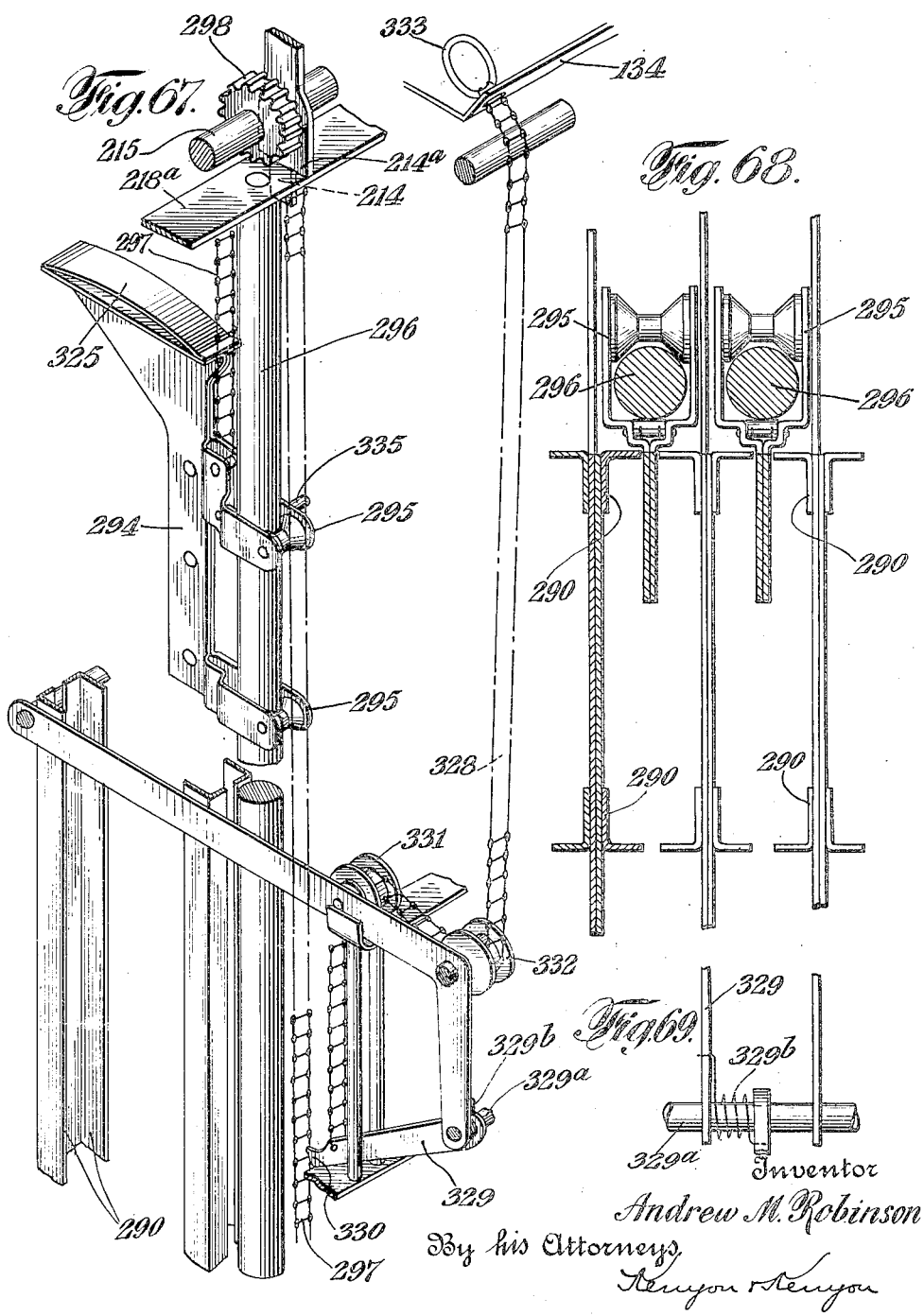

May 30, 1933. A. M. ROBINSON 1,911,207
AUTOMATIC VENDING MACHINE
Filed July 14, 1928 39 Sheets-Sheet 37
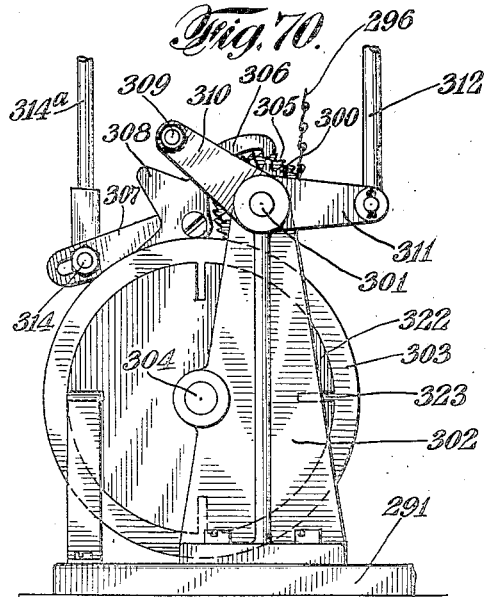
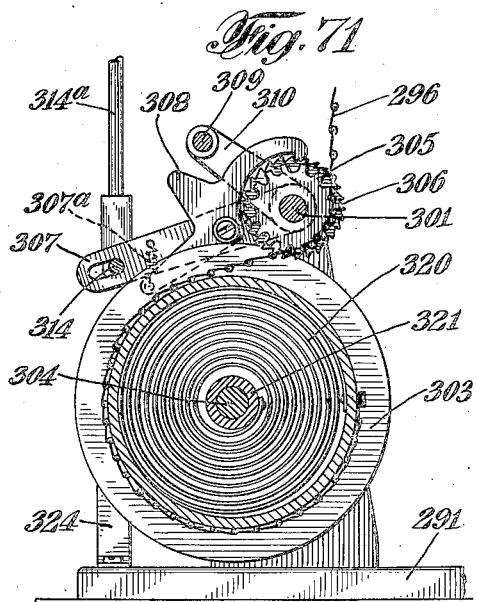
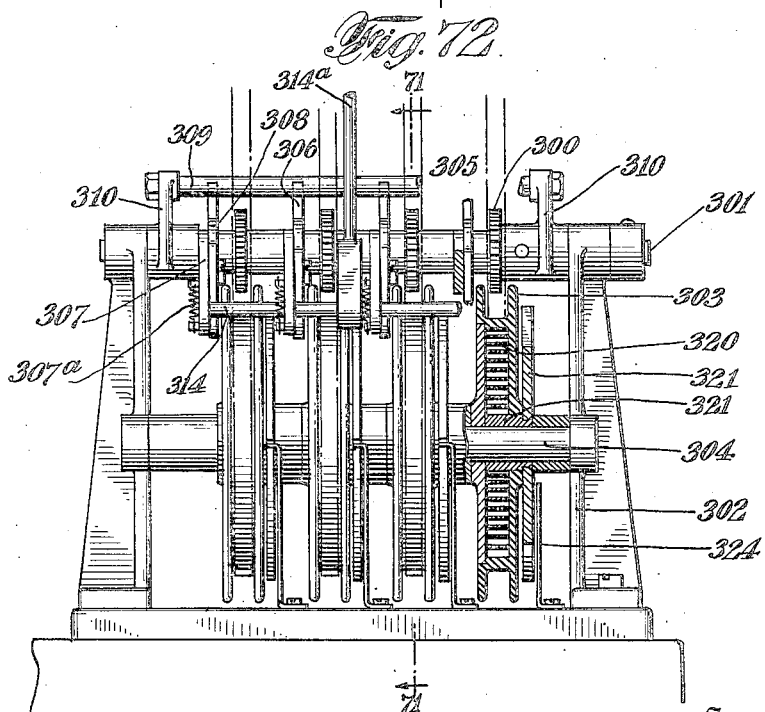
Inventor
Andrew M. Robinson
By his Attorneys
Kenyon & Kenyon May 30, 1933.  A. M. ROBINSON  1,911,207
AUTOMATIC VENDING MACHINE
Filed July 14, 1928    39 Sheets-Sheet 38
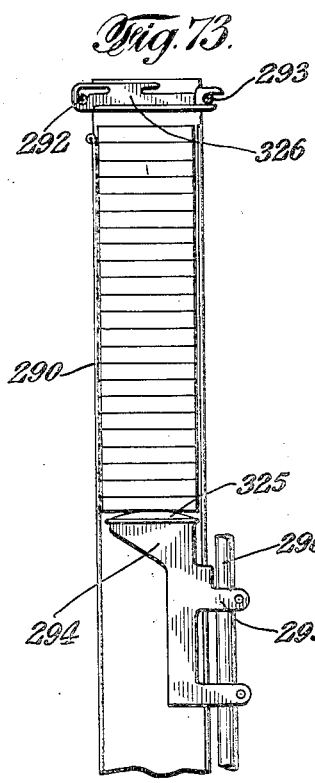
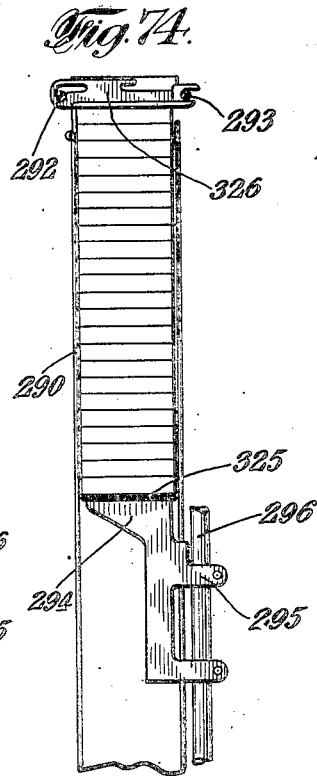
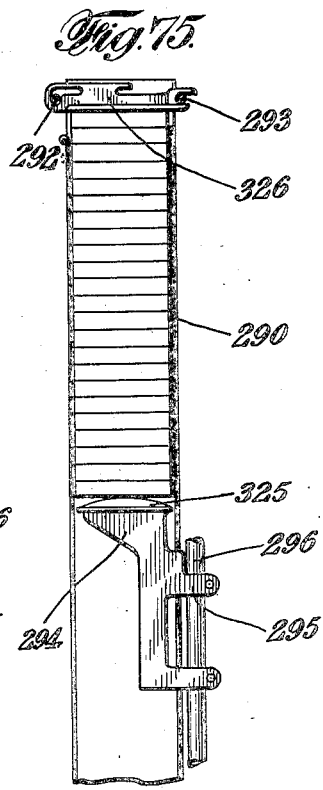
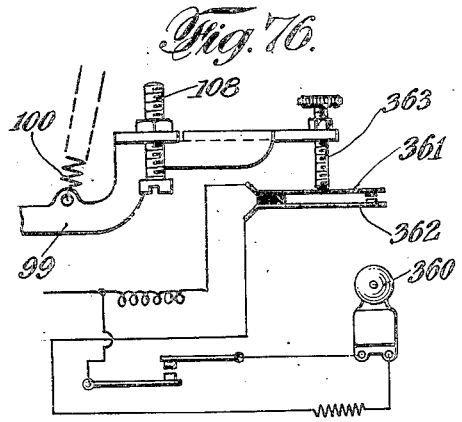
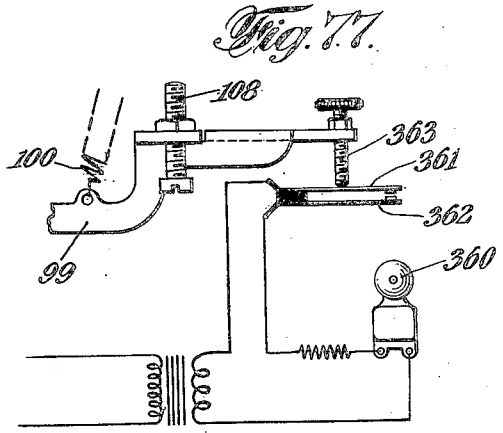
Inventor
Andrew M. Robinson
By his Attorneys
Kenyon & Kenyon

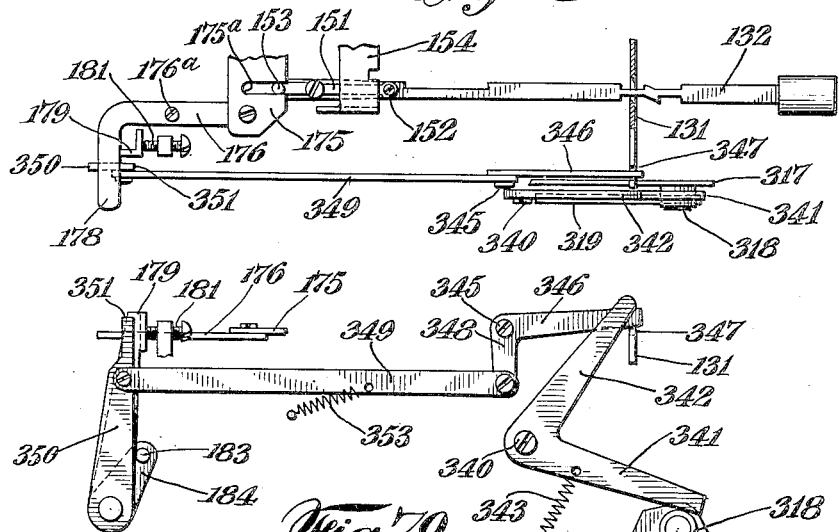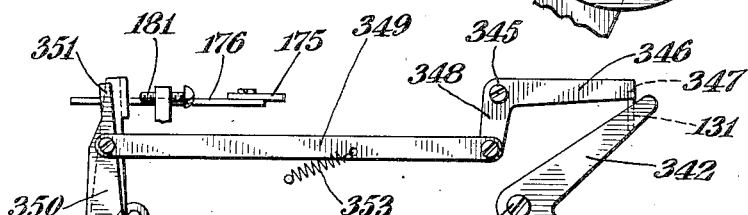

Patented May 30, 1933

1,911,207

UNITED STATES PATENT OFFICE

ANDREW M. ROBINSON, OF NEW YORK, N. Y., ASSIGNOR, BY MESNE ASSIGNMENTS, TO CAMCO SCALE CORPORATION, A CORPORATION OF NEW YORK

AUTOMATIC VENDING MACHINE

Application filed July 14, 1928. Serial No. 292,628.

This invention relates to vending machines and has for an object an automatic machine which vends several different articles of merchandise and is operable by coins of different denominations to effect delivery of a single article and the proper change to a purchaser who has operated the machine by the insertion of a coin of larger denomination than the price of the selected article.

The machine specifically disclosed hereing is designed for vending packages of gum. The invention may, however, equally well be embodied in a machine for vending other articles of merchandise.

Such a machine comprises a coin testing mechanism, a plurality of magazines for the articles to be vended, ejecting means individual to each magazine, push rods for selectively controlling the ejecting means, means common to all the ejecting means to prevent operation thereof, and releasable by the coin testing mechanism, a latch bar releasable upon the insertion of a coin into the testing mechanism normally to prevent operation of the selector rods, actuating mechanism controlled by the selector rods and change making mechanism controlled by the coin testing mechanism. The vended articles are delivered by a chute which also delivers the change, if any.

The actuating mechanism consists of a motor, a main drive shaft which makes one complete revolution for each operation of the machine and a clutch mechanism for operatively connecting the main drive shaft to the motor through reduction gearing. Two control circuits are provided for the motor, both circuits being normally open when the machine is at rest. One of the control circuits is closed upon the operation of a selector rod and the second control circuit is closed after a slight rotation of the main shaft.

The first or auxiliary motor control circuit is broken after the second or main motor control circuit is closed and the main motor control circuit is opened at the instant that the main shaft has completed a single revolution.

When the machine is at rest the latch bar prevents operation of any of the selector rods. However, the insertion of a coin in the coin testing mechanism moves the latch bar to release the selector rods and it is then possible to operate any one of them. Means are provided for preventing the operation of more than one selector rod and means are also provided for locking a selector bar in operated position until after the main shaft has nearly completed its revolution. The operation of a selector rod releases the ejector for the magazine corresponding to that particular selector rod and is also effective to close the auxiliary motor control circuit and render the clutch operative, thus starting the operation of the machine. As the main shaft starts to rotate, the main motor control circuit is closed.

A coin upon being inserted into the coin testing mechanism is supported by a stationary and a movable gauge finger which engage its periphery. In this position the coin is interposed between two reciprocating members, one of which will be termed a plunger and the other will be termed an anvil. The anvil is provided with a recess into which the plunger may extend if there is no coin interposed between them. The plunger is advanced toward the anvil until the space between them exactly equals the thickness of a good coin at which position movement of the plunger is stopped temporarily and the movable gauge finger is flicked. The plunger is then still further advanced to engage the coin and through the medium thereof moves the anvil against the action of a spring.

The movement of the anvil is effective to render inoperative the common means for preventing operation of the ejectors, thereby permitting operation of the particular ejector which was released by the operation of a selector rod. Upon operation of the ejecting mechanism the auxiliary motor control circuit is again opened. The anvil is temporarily held in its operated position while the plunger is returned to normal position thereby freeing the coin which drops into a collection chute. Further rotation of the main shaft resets the ejecting preventing means, the coin testing mechanism and releases the operated selector rod and after return of the selector rod to normal position, the latch bar again becomes effective to prevent operation of the selector rods. As the main shaft completes its revolution, the clutch is rendered inoperative, the main motor control circuit is opened and the machine comes to rest.

If a slug or a washer is presented to the machine, the anvil will not be operated to release the means for preventing operation of the ejecting mechanism. If a slug contains iron it is held above the gauge fingers by a magnet until after the plunger has been operated, after which the magnet is operated to release the slug. If the slug is of less diameter than a standard coin it will not be held by the gauge fingers and if it be of proper diameter but of less thickness than a standard coin, it will not be gripped between the plunger and anvil when the movable gauge finger is flicked, but will be allowed to drop. In either of these cases the slug will not be interposed between the plunger and the anvil and the former will enter the recess in the latter without effecting operation thereof. Likewise, if a washer be inserted and be interposed between the plunger and anvil, operation of the anvil will not be effected as the plunger will merely pass through the hole in the washer and into the recess in the anvil. However, should a slug be presented to the machine which is of the same diameter and thickness as a standard coin and which has no central opening, the anvil will not be operated. Ordinary slugs do not have the same tensile strength as a good coin and when subjected to the pressure exerted by the plunger will either break or be badly distorted, thus preventing functional operation of the anvil. As it is desirable to avoid breaking the slugs or badly distorting the same, means may be provided for preventing operation of the anvil upon a slight yielding of a slug when subjected to the pressure of the plunger. Operation of the machine by slugs is thus prevented.

The coins or slugs which have been presented to the machine are exhibited after the testing operations. Coins which have effected operation of the anvil are conducted directly to an exhibition chamber. Slugs, except such as are of less diameter or thickness than a standard coin and are not magnetic, are collected and also delivered to the exhibition chamber. The collection of these is effected by a coin valve which is normally set to return coins from the testing mechanism to the merchandise delivery chute but which is moved from such position immediately after flicking of the gauge finger into position to discharge into the exhibition chamber and is returned to normal position directly after operation of the magnet. All coins or slugs, except such as are of less diameter or thickness than a standard coin are collected and delivered to the exhibition chamber. In the exhibition chamber they are kept in visible position during a predetermined number of subsequent operations of the machine after which they are dropped into a coin box.

Each magazine is provided with an elevator upon which is supported a stack of articles of merchandise. In the magazine from which an article was ejected during the preceding operation of the machine, the elevator and stack of articles is lifted until further upward movement is prevented by contact of the stack with the top of the magazine. The stack of articles is clamped between the elevator and top of the magazine and is compressed. The elevator is then drawn downwardly sufficiently to relieve the stack of articles from compression and leave the top article in position to be ejected. In the remaining magazines the force applied to the elevator moves them upwardly the slight distance permitted by the compression of their stacks of articles, after which the elevators are returned to their former positions and the stacks are relieved from compression, the top articles being left in position to be ejected. Each stack of articles is but momentarily compressed and after operation of the elevators the top articles are in position to be ejected. At each operation of the machine, each elevator is subjected to an upward force. In this way, each elevator is subjected to an upward movement at each operation of the machine so that there is always an article in position to be delivered so long as there are any articles in the magazine and except during the elevating operation the articles of merchandise are not subject to pressure. The top article of each stack is thus always unrestrained at the time the ejecting operation takes place.

An article of merchandise upon ejection from the magazine is received and held by a display rack until another article is ejected from the same magazine and an article previously supported by the display rack is delivered to the purchaser. The display racks are visible to a prospective purchaser who receives the article which he has actually selected instead of an article corresponding to a displayed sample.

The articles of merchandise vended by this machine are all of the same price, namely, five cents a piece. Coin testing mechanisms, however, are provided for receiving coins of larger denomination than a nickel. Each operation of the machine is effective to deliver but one article of merchandise and means are provided for delivering change to the customer in the event that the machine has been operated by the insertion of a coin of a denomination larger than a nickel. The change making mechanism consists of a magazine for nickels together with mechanism for feeding nickels either singly or in groups from the magazine into a chute communicating with the merchandise delivery chute. When the anvil of any testing mechanism, except the nickel testing mechanism, is moved rearwardly to effect release of the means normally preventing operation of the ejecting means, it also causes the delivery from the magazine to the chute of enough nickels to make the correct change. Operation of the nickel testing anvil has no effect upon the change making mechanism. When the supply of nickels in the magazine falls below a predetermined number, the coin slots, except the nickel slot, are closed to prevent the insertion of coins therein. This prevents the possibility of a customer being given insufficient change upon operation of the machine by a coin of larger denomination than a nickel.

Means are provided for returning the customer's coin when the magazine corresponding to an operated selector rod is empty. Under such circumstances means carried by the elevator effects flicking of the movable gauge finger thus releasing the coin held by the same and permitting it to drop. This flicking of the finger takes place immediately upon operation of the selector rod and before the coin valve has been operated and the coin is discharged into the merchandise delivery chute. As there is no coin interposed between the plunger and the anvil, the former will enter the recess in the latter and there will be no operation of the ejecting mechanism.

Means are provided to sound an alarm when a spurious coin is presented to the machine. Also means are provided to prevent the return of the latch bar to normal position as the machine comes to rest in the event that a selector rod is held in operative position by a customer. In such event the latch bar is partially returned to normal position and then locked in an intermediate position in which it is ineffective to prevent movement of the selector rod. This prevents operation of the latch bar by the insertion of a coin in the coin testing mechanism when a selector rod is held in by a customer, which circumstance unless operation of the latch bar was prevented would result in locking the selector bar in operated position and prevent operation of the machine until after adjustment necessitating a partial disassembly of the machine.

The machine is enclosed in a casing which consists primarily of vertical panels and a cover. The front panel is provided with apertures through which the display racks and coin exhibition chamber are visible. It also has an aperture through which coins and merchandise may be removed from the lower end of the delivery chute. The coin slots project through an opening in the front panel and the heads of the selector rods are arranged in apertures in said panel. The panels and cover are easily removable when it is desired to have access to the various parts of the machine.

Other objects, novel features and advantages of this invention will be apparent from the following specification and accompanying drawings, wherein Fig. 1 is a front elevation of a machine embodying the invention with the front panel removed.

Fig. 2 is an elevation of the right side of the machine with the panel removed.

Fig. 3 is an elevation of the rear of the machine with the panel removed.

Fig. 4 is a left side elevation of the machine with the panel removed.

Fig. 5 is a front elevation of the main drive shaft and clutch.

Fig. 6 is a section on the line 6—6 of Fig. 5.

Fig. 7 is a section on the line 7—7 of Fig. 5.

Fig. 8 is an end view of the main drive shaft and an elevation of the motor and motor control relay.

Fig. 9 is a wiring diagram of the motor control circuits.

Fig. 10 is a front elevation of the coin testing mechanism and the selector rods.

Fig. 11 is a plan view of the coin testing mechanism.

Fig. 12 is a rear view of the coin testing mechanism.

Fig. 13 is a section on the line 13—13 of Fig. 11 prior to the insertion of a coin.

Fig. 14 is a view similar to Fig. 13 after the insertion of a coin, but with coin valve and collection chute removed.

Fig. 15 is a section on the line 15—15 of Fig. 10.

Fig. 16 is a view similar to Fig. 15 with the parts in a different position.

Fig. 20 is a fragmentary side elevation partly in section of the mechanism disclosed in Fig. 17 with the elements in another of the positions assumed by them during the operation of the machine.

Fig. 21 is a view similar to Fig. 18 with the elements in the position corresponding to Fig. 20.

Fig. 22 is a view similar to Fig. 19 but with the elements in the position corresponding to Fig. 20.

Fig. 26 is a fragmentary section on the line 26—26 of Fig. 27.

Fig. 27 is a fragmentary plan view of the mechanism for preventing operation of the anvil when a slug is interposed between the plunger and anvil of the coin testing mechanism.

Fig. 28 is a front elevation of the coin exhibiting mechanism.

Fig. 29 is a side elevation of such mechanism.

Fig. 30 is a section taken on the line 30—30 of Fig. 29.

Fig. 31 is a section taken on the line 31—31 of Fig. 29.

Fig. 32 is a plan view of the selector rods and the mechanism cooperating therewith.

Fig. 33 is a section on the line 33—33 of Fig. 32.

Fig. 34 is a fragmentary section on the line 34—34 of Fig. 35.

Fig. 35 is a section on the line 35—35 of Fig. 32.

Figs. 36 and 37 are views similar to Figs. 34 and 35, but with the elements in the positions assumed when a selector rod is operated.

Figs. 38 and 39 are views similar to Figs. 36 and 37, but with the elements in the positions assumed thereby just prior to the return of the selector rod.

Figs. 40 and 41 are views similar respectively to Figs. 36 and 37 with the elements in the position assumed thereby when the magazine is exhausted.

Fig. 42 is a vertical section through the ejector mechanism when at rest.

Fig. 43 is a section similar to Fig. 42 with the mechanism in the ejecting position.

Fig. 44 is a fragmentary perspective view of the ejecting mechanism and mechanism cooperating therewith.

Fig. 45 is a fragmentary plan view of mechanism controlling the release of the selector rods.

Fig. 46 is a fragmentary elevation of mechanism controlling the operation of the mechanism disclosed in Fig. 45.

Figs. 47 and 48 are views similar respectively to Figs. 45 and 46 and showing a different position assumed by the elements disclosed therein.

Fig. 49 is a section on the line 49—49 of Fig. 3.

Fig. 50 is a section on the line 50—50 of Fig. 12.

Fig. 51 is a section on the line 51—51 of Fig. 50.

Fig. 52 is an elevation partially in section of the change making mechanism.

Fig. 53 is a similar view to Fig. 52 showing the position assumed by the various elements when the supply of coins for making change is depleted.

Fig. 54 is a fragmentary elevation of the change making mechanism.

Fig. 55 is a section on the line 55—55 of Fig. 54.

Fig. 56 is a similar view with the parts in a different position.

Fig. 57 is a fragmentary plan view of the mechanism for controlling the operation of the change making mechanism.

Fig. 58 is a fragmentary side elevation of the mechanism disclosed in Fig. 56.

Figs. 59 and 60 are fragmentary views of the mechanism disclosed in Figs. 57 and 58 showing different positions assumed by the various elements.

Fig. 61 is a section on the line 61—61 of Fig. 59.

Fig. 62 is a section on the line 62—62 of Fig. 60.

Fig. 63 is a view similar to Fig. 61 showing a different position assumed by the elements.

Fig. 64 is a side elevation of the magazines and the operating mechanism for the elevators.

Figs. 65 and 66 are fragmentary views similar to Fig. 64 but showing different positions assumed by the various elements.

Fig. 67 is a fragmentary perspective view of the magazine and mechanism associated therewith.

Fig. 68 is a section on the line 68—68 of Fig. 65.

Fig. 69 is a section on the line 69—69 of Fig. 65.

Fig. 70 is a side elevation of a portion of the operating mechanism for the elevators.

Fig. 71 is a section on the line 71—71 of Fig. 72.

Fig. 72 is a rear elevation partially in section of the mechanism disclosed in Fig. 70.

Figs. 73, 74 and 75 are vertical sections through a magazine showing successive steps in the feeding of the articles of merchandise.

Figs. 76 and 77 are circuit diagrams of an alarm mechanism.

Fig. 78 is a plan view of mechanism for controlling the operation of the latch bar for the selector rods.

Figs. 79 and 80 are side elevations of such mechanism, in different positions assumed thereby.

Figure 17:
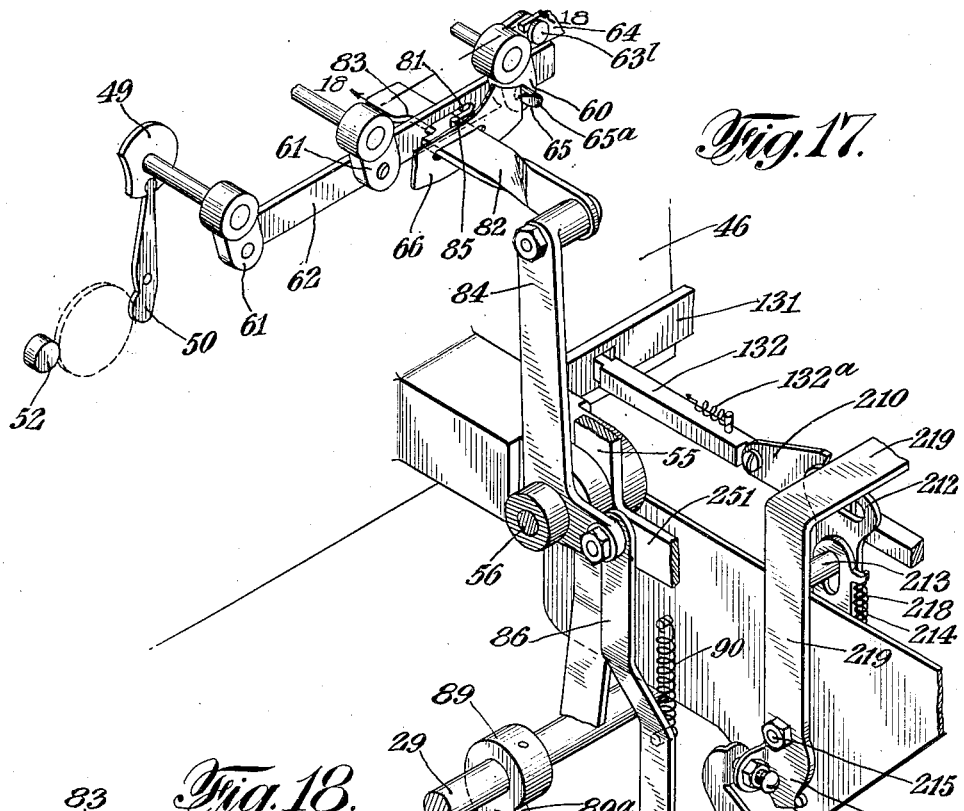
Fig. 17 is a perspective view of mechanism for operating the movable gauge fingers.

A machine embodying this invention comprises a frame (1) enclosed by a casing (1a) and which supports a driving motor (2). (Figs. 1 and 8). Energization of the motor is controlled by a relay (2a) (Figs. 8 and 9) which is connected through a resistance R in series parallel with a pair of contacts 3 and 3a and a pair of contacts 4 and 4a. The contacts 3 and 3a are self closing while the contacts 4 and 4a are self opening. The circuit for which the contacts 3 and 3a comprise the control switch will be termed the main motor circuit and the circuit for which the contacts 4 and 4a comprise the control switch will be termed the auxiliary motor circuit. When either of these circuits, which are both open when the machine is at rest, is closed the motor is caused to operate. Means are provided for first closing the auxiliary circuit to start the motor, then closing the main circuit, next opening the auxiliary circuit and finally opening the main circuit to stop the motor upon one complete revolution of the main shaft later to be described.

A shaft 5 (Figs. 5, 6 and 7) is supported from the frame by brackets 6 and 6a and a shaft 7 (Figs. 2, 5, 6 and 7) is supported from the frame by the brackets 8 and 8a. A gear 9 is attached to the shaft 5 and is driven by the motor 2 through a chain of reduction gears. A clutch member 10 (Figs. 1 and 5) having teeth 10a is fastened to the shaft 5. A co-acting clutch member 11 (Figs. 1 and 5) having teeth 11a is slidably keyed to the shaft 7 by means of a pin 12 passing through the shaft and arranged in slots in the clutch member. A helical spring 13 surrounds the shaft 7 and is interposed between one end of the clutch member 11 and the bracket 8. A sprocket 14 is rotatably mounted on the shaft 7 and is provided with a disk 15 to which is pivoted an arm 16 provided with a pin 17 and having one end of a coil spring 18 attached to its free end, the other end of the spring 18 being attached to a pin 19 carried by the disk 15. A collar 20 is fixed to the shaft 7 and is interposed between the disk 15 and the bracket 8a, the collar being provided with a recess 20a to receive the pin 17. The disk 15 is locked by means of the arm 16 and pin 17 to the collar 20 for rotation therewith, so that rotation of the main shaft 7 effects rotation of the sprocket 14. The disk 15 is only locked frictionally to the collar 20 so that if the load on the sprocket 14 becomes excessive the pin 17 rides outwardly along the side of the recess 20a against the action of the spring 18, thereby permitting the collar and shaft 7 to rotate independently of the disk 15 and sprocket 14.

To the end of the shaft 7 projecting beyond the bracket 8a is fixed a cam 21 which is electrically insulated from the shaft by a bushing 22 (Fig. 8). The contact members 3 and 3a are mounted on the bracket 8a and are insulated from each other and from the bracket. The contact member 3 is longer than the contact member 3a and is arranged to be engaged by the rise of the cam 21 to move the same out of engagement with the contact member 3a. During contact of the rise with the contact member 3 the main motor circuit is opened but at the other times the two contact members spring in engagement and the main motor circuit is closed.

The clutch member 11 is provided with a tapering cam groove or slot 25 (Figs. 5 and 7) into which normally projects a stud 26 mounted on one end of a lever 27 pivoted to the bracket 8 (Fig. 6), the other end of the lever being attached to an operating link 28. When the machine is at rest the stud 26 is seated in the small end of the groove, thereby preventing rotation of the shaft 7 and holding the clutch teeth 11a out of engagement with the clutch teeth 10a. Withdrawal of the stud 26, by mechanism later to be described, from the cam groove 25 permits rotation of the shaft 7 and also allows the spring 13 to move the clutch member 11 to bring the clutch teeth 11a into engagement with the clutch teeth 10a. After the shaft 7 and clutch member 11 have been rotated a predetermined amount, the stud 26 is again projected into the cam groove 25 by means later to be described and by contact with the edge of the groove disengages the clutch teeth 11a from the clutch teeth 10a and also engages the end of the groove to limit the clutch member 11 and the shaft 7 to but one complete revolution for each operation of the machine.

A counter shaft 29 (Figs. 1, 2, 15, 16 and 17) mounted in the frame 1 is driven from the main shaft 7 by a chain 30 (Fig. 2) passing over the sprocket 14 and a sprocket 32 keyed to the shaft 29. An adjustable bracket 28a (Fig. 2) supports a sprocket 31 by means of a stud shaft 33 carried by the bracket, the sprocket also being driven by the chain 30. An idler sprocket 30a (Fig. 2) is adjustably supported by the frame 1 for adjusting the tension of the chain 30. A cam 34 (Figs. 1 and 15) is mounted on the shaft 29 and is engaged by a roller 35 carried by the lower end of a lever 36 rotatably mounted on the shaft 37 (Figs. 5 and 10). The lever 36 (Figs. 10 and 15) is provided with two pairs of abutments 38 and 38a in which are slidably mounted plungers 39.

Helical springs 40 surround the plungers 39 and have their lower ends resting on the abutments 38 and their upper ends engaging shoulders formed by the enlarged heads 39a of the plungers 39 and pins 39b limit upward movement of the plungers 39. The heads 39a of the plungers 39 engage lugs 41a of a bracket 41 rotatably mounted on the shaft 37. The bracket 41 is equipped with a pair of adjusting screws 42 the ends of which engage a portion 43 of the lever 36 projecting beyond the shaft 38 and limit movement of the bracket 41 relative to the lever 36 under the influence of the springs 40. Three plungers 44 (Figs. 10 and 15) are pivotally attached to the upper end of the bracket 41 by a shaft 45 passing through eyes in the ends of the plungers and in the end of the bracket 41.

A coil spring 45 (Fig. 15) has one end fastened to the lever 36 and the other end to the frame 1 for the purpose of holding the roller 35 constantly in engagement with the cam 34. The cam 34 is so shaped that, by rotation thereof, the lever 36 is first caused to rotate slightly and then is temporarily held stationary after which it is rotated the full extent of its movement and then is allowed to return to normal position under the influence of its spring 45. This oscillation of the lever 36 normally causes corresponding reciprocation of the plungers 44. However, if for some reason movement of the plungers 44 should be obstructed, the springs 40 will yield, thus allowing movement of the plungers 39 relative to the abutments 38 and 38a and permitting normal oscillation of the lever 36.

The shaft 37 is supported by lugs extending from a head 46 which is fastened to the bracket 46a comprising a part of the frame 1. Coin slots 48 (Figs. 10 and 11) are provided in the head 46 of proper size to receive respectively, from left to right, a quarter, dime and a nickel. Below the coin slots are rotatably mounted members 49 (Figs. 13 and 14), each having a recess of the same curvature as the coin for which the slot is intended. In normal position, the members have the portions at the lower ends of the recesses extending into the coin slots to be engaged by a coin. A coin inserted through a slot engages and rotates the member thereby projecting the portion at the top of the recess into the slot and closing the same against the insertion of another coin until after the machine has been operated.

Gauge fingers 50 are pivotally mounted on pins 51 and have their upper ends seated in notches in the members 49, so that the fingers and members move in unison. Pins 52 are provided to co-operate with the lower ends of the fingers (when the fingers are in one position) to engage at substantially diametrically opposite points, the peripheries of coins which have been inserted through the coin slots. The lower portion of the back of the head 46 is recessed and the space thus provided between the head and bracket 46a is divided by a partition 47 to a front compartment 47a and a rear compartment 47b. The partition 47 is so arranged that the rear compartment 47b is of slightly greater breadth than a quarter. The plungers 44 are arranged to pass through apertures in the head 46 and in alinement with the plungers, anvils 53 are slidably mounted in casings 53a and have shanks 54 connected to levers 55 pivotally mounted on a shaft 56 (Figs. 11, 12, 15, 16 and 17). Springs 57 press the anvils 53 toward the plungers 44 and the extent of movement is limited by the stops 58 mounted on the shanks 54. The front ends of the anvils 53 are cut back centrally to provide lugs 59 (Figs. 13 and 15) and are provided with axial recesses. Each pair of fingers 50 and pins 52 is arranged to support a coin between a plunger 44 and its respective anvils 53. The ends of the lugs 59 are normally flush with the rear wall of the coin slots and overlie the partition 47 (Fig. 15).

Figure 18:
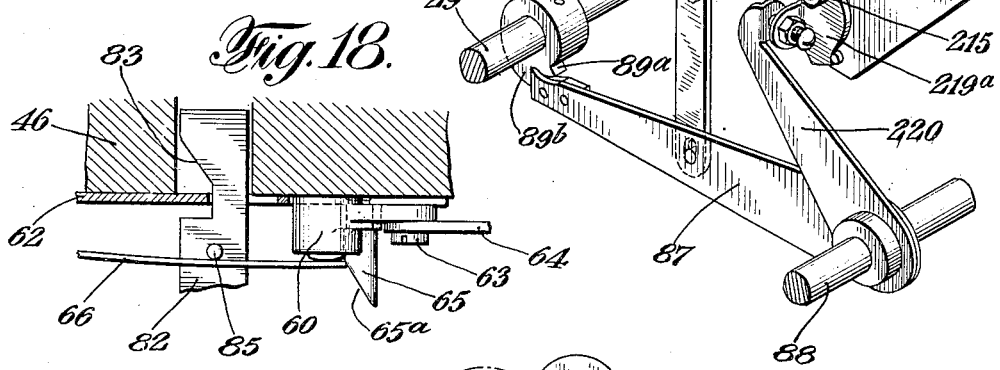
Fig. 18 is a fragmentary detail section substantially on the line 18—18 of Fig. 17.
Figure 19:
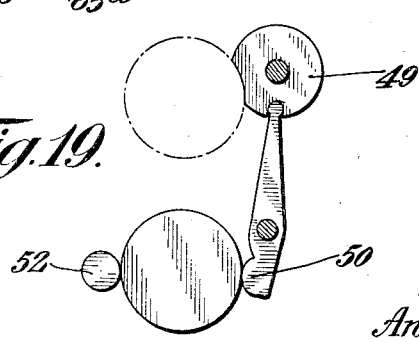
Fig. 19 is a schematic elevation of the diameter testing mechanism upon insertion of coin.

The rotatable member 49 for the quarter slot is mounted on a shaft to which is fixed a bell crank lever 60 and the other rotatable members 49 are mounted on shafts to which are fixed arms 61 which are pivotally connected to a bar 62 which is also pivotally connected to one arm of the bell crank lever 60. A pin 63 carried by the second arm of the bell crank lever 60 fits in a slot in one arm of a second bell crank lever 64 (Fig. 13). The pin 65 which connects the bar 62 to the first-mentioned arm of the bell crank lever 60 projects beyond said arm and has an oblique face 65a on the point of which, when the bar 62 is in normal position, rests the free end of a leaf spring 66 attached at one end to the bracket 46 (Fig. 11). Movement of the bar 62 out of normal position takes the point of the pin 65 out from under the end of the spring whereupon the end of the spring engages the oblique surface of the pin and tends to move and hold the bar in out-of-normal position (Fig. 18). Directly above each plunger 44 is slidably mounted a magnet 67 the pole faces of which are normally flush with the front wall of the coin slot (Figs. 10, 11 and 15). These magnets are attached to a bar 68 seated in sockets in the upper end of an operating member 69 fixed on the shaft 37 (Fig. 10). To one end of the shaft 37 is attached an arm 70 which is provided with a roller 71 to engage a cam 72 mounted on the shaft 29 (Fig. 2). A spring 73 keeps the roller 71 in contact with the cam 72.

A pair of pins 74 (Figs. 11 and 15) are slidably mounted in the bracket 46a and the supports 75 and are arranged to project one into the quarter slot and the other into the dime slot. Springs 76 interposed between the supports 75 and collars 77 on the pins 74 exert pressure tending to force the pins into the coin slots. The pins are normally held retracted by an arm 78 carried by a shaft 79 and engaging a bar 80 connecting the ends of the pins 74.

A slot 81 (Figs. 17 and 18) is cut in the bar 62 and a slide 82 extends through this slot and through a slot in the springs 66. The slide 82 is cut out as at 83 to permit movement of the bar 62 and is shaped to provide a cam surface by means of which movement of the slide 82 in one direction is effective to return the bar 62 to normal position. The slide 82 is equipped with a pin 85 to engage the spring 66 to flex the same when the slide 82 is operated. A bell crank lever 84 (Figs. 17 and 20) has one arm connected to the slide 82 and its other arm is connected to a link 86 which in turn is pivotally connected to an arm 87 fastened to the shaft 88. The free end of the arm 87 engages a cam 89 mounted on the shaft 29 and provided with two rises which are designated 89a and 89b respectively, the rise 89a being of less height than the rise 89b. The rise 89a is effective to flick the lever 87 shortly after the shaft 29 starts to rotate while the rise 89b is not effective to move the lever 87 until the shaft has nearly completed a revolution. A spring 90 holds the end of the arm 87 in contact with the surface of the cam 89.

The compartment 47a (Figs. 13 and 15) has a discharge aperture which communicates with a coin valve 91 pivotally supported by the frame and which in one position communicates with a chute 92 and in another position communicates with a chute 92a. The compartment 47b has a discharge aperture which communicates with a chute 93 into which the chute 92a discharges. The chute 92 is the coin return chute while chute 93 is the coin collection chute. A lever 94 for moving the coin chute from one position to the other is pivoted to the frame and has one end mounted in the path of movement of a pin 95 carried by the cam 34. The lever 94 is also provided with a spring 96 which tends to pull the lever 94 into contact with the stop pin 97 when the lower end of the lever is not engaged by the pin 95.

The operation of the coin testing mechanism will now be explained. Before a coin is inserted through a coin slot, the motor 2 is at rest, the clutch teeth 10a and 11a are out of engagement (Fig. 5), the contacts 3 and 3a are held apart by the cam 21 (Fig. 8), the members 49 (Fig. 13) are so turned that the lower ends of their cutout portions project beneath the coin slot, the end of the leaf spring 66 rests on the end of the pin 65 (Fig. 11), the end of the arm 87 is seated between the rises 89a and 89b of the cam 89 (Fig. 20) and the contacts 4 and 4a are out of engagement (Fig. 49). The coin valve 91 (Fig. 10) is set to discharge into the chute 92, the pole faces of the magnet 91 (Fig. 10) are flush with the front walls of the coin slots, the faces of the lugs 59 of the anvil 53 are flush with the rear walls of the coin slots and the plungers 44 are in their retracted positions.

Now assume that a coin C is inserted through one of the slots, thereby causing rotation of a member 49, thus bringing the lower end of a finger 50 into the position shown in Fig. 14. The coin drops past the pole faces of the magnet 67 into contact with the lower end of a finger 50 and a pin 52 by which it is held in front of and in contact with the faces of the lugs 59 of an anvil 53 (Fig. 15).

Rotation of one member 49 causes movement of the bar 62, thereby causing rotation of the other members 49 so that each coin slot is closed against the insertion of a coin. By such movement, one edge of the slot in the bar 62 is located in the path of the cam surface 83 of the slot in the slide 82 and the bell crank lever 64 (Figs. 13 and 14) is rotated.

The movement of the bell crank lever 64 effects the release of selector rods which will later be described in detail and upon operation of one of the selector rods, the contacts 4 and and 4a are brought into engagement to close the auxiliary motor circuit by mechanism later to be described in detail, and the motor 2 is started. Likewise, operation of a selector bar is effective, by mechanism later to be described, to pull up the link 28, thereby operating the lever 27 to move the stud 26 out of the cam groove 25 of the clutch member 11, thereby allowing the spring 13 to slide the clutch member 11 toward the clutch member 10 to bring the teeth 10a into engagement with the teeth 11a (Fig. 7). The pin 65 is moved out from under the end of the spring 66 and the latter moves into engagement with the oblique surface 65a of the pin (Fig. 17), thereby retaining the bar 62 in the position to which it has been moved.

Rotation of the main driving shaft 7 causes rotation of the sprocket wheel 14 and through the chain 30 causes rotation of the shaft 29. Also the cam 21 is disengaged from the contact 3, thereby allowing the latter to engage the contact 3a and close the main motor circuit. The plungers 44 are then moved toward the anvils 53, this movement being effected by the cam 34, roller 35, lever 36, plunger 39, lugs 41a and bracket 41. When the distance between the point of the plunger and the plane of the faces of the lugs 59 is just equal to the thickness of a good coin, the fingers 50 are flicked and the coin C is held between the point of a plunger 44 and the lugs 59 of an anvil 53. The flicking of the fingers 50 is caused by engagement of the rise 89a of the cam 89 with the arm 87 to effect slight oscillation thereof, thereby causing corresponding reciprocation of the slide 82 (Figs. 20, 21 and 22).

Engagement of the cam surface 83 of the slide 82 with the edge of the slot in bar 62 causes movement of such bar which movement is communicated through the members 49 to the fingers 50. The pin 85 on the slide 82 at the same time engages the spring 66 and moves the free end thereof along the oblique surface 65a of the pin 65 sufficiently to permit the movement of bar 62. The movement effected by the rise 89a is not sufficient however to disengage the end of the spring 66 from the oblique surface 65a so that as soon as the end of the arm 87 passes off the rise 89a and is returned to normal position by the spring 90, the bar 62 is caused to snap back to its previous position due to the action of the spring 66.

Directly after the flicking of the fingers 50, the pin 95 on the cam 34 moves out of engagement with the lower end of the lever 94 thereby allowing the spring 96 to operate the lever 94 to swing the coin valve 91 out of communication with the chute 92 and into communication with the chute 92a. A plunger 44 then pushes the coin against the lugs 59 of an anvil 53, thereby moving the latter rearwardly against the action of its spring 57 until the coin is located directly above the compartment 47b (Fig. 16). A lever 55 is moved by the anvil 53 to cause operation of mechanism later to be described, by means of which the delivery operation of the machine is effected and change, if any, is delivered. Only one anvil is operated as the remaining plungers enter the recesses in their respective anvils.

The anvil 53 is temporarily held in retracted position by mechanism later to be described while the plunger 44 is returned to its original position by the spring 45. The return movement of the plunger 44 releases the coin and permits it to drop into the compartment 47b from which it is delivered to the chute 93.

Figure 23:
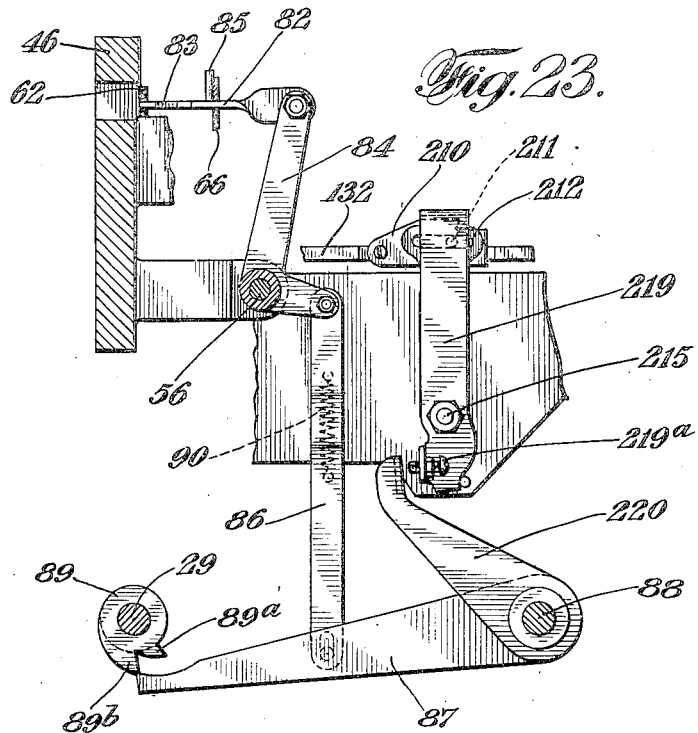
Figs. 23, 24 and 25 are views similar respectively to Figs. 20, 21 and 22, but with the elements in still different corresponding positions.
Figure 24:
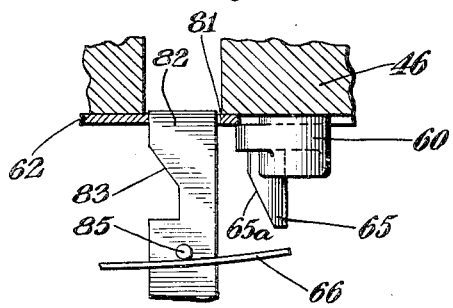
Figure 25:
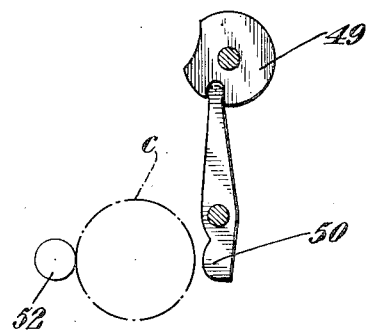

As the shaft 29 nears the completion of its revolution the rise 89b of the cam 89 actuates the arm 87, thereby pulling the slide 82 the full extent of its movement (Figs. 23, 24 and 25). The pin 85 flexes the spring 66 sufficiently to clear the end of the pin 65 and the engagement of the cam surface 83 with the bar 62 returns the latter to its original position, thus rotating the members 49 to open the coin slots and thereby moving the fingers 50 out of coin engaging position.

As the end of the arm 87 drops off the rise 89b the slide 82 is returned to normal position by the spring 90 and the end of the spring 66 re-engages the end of the pin 65. The anvil 53 is then released, as will later be described in detail and is returned to normal position by its spring 57. Substantially simultaneously with this last described action, the magnets 67 are reciprocated by the cam 72 and the spring 73 and immediately thereafter the coin valve 91 is returned to normal position by contact of the pin 95 with the lower end of the lever 94.

During the operation above described and subsequent to the closing of the main motor circuit, the contacts 4 and 4a of the auxiliary motor circuit have been separated and the link 28 moved downwardly by means later to be described so that the stud 26 has entered the slot 25. The clutch teeth 11a are thereby disengaged from the clutch teeth 10a just as the shaft 7 completes one revolution and further rotation is prevented by engagement of the stud 26 with the end of the slot 25. Likewise just as the revolution of the shaft 7 is completed, the cam 21 again separates the contact 3 from the contact 3a, thus opening the main motor circuit and causing the motor to stop.

The spring 57 is of such design that when it is partially compressed the force applied to a coin or slug held between the plunger 45 and the lugs 59 is sufficient badly to distort or break the slug, thereby possibly interfering with proper functional operation of the anvil. To prevent such distortion or breakage of slugs and at the same time prevent functional operation is the purpose of the mechanism disclosed in Figs. 26 and 27 with which the machine may be equipped. Such mechanism is shown only in connection with the quarter slot as experience has shown that there is little tendency to present spurious nickels or dimes to a machine which also accepts quarters. Practically all the slugs presented to experimental machines have been spurious quarters. However, if it is found desirable to do so, the mechanism about to be described may be provided in connection with the dime and nickel slots as well as with the quarter slot.

A lever 99 (Fig. 26) is pivotally connected to the quarter anvil 53 and has one end arranged to engage the rear surface of a coin or slug in contact with the lugs 59. The other end of the lever 99 extends rearwardly and is supported by a spring 100 connected to the end of a supporting rod 101. The rear end of the lever 99 rests against the bottom of a set screw 102 supported in the bracket 103. A plunger 104 is slidably mounted in the head 46 and has one end projecting into the path of the plate 41.

The other end of the plunger 104 is provided with a shoulder 105 to engage the end of a detent 106 when the latter is permitted to assume a position to be engaged by the shoulder.

The detent 106 is pivoted to the bracket 103 by means of a bolt 107 and rests upon a set screw 108 mounted in the lever 99. A spring 109 keeps the detent in contact with the set screw 103. A slug held between the plunger 44 and the lugs 59 on the anvil 53, not being of proper tensile strength, will yield under the pressure applied by the plunger. A slight yielding of the slug will cause the lever 99 to be rotated against the action of the spring 100, thus permitting the detent 106 to fall under the influence of the spring 109, into position to engage the shoulder 105 on the plunger 104. Movement on the part of the bracket 41 will thus be prevented, as the plunger 104 is prevented from moving, and the lever 55 will not be functionally actuated. As previously described, the plungers 39 will yield, thus permitting normal operation of the lever 36. The slug will not be carried back into register with the compartment 47b but will remain over compartment 47a. When the plunger 44 returns to normal position the slug will be released and will drop into the valve 91 which, at such time, is in communication with the chute 92a. A good coin, however, will not yield and the lever 99 will not be operated, but the anvil 53a will be moved rearwardly to effect functional operation of the lever 55 as previously described.

The insertion of a spurious coin will not effect a functional operation of the machine. A spurious coin of iron content is held by a magnet 67 until after the plungers 44 have been returned to normal position. The magnet is then operated to release the spurious coin which drops into the chamber 47a and is discharged through the coin valve 91 into the chute 92a. A spurious or good coin of less diameter or thickness than a standard coin will either not be held by the finger 50 and pin 52 or else will not be held by the plunger 44 and anvil 53 when the finger 50 is flicked and will drop into the chamber 47a, thus permitting the plunger 44 to enter the recess 53 in the anvil. Such coins are dropped before the coin valve 91 is operated and are discharged into the return chute 52.

If a washer or the like is inserted in the machine the plunger 44 will merely pass through hole therein and while the anvil may be operated slightly in case the washer aperture is small enough to have its periphery engage a portion of the plunger, the anvil will not be pushed back sufficiently to effect functional operation of the machine.

A spurious coin is not of sufficient tensile strength to withstand the pressure applied by the anvil 44 and so will either bend or break and in either event the anvil will not be pushed back its full distance.

Of course in the case of machines equipped with the mechanism disclosed in Figs. 26 and 27 a slight yielding of the spurious coin renders the detent 106 operative to lock the plunger 104 and thus prevent movement of the bracket 41 and the plungers 44.

The mechanism disclosed in Figs. 26 and 27 is not absolutely essential but is desirable as it prevents the breakage or distortion of spurious coins which might result in interfering with subsequent operation of the machine due to clogging of the coin slots by the distorted or broken coins.

The timing of the operation of the coin valve 91 is such that all coins and slugs presented to the machine except such as are thinner or of less diameter than a standard coin are collected by the machine unless the particular articles of merchandise selected is exhausted. In such event the coin or slug presented to the machine is returned to the customer, as will later be described. Should it not be desired to collect slugs presented to the machine, the coin valve 91 may be omitted. The compartment 47a will then at all times discharge into the return chute 92 and only coins which operate the machine will be collected.

The collection chute 93 leads to an exhibition chamber which comprises a vertical shallow box-like casting 110 having a front glass wall arranged in register with an aperture in the front wall of the casing 1a, the casting 110 being supported from the frame 1 by suitable brackets (Figs. 28 and 29). A conduit 112 leads from the bottom of the exhibition chamber to a box 113 in which the coins are ultimately collected.

In the rear wall of the exhibition chamber are provided apertures in which are slidably arranged pins 114. These pins are arranged in a vertical row and are uneven in number. The odd pins are carried by a bracket 115 rotatably mounted on the vertical shaft 116 and the even pins are carried by a bracket 117 also rotatably mounted on the shaft 116.

The bracket 115 is provided with an arm 118, the end of which is connected by a link 119 with a lever 120 supported at its upper end by a shaft 121 mounted in a bracket 122 and having its lower end extending into a guide slot in a bracket 123. The bracket 117 is provided with an arm 124 which is connected by a link 125 with a lever 126 supported at its upper end by the shaft 121 and having its lower end arranged in a guide slot in the bracket 123 (Figs. 28 and 30).

A disc 127 (Fig. 31) is fixed to the shaft 29 and is equipped with diametrically arranged studs 128 and 129 which extend in opposite directions and which are arranged to engage respectively the levers 120 and 126, which are held by springs 130 in position to be engaged by their respective studs. Rotation of the disc 127 causes alternate actuation of the levers 120 and 126. Movement of the lever 120 effects movement of the bracket 115 which causes withdrawal and return of the odd pins and movement of the lever 126 effects movement of the bracket 117 which causes withdrawal and return of the even pins 114.

The operation of the above-described mechanism is as follows: Assume that a coin or slug has been inserted in the machine and has been discharged from the testing mechanism into the chute 93. As it enters the exhibition chamber, it engages the top pin 114 and is held thereby until the next operation of the machine. Upon the next operation of the machine, the stud 128 will first be brought into engagement with the lever 120, thereby effecting retraction of the odd pins 114 while the even pins remain unaffected and the coin or slug will drop into engagement with the second pin.

As the operation of the machine continues, the stud 128 moves out of engagement with the lever 120 and the odd pins are returned to normal position by the spring 130. The stud 129 next engages the lever 126, thereby effecting retraction of the even pins without affecting the odd pins and the coin or slug then drops into engagement with the third pin after which the stud 129 moves out of engagement with the lever 126 and the even pins are returned to position by the spring 130. Just after the odd pins have returned to position, the next coin or slug used is delivered by the chute 93 into the exhibition chamber and engages the top pin 114. At each operation of the machine, the coin or slug is dropped from one odd pin to the next odd pin, so that it is exhibited during several operations of the machine subsequent to the operation caused by it. By means of the exhibition chamber, the coins or slugs presented to the machine are made plainly visible. This is a desirable feature in the event that a purchaser contends that he has been defrauded by the machine and is instrumental in deterring prospective purchasers from presenting spurious coins to the machine.

A latch bar 131 is slidably mounted in a groove provided in the rear face of the bracket 46 (Fig. 33). A plurality of selector rods 132 (Figs. 32 to 41) pass through the bracket 46 and passageways 133 in the latch bar, the passageways 133 having oblique vertical walls. Springs 132a exert an outward pull on the selector rods. The inner ends of the selector rods 132 are slidably supported by a casting 134a which co-operates with a plate 134 to form a housing having open front and end walls. Each selector rod 132 has its vertical sides cut out to form longitudinally spaced shoulders 137 and 138 on opposite sides of the bar and oblique surfaces 139 and 140 leading to such shoulders.

The latch bar 131 is connected to one arm of the bell-crank lever 64 by coil springs 141 and 142 (Fig. 33). Movement of the bell crank lever when the latch bar is at rest puts one of the springs under tension, thus causing movement of the latch bar in one direction. Also if the bell crank lever is at rest and the latch bar is moved, tension is exerted through one of the springs to return the latch bar to a position of rest with respect to the bell crank lever.

When the machine is at rest, one edge of each passageway 133 projects in front of a shoulder 137 (Fig. 34), thus normally preventing inward movement of the rods 132. After a coin has been inserted through the coin slot and the bell crank lever 64 rotated from its normal position to the position shown in Fig. 33, the spring 142 is put under tension thereby causing movement of the bar 131 out of engaging relation with the shoulders 137 to permit actuation of the selector rods.

However, only one selector bar 132 can be actuated at a time. A plurality of discs 143 (Fig. 32) are provided in the housing formed by the casting 134a and plate 134. The end discs are engaged by the offset portions 144 of levers 145 pivotally supported by the plate 134 and having their free ends connected by a link 146 and springs 147. Stop pins 148 are provided to limit the swinging movement of the levers 145. The discs 143 are in the path of movement of the ends of the selector rods and are capable of sufficient relative movement only to permit the operation of a single selector rod. Further relative movement of the discs is prevented by the stop pins 148.

Actuation of a selector rod causes the latch bar 131 to slide due to engagement therewith of the oblique surface 140 until the shoulder 138 is reached whereupon the latch bar 131 snaps behind the shoulder 138 under the pull of the spring 142 (Fig. 42). Outward movement of the rod 132 is now prevented.

This condition is maintained until the bell crank lever 64 is again operated upon the resetting of the rotating members 49 in the coin slots. The spring 141 is put under tension by the return movement of the bell crank lever 64, thus causing movement of the latch bar 131 to disengage the same from the shoulder 138, whereupon the selector rod 132 is moved outwardly by its spring 132a. During outward movement of the selector rod, the oblique surface 139 contacts with the oblique face of the passageway 133, thus causing movement of the latch bar 131 against the pull of the spring 142 until the shoulder 137 is reached whereupon the latch bar drops behind the shoulder under the action of spring 141 and again locks the selector rods 132 against inward movement.

The latch bar 131 prevents pushing in of the selector bars 132 except after a coin has been inserted in one of the coin slots and it also prevents jiggling of a selector rod during the operation of the machine, thus preventing possible interference with the proper functioning of the machine. Pins 149 on the selector bars project into slots 150 in the plate 134 to limit the reciprocating movement of the selector bars.

To each selector rod 132 is pivoted a lever 151 having a pin 152 at one end and a second pin 153 at the other end. A bail 154 having notches 155 in its front edge is pivotally mounted on the frame and is engaged along its front edge by one of the pins 152 when a selector bar is pushed in (Fig. 32). One arm of the bail 154 is provided with an extension 156 having a stud 156a which when the bail is actuated engages the contact 4 to move it into engagement with the contact 4a to effect closing of the auxiliary motor circuit (Figs. 32 and 49).

A link 157 connects the extension 156 with one end of a pivoted lever 158, the other end of which is connected to the link 28. Actuation of the bail 154 is thus effective to withdraw the stud 26 from the cam groove 25 in the clutch member 11. A spring 158a pulls downwardly on the link 28 and opposes such movement of the bail 154.

Each selector rod 132 is equipped with a stud 159 which is adapted to engage a cam surface on a pivotally mounted detent 160 to move the same against the action of the spring 161. Each detent normally engages the free end of a lever 162 supported by the shaft 163 and the function of which will later be described.

Coil springs 164 are attached at one end to the levers 162 and at the other end are connected to a rod 164a carried by the frame 10 (Figs. 42, 43 and 49). A keeper bar 165 (Figs. 3 and 44) carried by arms 165a fixed to the shaft 163 extends across in front of the levers 162. This bar is normally maintained in position to prevent movement of a lever 162, even though its detent 160 be released, by mechanism later to be described and is released from such position by mechanism also later to be described.

An ejector bar 166 is pivotally attached to the upper end of each lever 162 and normally has its free end in register with a slot in the upper end of one of the magazines 167 in which are arranged articles of merchandise to be purchased, there being a magazine individual to and arranged directly below each selector rod.

A shelf 168 is pivoted adjacent the exit aperture from each magazine and is normally arranged in an inclined position with its end engaging a pivoted display rack 169 in the lower end of which is provided a slot 169a.

The display racks 169 which are normally arranged in slanting positions, are visible through a window in the front wall of the casing and are located directly below the handles 132a of the selector rods which extend through the front wall of the casing 1a. On the display racks are supported the various articles of merchandise which the machine vends and are the identical articles which the purchasers receive. Each display rack is provided with an arm 170, the end of which engages the shelf 168 and is connected by a link 171 with a lever 162.

The springs 164 continuously exert force on the levers 162 tending to actuate the same to deliver an article of merchandise through the medium of an injector bar 166. If one of the detents 160 has been operated to release one of the levers 162 and the keeper 165 released, the lever 162 and keeper 165 are operated by the springs 164 (Figs. 59 and 60). The bar 166 pushes out an article from the magazine against the shield 168a, and at the same time the link 171 is operated to swing the shelf 168 into horizontal position to receive the article of merchandise ejected and to swing the display rack 169 downwardly whereupon an ejector 173 by virtue of the slot 169a engages the article of merchandise on the display rack to disengage it therefrom and the article of merchandise drops into a delivery chute 174 (Fig. 1).

The lever 162 is then returned to normal position by the keeper 165 and simultaneously the rack 168 assumes its slanting position as does the display rack 169 so that the article of merchandise temporarily supported by the shelf 168 slides down into the rack 169. Immediately thereafter the articles of merchandise in the magazine are fed upwardly by a mechanism later to be described to bring another article of merchandise into delivery position.

Means are provided to effect return of the bail 154 to normal position before the selector bar 132 is released. The pins 153 extend into grooves 175a in a plate 175 mounted for reciprocation at right angles to the direction of movement of the selector bars 132 (Fig. 32). Levers 176 are pivotally attached to the plate 134 by bolts 176a and are pivotally attached to the plate 175 by the bolts 177. A spring 177a normally maintains the plate 175 with the grooves 175a directly above the selector rods. One lever 176 has an arm 178 extending at right angles thereto.

A lever 179 (Fig. 44) is pivoted on a shaft 180 and its upper end is angularly bent to provide a face having its edge engaging the arm 178 of the lever 176 and a face engaging a set screw 181 carried by the plate 134 whereby its movement in one direction is limited. A spring 182 is attached to the lower end of the lever 179 and to the frame.

The lever 179 is engaged by a pin 183 carried by the arm 184 fixed to the shaft 180 to move the lever into engagement with the arm 178.

An arm 185 is secured to the shaft 180 and is provided at its free end with a cam member 186.

One arm 165a of the keeper bar 165 is provided with an extension 187 which carries a pin 188 which is adapted to engage the cam member 186. Upon the forward movement of the keeper 165, the pin 188 rides over the top of the member 186, thereby moving the arms 185 and 184 downwardly but without having any effect upon the lever 179 (Figs. 45 and 46). Upon return movement of the keeper 165, the pin 188 rides under the member 186 thereby lifting the same and rotating the shaft 180 clockwise (Figs. 47 and 48), thereby causing clockwise movement of the lever 179 which in turn swings the lever 176, which causes sliding movement of the plate 175 against the action of the spring 177a. This causes rotation of the levers 151 to move the pins 152 into register with the slots 155 in the bail 154 thereby permitting the bail to resume normal position under the influence of the spring 158a (Fig. 49).

After the latch bar 131 has been actuated through the medium of the bell crank lever 64 upon the insertion of a coin in one of the coin slots, one of the selector rods 132 can be pushed inwardly. The discs 134 prevent actuation of more than one selector rod. Operation of a selector rod causes the engagement of a pin 152 with the front of the bail 154 and the engagement of a pin 159 with the cam surface of a detent 160 to disengage the latter from the corresponding lever 162 (Figs. 34 and 35). Actuation of the bail 154 causes engagement of the contacts 4 and 4a thereby closing the auxiliary motor circuit and starting the motor (Fig. 49). Also actuation of the bail 154 is effective to withdraw the stud 26 from the cam groove 25 of the clutch member 11, thereby allowing the clutch teeth 11a to engage the clutch teeth 10a (Fig. 7).

If the coin presented to the machine successfully passes the various tests applied thereto, the keeper bar 165 is released by mechanism later to be described and it, together with the released lever 162 is actuated by the springs 164 and an article of merchandise is ejected from the corresponding magazine according to the manner previously described. The keeper bar 165 is then moved back by mechanism later to be described and carries with it the lever 162. On the return movement of the keeper bar 165 the arm 185 is actuated, thereby causing actuation of the lever 179 to cause movement of the plate 175 against the action of the spring 177a (Fig. 38).

The levers 151 are thereby actuated to locate the pins 152 in alinement with the slots 155 in the bail 154, thereby permitting the bail to be returned to its normal position by the spring 158a (Fig. 39). Upon return of the bail to normal position the contacts 4 and 4a separate and the auxiliary motor circuit is broken. Also the stud 26 is permitted to reenter the cam groove 25 to move the clutch member 11 away from the clutch member 10, thereby disengaging the clutch teeth 10a and 11a.

Upon the resetting of the coin testing mechanism the bell crank lever 64 is returned to normal position and upon its return to normal position it again actuates the latch bar 131, thus permitting the return of the selector rod to normal position under the influence of its actuating spring whereupon it is latched in such position by the latch bar 131. The pin 152 moves out of the slot 155 to permit spring 176 to return the plate 175 to normal position and locate the pins 152 in front of the edge of the bail 154. The auxiliary motor circuit is broken and the clutch member disengaged before the selector rod is released, thereby ensuring proper functioning of the machine even though a customer should prevent the selector rod from returning to normal position upon its release.

A cam 200 is secured to the shaft 29 (Figs. 49, 50 and 51). A bar 201 has one end pivotally connected to the keeper arm 165a and has its other end forked to receive a block 201a rotatably mounted on the shaft 29. A roller 203 is carried by the arm 201 and engages the periphery of the cam 200. On the shaft 29 is rotatably mounted a member 204 consisting of spaced side plates 205 connected by a plurality of pins 206. A spring 205a is connected to the member 205 and to the frame. One side plate is provided with a pin 207 which normally rests upon the upper edge of the arm 201.

The upper rod 206 lies in the paths of the lower extremities of the levers 55 so that movement of the levers 55 is effective to swing the member 204 slightly about the shaft 29. The lower edge of one side plate 205 is shaped to form a cam surface which is adapted to be engaged by a roller 208 projecting from the arm 201 and which normally engages the front edge of said side plate which edge is concentric with the shaft 29. The cam 200 has a portion concentric with the shaft 29 and when the machine is at rest the roller 203 is in contact with the front end of this portion and the keeper 165 is prevented from moving forward. So long as the roller 203 is in contact with the concentric portion no movement of the arm 201 is possible and it is while the roller 203 is in contact with this portion that a coin is being tested.

If the coin successfully withstands the tensile strength test a lever 55 is actuated by an anvil 53, thus lifting the member 204 sufficient to disengage the roller 208 from the concentric portion of the side plates 205. Unless the member 205 is raised the arm 201 can not move even after the roller 203 has reached the shoulder of the cam 200. When the roller 203 reaches the shoulder and the member 205 is lifted, the arm 201, and the keeper bar 165 and an ejector lever 162 from which the detent has been disengaged by a selector rod jump forward under the action of the springs 164 and the roller 208 engages the under surface of the side plate of the member 205 to lift it and bring the second pin 206 in back of the lower end of the lever 55 to lock the same, thereby temporarily preventing the return of anvil 53 to normal position. Continued rotation of the cam 200 causes the arm 201 to move back, thus carrying back the keeper 165 and lever 162 and removing the roller 208 from the under face of the side plate of member 205, thereby allowing the latter to be returned by spring 205a to normal position and release lever 55.

Means are provided for insuring return to the customers of a coin inserted in the machine should the magazine of the selected article be empty. Dogs 210 (Figs. 34–41) are pivoted to the selector rods 132 and are provided with pins 211 extending into horizontal slots in vertically slidable guide members 212. The guide members 212 have vertical slots 212a through which extends a rod 213. Vertically slidable members 214 have slots 214a through which extends a rod 215 and pins 216 on the guide members 212 project into slots 216a in the members 214. Springs 217 have their ends connected to lugs on the members 212 and 214 and springs 218 are connected to lugs on the members 214 and to a guide plate 218a through which the members 214 extend. Downward movement of the members 214 is limited by engagement of the shoulders 214b with the guide plate 218a.

A bail 219 is pivotally supported by the rod 215. Under normal conditions the dog 210 passes under the bail 219 when its selector rod is operated (Fig. 36) but, when a member 214 is lifted, as it is when a magazine is exhausted, by mechanism later to be described, the dog 210 is caused to engage the bail 219 and pivot the same (Fig. 41).

The arm 219a of the bail 219 engages an arm 220 fixed to shaft 88 (Fig. 17). Movement of the arm 220 causes rotation of the shaft 88 to move the lever 87 and cause movement of the slide 82 as previously described, thereby moving the coin detaining fingers 51 into inoperative position to allow the coin immediately to drop through the coin testing mechanism and be returned to the customer.

The auxiliary circuit of the motor is closed and the clutch operated as before described, and the machine will operate the same as when the coin is too thin or of too small diameter, there being no operation of the delivery mechanism due to the fact that no one of the anvils 53 is operated to actuate a lever 55. The latch bar 131 is likewise immediately returned to normal position to release the selector rod, and as the latter returns to normal position the spring 90 returns the actuated parts to normal position.

The cost of each of the articles vended by this machine is five cents and provision is made for delivering change to a customer who has presented either a quarter or a dime to the machine. In case a quarter has been presented to the machine, the change comprises four nickels and if a dime has been presented to the machine the change comprises a single nickel.

A magazine 230 (Figs. 52 and 53) for nickels has its lower end in communication with a chute 231 leading to the merchandise delivery chute 174. Nickels are fed one by one from the magazine into the chute 231 by means of a slide 232 actuated by means of an arm 233 fixed to one end of a shaft 234 passing through the frame 1. A spring 233a has one end connected to the arm 233 and the other to the frame 1. A bar 233b carried by the arm 233 limits movement of the arm and slide 232 under the action of the spring 233a.

An arm 235 is fixed to the other end of the shaft 234 and has pivotally connected thereto ears projecting at right angles from bars 236 and 237 (Figs. 57 and 58). These bars have forked ends which receive a rotatably mounted shaft 238 provided with a spur gear 239 which meshes with a spur gear 240 mounted on shaft 29.

A four rise cam 241 and a single rise cam 242 are fixed to the shaft 238. The bars 236 and 237 are provided respectively with rollers 243 and 244 which are adapted to engage the cams 241 and 242. Springs 245 and 246 normally hold the forked ends of the bars 236 and 237 against stops 247 and 248 in which position the rollers 243 and 244 are out of contact with the cams 241 and 242. A pusher bar 249 co-operates with the bar 236 to move the same into position to contact the roller 243 with the cam 241 and a pusher bar 250 co-operates with the bar 237 to move it to bring the roller 244 into operative relationship to the cam 242. The upper end of the pusher bar 249 is connected to the arm 251 of the lever 55 for the quarter slot. The bar 250 is connected to the arm 252 of the dime slot lever 55.

Actuation of the quarter slot lever 55 causes the roller 243 to be brought into contacting relationship to the cam 241 and likewise actuation of the dime slot lever 55 causes the roller 244 to be brought into contacting relationship to the cam 242. When the roller 243 is in contact with the cam 241, the lever 235 is oscillated four times. As a result, the slide 232 is actuated four times, thus feeding four nickels from the reservoir 230 into the chute 231. When the dime slot lever 55 is actuated, the roller 244 is brought into contact with the cam 242, thereby causing a single oscillation of the lever 235 and a single actuation of the slide 232, so that but a single nickel is fed from the reservoir into the chute 231.

Each roller 243 and 244 is provided with a flange which underlies its cam and holds the roller in operative relationship to the cam after its pusher bar has been released until the required number of kicks have been given to the arm 235. The cams 241 and 242 have portions of smaller diameter to permit the rollers to be brought into operative relationship and to permit return to normal position after actuation of the arm 235. The timing of the cam rises is such that whenever the bars 236 or 237 are operated, clearance is provided to permit one of the rollers to be brought into alignment with the cam periphery.

Means are provided to prevent insertion of quarters or dimes in their respective slots after the nickels have been reduced below a predetermined number. A feeler 262 (Figs. 54, 55 and 56) is slidably mounted in the base 260 of the nickel reservoir and is adapted, when less than a predetermined number of nickels remain in the magazine, to be projected thereinto. Rotation of the feeler is prevented by a screw 263 having its end projecting into a groove in the feeler.

A plate 264 has a lug 265 struck up from an offset portion thereof to form a slot which receives the stud shaft 33, the offset portion holding the sprocket 31 on the shaft and itself being held in position by the collar 261.

The plate 264 is also provided with another lug 266 and the feeler 262 extends through apertures in both lugs. A coiled spring 267 is interposed between a shoulder on the feeler 262 and the lug 265, and pushes the lug against a collar 268 held to the feeler by a screw. A spring 266a extends from the lug 266 to an extension of the shaft 33. The sprocket 31 carries a pin 269 which periodically engages the shoulder between the main portion and offset portion of the plate 264.

A roller 270 is carried by the feeler 262 and is arranged to engage one arm of a bell crank lever 271 having its other arm connected to one end of a spring 272, the other end of which is attached to the frame 1. A reciprocating rod 273 has one end attached to the last mentioned arm of the bell crank lever 271 and has its upper end normally engaging the lower end of an arm 274 fixed to the shaft 79 and having connected thereto one end of the spring 275, the other end of which is connected to the frame.

The arm 274 is provided with a shoulder 276 which normally overlies a lug 277 formed on one end of a lever 278 pivoted to the frame and having attached thereto one end of the spring 279, the other end of which is attached to the head 45.

The lever 278 is provided with a handle 280 by means of which the lever may be operated manually and a stop 278a limits counter clockwise rotation thereof. The upper end of the coin magazine 230 is supported by a bracket 281 having a slot for permitting the insertion of nickels into the magazine 230 and a lever 282 is provided for ejecting a distorted nickel which has been partially inserted in but cannot pass through the slot.

In the normal operation of the machine the magazine 230 is filled with nickels which are fed from the bottom of the magazine either singly or in groups of four into the chute 231 according to whether or not the machine has been operated by the insertion of a dime or a quarter. The insertion of either a dime or a quarter causes the corresponding anvil 53 to actuate one of the pusher bars 249 or 250 to bring either the roller 243 or 244 (Figs. 59 and 60) into operative relationship to its respective cam, thereby causing actuation of the lever 235 which in turn causes the slide 232 to be operated either once or four times.

At each operation of the machine the sprocket 31 is caused to make one complete revolution during which the pin 269 engages the shoulder of the plate 264 thereby moving it towards the coin magazine (Figs. 55 and 56). Such movement compresses the spring 267 which is normally not under compression, thereby exerting pressure on the feeler 262 to press its inner end into contact with the stack of nickels but movement of the plunger 262 into the magazine is prevented by the nickels (Fig. 54).

The plate 264 is returned to normal position by the spring 262a after the pin 269 passes out of contact with the shoulder. The pin 269 is timed to contact with the shoulder of the plate 264 after the anvil 53 has reached the limit of its rearward movement, so that the feeler 262 is actuated only after sufficient time has elapsed to eject the nickels required to make proper change.

However, should the stack of nickels fall below the level of the feeler 262 (Fig. 53) the latter will be moved into the magazine, thus bringing the roller 270 into contact with one arm of the bellcrank lever 271, the operation of which will pull down the rod 273 to permit slight rotation of the arm 274, under the influence of the spring 275 without disengagement of the arm from the rod. The swinging of the arm 274 causes rotation of the shaft 79 thereby causing the arm 78 to move forward and permit the pins 74 to be projected into the dime and quarter coin slots by the springs 76. The shoulder 276 is disengaged from the lug 277 of the lever 278 which swings slightly under the influence of its spring 279 to locate the projection 277 above the shoulder 276 and further rotation of the lever 278 is prevented by the stop 278a.

When the pin 269 releases the plate 264, return of the bellcrank lever 271 to normal position under the influence of the spring 272 is prevented by the locking action of the lug 277 on the arm 274 although the feeler 262 is returned to normal position by the spring 266a.

The feeler 262 is so located that it operates while enough nickels are left in the magazine to insure proper change being returned to the customer. The insertion of dimes or quarters into the coin slots is now prevented but the machine may still be operated by nickels. Pressure is applied to the feeler 262 during each operation of the machine, thus ensuring the shutting off of the dime and quarter slots before the number of nickels in the magazine becomes less than sufficient to ensure delivery of proper change to a customer.

When the magazine 230 is to be refilled with nickels the lever 278 is operated manually by the handle 280, in a clockwise direction. The arm 274 is first pushed downwardly by the lug against the action of the spring 272 until the said lug clears the shoulder 276 after which the arm 274 is snapped back into normal position by pressure applied thereto from the spring 272 through the rod 273 and the bell crank lever 271 which are also returned to normal position. The nickels are then inserted through the slot in the bracket 281.

Each magazine 167 comprises four angle rods 290 (Fig. 67), having their lower ends resting upon the base 291 and having their upper ends attached to supporting rods 292 and 293. (Figs. 42 and 43). In the magazines are arranged elevators 294 (Figs. 64, 65 and 67) provided with guide members 295 which embrace vertical bars 296 exterior of the magazines.

Chains 297 are attached to the top guide members 295 and pass around sprockets 298 rotatably mounted on the shaft 215. The chains 297 pass from the sprockets 298 around sprockets 300 (Figs. 34, 70, 71 and 72) rotatably mounted on the shaft 301 supported by brackets 302. From thence the chains pass around drums 303 rotatably mounted on a shaft 304 also supported by the brackets 302 and have their ends fastened to the drums.

The teeth of ratchet wheels 305 integral with the sprockets 300 are adapted to be engaged by ratchets 306 which are pivotally mounted on arms 307 rotatably supported by the shaft 301. The ratchets 306 are provided with projections 308 which are adapted to engage a rod 309 carried by arms 310 fixed to the shaft 301. Springs 307a connect the arms 307 and the ratchets 306.

An arm 311 is fixed to the shaft 301 and is connected by a link 312 with a manually operable lever 313 which is normally held in contact with a stop 313a by a spring 313b (Figs. 4 and 64).

The arms 307 are connected to a cross bar 314 which is connected by a link 314a with an arm 315 fixed to a shaft 315a rotatably supported by the frame. A spring 315b has one end connected to the frame and the other to the arm 315. An arm 316 is also fixed to the shaft 315a and is connected to a link 317 provided with a roller 318 which engages the periphery of a cam 319 fixed to the shaft 29, the link being slotted to receive the shaft 29.

Spiral springs 320 connect the drums 303 with sleeves 321 rotatably supported by the shaft 304 and carrying disks 322 having radial slots 323. Spring clips 324 having portions arranged to extend into the radial slots are provided to hold the disks against rotation. The tension of the springs 320 may be adjusted by rotation of the disks 322. The elevators 294 are equipped with upwardly bowed leaf springs 325.

The magazines are closed by covers 326 having angle slots in one end through which extends the pin 292 and having grooves in the opposite end to receive the pin 293 and are provided with apertures through certain of which the ejector bars enter the magazine and through the others of which the articles are delivered. The covers bear springs 327 (Fig. 42) the free ends of which rest upon the pin 292 to lift the ends of the covers to bring the bottoms of the vertical portions of the grooves into contact with the pin 292.

Chains 328 are connected to arms 329 rotatably supported by a shaft 329a and provided with springs 329b. The arms 329 are provided at their free ends with teeth 330 adapted to engage links of the chains 297. The chains 328 pass over guide rollers 331, under guide rollers 332, over one of the frame rods and through slots in the plate 134 and are provided with pull rings 333. The guide rollers and the arms are supported by bars carried by the frame.

When it is desired to fill the magazines the covers 326 are pushed down against the action of the springs 327 and then are slipped to the left to disengage them from the pin 293 after which they are swung about the pin 292 as a pivot. The elevators 294, if in elevated position, are moved downwardly by a series of pulls on the corresponding chains 328. Each time the chains are pulled, the free ends of the arms 329 are lifted and by engagement of the teeth 330 in the links pull the chains 297 in a direction to permit the elevators 294 to move downwardly under the influence of gravity.

Preferably after an elevator has been moved downwardly a short distance the magazine is filled up to the top with articles of merchandise after which the elevator is moved downwardly still further and the operation repeated, but, if desired, it can be moved all the way down before insertion of the articles and all of the articles inserted at one time. As the elevators are moved down, the chains 297 are unwound from the drums 303 thereby increasing the tension of the springs 320. The ratchets 306 hold the chains against movement under the influence of the springs 320.

Assume that the magazines contain stacks of articles of merchandise and the machine is at rest. The springs 325 are bowed sufficiently to contact the top article with the covers 326 without putting them under any appreciable pressure (Fig. 73). The roller 318 rests upon the high part of the cam 319 (Fig. 4).

Now assume that the machine has been started. Immediately after the shaft 29 starts to rotate the roller 318 passes off the high part of the cam 319, thus permitting the spring 315b to rotate the arm 315 in a clockwise direction to pull up the link 314a, thereby actuating the arms 307 (Fig. 64).

During the first part of the movement of the arms 307 the ratchets 306 remain in engagement with the teeth of the ratchet wheels 305 and slight movement of the drums 303 under the influence of the springs 320 is permitted. This movement tends to wind up the chains 297 and lift the elevators 294. The last part of the movement of the arms 307 brings the projections 308 into engagement with the bar 309 whereupon the ratchets 306 are rotated to disengage them from the teeth of the ratchet wheels 305, thus permitting free rotation of the sprockets 300 so far as the ratchets are concerned.

The drums 303 are then rotated by the springs 320 until the tops of the stacks of articles of merchandise held by the elevators engage the covers 326 and springs 325 upon which the stacks are supported have been flattened (Fig. 74). The top articles are now in alignment with the delivery apertures and the entire stack is under pressure.

As the incline of the cam 319 engages the roller 318, the arms 307 are drawn back to normal position. Movement of the projections 308 away from the bar 309 permit the springs 307a to bring the ratchets 306 again into engagement with the teeth of the ratchet wheels 305.

After such engagement the ratchets and the ratchet wheels move in unison for a short distance before the arms 307 reach the limit of their movement. The sprockets 300 are thus caused to rotate slightly counter clockwise, thereby drawing the chains 297 back a little against the tension of the springs 320, thus permitting the elevators 294 to move downwardly slightly. As the elevators drop back the springs 325 again bow upwardly sufficiently to keep the top articles of the stack in register with the delivery apertures (Fig. 75). The top articles are not subjected to any pressure and the remaining articles are subject only to the pressure exerted by the superposed articles of merchandise.

The above described action takes place before the keeper bar 162 is released, thus ensuring that there will always be articles of merchandise in position to be ejected from the magazine. After each operation of the machine, all the stacks of merchandise are subjected to upward pressure but only that stack from which an article was removed at the last operation of the machine is actually elevated. Each stack is momentarily subjected to upward pressure during each operation of the machine but at other times the only pressure exerted upon the articles is the weight of the superposed articles. The top article of each stack is always placed in position to be ejected by its corresponding ejector bar and is under no restraint at the time of ejection.

When it is desired to empty the magazine, the covers are lifted and the lever 313 is operated to bring the bar 309 into engagement with the projections 308 to rotate the ratchets 306 thereby disengaging them from the teeth of the ratchet wheels 305 (Fig. 66). The drums 303 then rotate under the influence of the springs 320 to wind up the chains 297 and raise the levators 294, thus feeding the articles of merchandise out of the top of the magazine. When the lever 313 is in normal position it limits clockwise rotation of the shaft 301 by engagement with the stop 313a.

Each elevator is provided with a pin 335 (Figs. 41 and 49) which when there is but a single article of merchandise left on the elevator is brought into position to engage the lower end of the corresponding guide member 214 (Fig. 41). After the last article has been ejected from the magazine and the elevator moved upwardly as above described, the pin 335 lifts the member 214 against the action of its spring 218. This exerts a tension on the corresponding spring 217 to lift the guide member 212 thus bringing the cooperating dog 210 into position to engage the bail 219.

If it happens that the machine has been set in operation by pushing in the selector rod corresponding to the exhausted magazine, the dog 210 will not be raised because of the fact that the bail 219 overlies it (Fig. 39). However, the spring 217 will be put under tension, and, as soon as the selector rod returns to normal position, the dog will be moved by the spring into operative position.

If the selector rod operated is not the one for the exhausted magazine the dog 210 is immediately moved into operative position. Operation of a push rod with the dog in operative position operates the bail 219 (Fig. 41) to effect movement of the slide 82 through the medium of arm 220 and lever 87 thereby moving the coin-detaining fingers 51 into inoperative position to allow the coin held thereby immediately to drop through coin-testing mechanism and be returned to the customer and actuation of the delivery mechanism is prevented.

When the selector rod of an exhausted magazine is operated before the dog 210 has been moved into operative position the ejector mechanism is operated to swing the display rack downwardly in the normal manner, and the article supported thereby is delivered to the customer. However, if the dog has been moved into operative position before its selector rod is operated, the display rack will not be moved and the article of merchandise will remain thereon and the coin used to operate the machine is returned to the customer. Thus, the customer either receives an article of merchandise or his money is returned.

It is desirable that the latch bar 131 be unaffected by the movement of the bell crank lever 64 incidental to the flicking of the coin-engaging finger 51 during the testing of a coin. For this reason a bell crank lever is supported by the stud 340 from the frame and the arm 341 thereof engages the roller 318. The other arm 342 of the bell crank lever is movable into and out of register with the end of the latch bar 131. A spring 343 keeps the arm 341 in contact with the roller 318. When the roller 318 is in contact with the high part of the cam 319, the arm 341 is out of register with the latch bar.

However, when the roller 318 contacts with the low part of its cam the arm 342 moves into register with the end of the latch bar to prevent movement thereof in one direction. When the machine is at rest the end of the latch bar projects across the path of the arm 342 but it is moved out of such path when a coin is inserted in one of the coin slots, thus permitting the arm of the bell crank lever to be moved into operative position. As the coin engaging fingers are flicked at the time that the roller 38 engages the low part of its cam, movement of the latch bar 131 due to actuation of the bell crank lever is prevented.

Unless prevented, it might happen that a selector rod would be locked in its out-of-normal position by a customer preventing its return to normal position after operation of the machine and then inserting another coin while the selector rod is in out-of-normal position. To prevent such an occurrence, a bell crank lever is pivoted to the frame by the stud 345 and has one arm 346 extending over the top edge of the latch bar 131 in which is provided a notch 347 which in one position of the latch bar is in register with the arm 346. The arm 348 of the bell crank lever is connected by a link 349 with the free end of an arm 350 rotatably mounted on the shaft 180. The arm 350 has a projection 351 which contacts with the arm 178.

The arm 178 of the lever 176 engages the projection 351 normally to hold the arm 346 away from the bar 131 and a spring 353 pulls the link 349 in a direction to engage the projection 351 with the arm 178. When the arm 178, is moved by the arm 179 it moves along the arc of a circle thereby permitting slight movement of the arm 350 under the influence of the spring 353. This swings the arm 346 in contact with the top edge of the latch bar 131 and when the notch 347 comes into register with the arm 346 the latter drops into the former to lock the bar. The location of the notch 346 is such that when the arm is in the notch, each aperture in the latch bar is positioned symmetrically with respect to the selector rod 132 passing therethrough. A selector rod, with the latch bar in this position, can slide freely through its aperture as neither the shoulder 137 or the shoulder 138 will be engageable by the latch bar. When the plate 175 returns to normal position under the influence of its spring 177a, the link 349 is moved to disengage the arm 346 from the notch 347 to release the latch bar.

Assume that a coin has been inserted in one of the coin slots and a selector rod 132 is operated. The bail 154 is swung about its pivot by a pin 152, thereby closing the auxiliary motor control switch and rendering the clutch operative. Normal operation of the machine is effected and during such operation the arm 185 is lifted to cause the pin 183 of the arm 184 to swing the arm 179. The swinging of the arm 179 rotates the lever 174 to slide the plate 175 against the action of the spring 177a. The sliding of the plate 175 is effective through the pin 153 to actuate the lever 151 to bring the pin 152 into register with a slot 155 in the bail 154 which then immediately returns to normal position, under the influence of its actuating spring, thereby opening the auxiliary motor control circuit and rendering the clutch inoperative.

Normally when the latch bar 131 is operated as described upon the resetting of the coin-testing mechanism, the selector rod 132 being thus released returns to normal position. It is possible, however, that the selector rod may be prevented from return to normal position by the customer. Operation of the arm 176 permits movement of the arm 150 thereby allowing the spring 353 to pull the arm 346 into contact with the top edge of the latch bar 131.

When the latch bar 131 starts to return to normal position after the resetting of the coin testing mechanism the notch 347 comes into register with the arm 346. Normally the arm 346 will not enter the notch 347 because of the fact that the selector rod is at this time released and swings back to normal position. In so doing it carries the pin 152 out of the slot 155 thereby permitting return to normal position of the lever 151 by return to normal position of the plate 175 under the influence of its spring 177a. The arm 176 also returns to normal position at this time and moves the arm 350 in a direction to lift the arm 346.

However, should the selector rod 132 be held in by the customer the arm 346 is drawn into the notch 347 by the spring 353 and holds the latch bar 131 in position such that the selector rod will return to normal position when released by the customer. Should a coin be inserted in the coin slot while the selector rod is thus held in by the customer the bell crank lever 64 will be operated again to put the spring 142 under tension but the position of the latch bar will not be changed. The machine will not operate since the bail 154 cannot now be operated to close the auxiliary motor control circuit and render the clutch operative.

However, upon release of the selector rod the arm 346 is moved out of the notch 347 as above described, thus permitting the latch bar 131 to move under the influence of spring 142 and if a selector rod now be operated the machine will operate normally. If the means just described were not provided and a selector rod were held in and a coin inserted the selector rod would be locked in by the latch bar 131 and the machine could not again be operated without manual adjustment to remedy this condition. With the arrangement above described such condition is prevented from arising.

An alarm is provided for giving notice when an attempt has been made to operate the machine with a spurious coin. The alarm giving means may consist of an electric bell 360, the circuit for which comprises contacts 361 and 362 which normally are out of engagement. A set screw 363 is mounted on the end of the lever 99 and rests upon the upper contact 361. Thus, when the lever 99 is actuated due to the flexing of a spurious coin, the set screw 363 moves the contact 361 into engagement with the contact 362, thereby closing the control circuit for the bell 360 and causing an alarm to be given. In Figure 76 there is disclosed the wiring diagram for a bell operated by direct current, while in Figure 77 there is disclosed the wiring diagram of a bell adapted for use with alternating current. Other forms of alarm giving devices may be used instead of a bell.

The machine is equipped with counters 365 which record the number of deliveries from each magazine, there being a counter individual to each magazine. Each counter is operated through the medium of an arm 366 which is connected by a link 367 with the corresponding ejector lever 162, the link preferably having its end connected to the pin by means of which the spring 164 is attached to the lever. Thus, at each operation of a lever 162, the corresponding counter is actuated and a record kept of the number of articles delivered.

I claim:

1. In a vending machine of the character described, delivery mechanism, actuating means for setting and releasing said delivery mechanism, coin-releasable means for maintaining said delivery mechanism in set position and means continuously exerting force on said delivery mechanism tending to operate the same.

2. In a vending machine of the character described, delivery mechanism, means for maintaining said delivery mechanism in set position and having provision for releasing and re-setting said delivery mechanism, coin-releasable restraining means for said delivery mechanism and means continuously exerting force on said delivery mechanism tending to operate the same.

3. In a vending machine of the character described, delivery mechanism, means to maintain said delivery mechanism in set position when said machine is at rest and operable to release and re-set said delivery mechanism during operation of the machine, coin-releasable restraining means for said delivery mechanism and means continuously exerting force on said delivery mechanism tending to operate the same.

4. In a vending machine of the character described, delivery mechanism, coin-releasable restraining means for said delivery mechanism, means continuously exerting force on said delivery mechanism tending to operate the same and actuating means normally maintaining said delivery mechanism in set position and having provision for releasing and re-setting the same.

5. In a vending machine of the character described, delivery mechanism, coin-releasable restraining means for said delivery mechanism, means continuously exerting force on said delivery mechanism tending to actuate the same, actuating means normally maintaining said delivery mechanism in set position and having provision both for releasing the same to permit operation thereof upon release of said restraining means and for re-setting said delivery mechanism after operation thereof.

6. In a vending machine of the character described, delivery mechanism, coin-releasable restraining means for said delivery mechanism, means continuously exerting force on said delivery mechanism tending to actuate the same, means to maintain said delivery mechanism in set position when said machine is at rest and operable both to release said delivery mechanism to permit actuation thereof upon release of said restraining means and also to re-set said delivery mechanism after operation thereof.

7. In a vending machine of the character described, delivery mechanism, restraining means for maintaining said delivery mechanism in set position when the machine is at rest and operable both to release said delivery mechanism and re-set the same after operation, means continuously exerting force on said delivery mechanism tending to operate the same and coin-controlled means for releasing said restraining means.

8. In a vending machine of the character described, delivery mechanism, actuating mechanism including a motor and a clutch, restraining means for maintaining said delivery mechanism in set position, means for continuously exerting force on said delivery mechanism tending to operate the same, coin-controlled means for rendering said restraining means inoperative, manually operable means for starting said motor and rendering said clutch operative and means for automatically rendering said clutch inoperative and stopping said motor.

9. In a vending machine of the character described, delivery mechanism, actuating mechanism including a motor and a clutch, restraining means for maintaining said delivery mechanism in set position, means for continuously exerting force on said delivery mechanism tending to operate the same, coin-controlled means for rendering said restraining means inoperative, manually operable means for starting said motor and rendering said clutch operative and means for automatically rendering said clutch inoperative and stopping said motor, and coin-releasable means for normally preventing operation of said manually operable means.

10. In a vending machine of the character described, normally set delivery mechanism, resetting mechanism including a motor and a clutch, restraining means for said delivery mechanism, coin-controlled means for rendering said restraining means inoperative, manually operable means for starting said motor and rendering said clutch operative, and automatically operated means for rendering said clutch inoperative and stopping said motor.

11. In a vending machine of the character described, normally set delivery mechanism, resetting mechanism including a motor and a clutch, restraining means for said delivery mechanism, coin-controlled means for rendering said restraining means inoperative, manually operable means for starting said motor and rendering said clutch operative, automatically operated means for rendering said clutch inoperative and stopping said motor, and coin-releasable means for normally preventing actuation of said manually operable means.

12. In a vending machine of the character described, delivery mechanism, actuating mechanism, coin-controlled restraining means for maintaining the delivery mechanism in set position, means for continuously exerting force on said delivery mechanism tending to operate the same, manually operable means for starting said actuating mechanism and means for automatically stopping said actuating mechanism.

13. In a vending machine of the character described, delivery mechanism, re-setting mechanism for said delivery mechanism, restraining means for maintaining said delivery mechanism in set position, means for continuously exerting force on said delivery mechanism tending to operate the same, coin-controlled means for releasing said restraining means, manually operable means for starting said re-setting mechanism, and automatic means for stopping said re-setting mechanism.

14. In a vending machine of the character described, delivery mechanism, actuating mechanism for re-setting the delivery mechanism, restraining means for maintaining the delivery mechanism in set position, means for continuously exerting force on said delivery mechanism tending to operate the same, coin-controlled means for releasing said restraining means, manually operable means for starting said actuating mechanism, automatic means for stopping said actuating mechanism and coin-releasable means for preventing actuation of said manually operable means.

15. In a vending machine of the character described, delivery mechanism, actuating mechanism for resetting said delivery mechanism, coin-controlled restraining means for maintaining said delivery mechanism in set position, means for continuously exerting force on said delivery mechanism tending to operate the same, manually operable means for starting said actuating mechanism, automatic means for stopping said actuating mechanism, and coin-releasable means for preventing actuation of said manually operable means.

16. In a vending machine of the character described, delivery mechanism, actuating mechanism, restraining means for maintaining said delivery mechanism in set position, means for continuously exerting force on said delivery mechanism tending to operate the same, coin-controlled means for rendering said last-named means inoperative, manually operable means for starting said actuating mechanism, and automatic means for stopping said actuating mechanism.

17. In a vending machine of the character described, delivery mechanism, actuating mechanism including a motor and a clutch, coin-controlled restraining means for maintaining said delivery mechanism in set position, means for continuously exerting force on said delivery mechanism tending to operate the same, manually movable means for starting said motor and rendering said clutch operative and means independent of said manually movable means for automatically rendering said clutch inoperative and stopping said motor.

18. In a vending machine of the character described, delivery mechanism, actuating mechanism including a motor and a clutch, restraining means for normally maintaining said delivery mechanism in set position, means for continuously exerting force on said delivery mechanism tending to operate the same, coin-controlled means for rendering said restraining means inoperative, manually movable means for starting said motor and rendering said clutch operative, coin-releasable means for preventing operation of said manually movable means, means for maintaining said manually movable means in out-of-normal position and means independent of said manually movable means for automatically rendering said clutch inoperative and stopping said motor.

19. In a vending machine of the character described, delivery mechanism, means for maintaining said delivery mechanism in set position, means for continuously exerting force on said delivery mechanism tending to operate same, actuating mechanism including a motor and a clutch, a self opening motor control switch, a manually movable member for closing said switch and rendering said clutch operative, a self closing motor control switch, means operable by the motor to open said last-named switch and means for automatically rendering said clutch inoperative and releasing said first switch.

20. In a vending machine of the character described, delivery mechanism, means for maintaining said delivery mechanism in set position, means for continuously exerting force on said delivery mechanism tending to operate the same, actuating mechanism including a motor and a clutch, a self opening motor control switch, a manually movable member for closing said switch and rendering said clutch operative, a self closing motor control switch, means operable by the motor to open said second switch, means for automatically rendering said clutch inoperative and releasing said first switch, and coin-releasable means for preventing actuation of said manually movable member.

21. In a vending machine of the character described, delivery mechanism, means for maintaining said delivery mechanism in set position, means for continuously exerting force on said delivery mechanism tending to operate the same, actuating mechanism including a motor and a clutch, a self-opening motor-control switch, a push rod for closing said switch and rendering said clutch operative, coin-releasable means for normally preventing operation of said push rod, automatic means independent of said push rod for releasing said switch and rendering said clutch inoperative, a self-closing motor-control switch, means operable by said motor to open said second switch, and means for holding said push rod in out-of-normal position.

22. In a vending machine of the character described, delivery mechanism, means for maintaining said delivery mechanism in set position, means for continuously exerting force on said delivery mechanism tending to operate the same, actuating mechanism including a motor and a clutch, a self-opening motor-control switch, a push rod for closing said switch and rendering said clutch operative, coin-releasable means for preventing actuation of said push rod, means for holding said push rod in out-of-normal position, means automatically operated independently of said push bar for releasing said switch and rendering said clutch inoperative, a self-opening motor control switch, and means operable by said motor for closing said last-named switch.

23. In a vending machine of the character described, delivery mechanism, means for maintaining said delivery mechanism in set position, means for continuously exerting force on said delivery mechanism tending to operate the same, actuating mechanism, means for preventing operation of said delivery mechanism, coin-testing mechanism comprising means operable by a good coin for rendering said preventing means inoperative and means for controlling the operation of said actuating mechanism.

24. In a vending machine of the character described, delivery mechanism, a keeper for restraining said delivery mechanism in set position, means for continuously exerting force on said delivery mechanism tending to operate the same, means for maintaining said keeper in restraining position and coin-testing mechanism comprising coin-operable means for rendering inoperative said keeper maintaining means.

25. In a vending machine of the character described, a plurality of delivery mechanisms, a detent individual to each of said mechanisms, manually operable means for selectively releasing said detents, a keeper common to all of said delivery mechanisms, means for normally maintaining said keeper in position to prevent operation of any of said delivery mechanisms, and a coin-testing mechanism comprising coin-operable means for rendering inoperative said keeper maintaining means.

26. In a vending machine of the character described, a plurality of delivery mechanisms, a detent individual to each delivery mechanism, means common to all of the said delivery mechanism for normally preventing operation thereof, manually operable means for selectively releasing said detents and coin-testing mechanism comprising coin-controlled means to render inoperative said preventing means.

27. In a vending machine of the character described, a delivery mechanism, a detent for said delivery mechanism, restraining means for maintaining said delivery mechanism in set position, means for continuously exerting force on said delivery mechanism tending to operate the same, manually operable means for releasing said detent and means for releasing said restraining means.

28. In a vending machine of the character described, a delivery mechanism, a detent therefor, restraining means for normally maintaining said delivery mechanism in set position, means for continuously exerting force on said delivery mechanism tending to operate the same, manually operable means for releasing said detent, means for locking said manually operable means against operation and coin-controlled means for releasing said locking means and said restraining means.

29. In a vending machine of the character described, a plurality of delivery mechanisms, a detent individual to each delivery mechanism, restraining means common to all of said delivery mechanisms, manually operable means for selectively releasing said detents, and coin-controlled means to release said restraining means.

30. In a vending machine of the character described, a plurality of delivery mechanisms, a detent individual to each delivery mechanism, manually operable means for selectively releasing said detents, means for restraining said delivery mechanisms and locking said manually operable means and coin controlled means for releasing said last-named means.

31. In a vending machine of the character described, a plurality of delivery mechanisms, actuating mechanisms, a detent individual to each delivery mechanism, manually operable means for selectively releasing said detents and starting said actuating mechanism, means common to all of said delivery mechanisms for normally preventing actuation thereof, coin-testing means comprising coin-operable means for rendering inoperative said preventing means, means for automatically stopping said actuating mechanism, locking means for said manually operable means, and coin-operable means for releasing said locking means.

32. In a vending machine of the character described, a plurality of delivery mechanisms, actuating mechanism including a motor and a clutch, a motor-control switch, a detent individual to each delivery mechanism, manually operable means for selectively releasing said detents, closing the motor-control switch and rendering said clutch operative, means common to said delivery mechanisms for normally preventing operation thereof, coin-operable means for rendering inoperative said preventing means, a second motor-control switch, means for automatically opening and closing said second switch and means for automatically opening said first switch and rendering said clutch inoperative.

33. In a vending machine of the character described, a plurality of delivery mechanisms, actuating mechanism including a motor, a motor-control switch, a detent individual to each delivery mechanism, manually operable means for selectively releasing said detents and closing said motor-control switch, means common to said delivery mechanisms for normally preventing operation thereof, coin-operable means for rendering inoperative said preventing means, a second motor control switch, means for automatically opening and closing said second switch and means for automatically opening said first switch.

34. In a vending machine of the character described, a plurality of delivery mechanisms, a detent individual to each of said mechanisms, manually operable means for selectively releasing said detents, a keeper common to all of said delivery mechanisms, means for normally maintaining said keeper in position to prevent operation of any of said delivery mechanisms, and means for normally preventing actuation of said manually operable means, a coin-testing mechanism comprising coin-operable means for rendering inoperative said keeper maintaining means and coin-operable means for releasing the means for preventing operation of said manually operated means.

35. In a vending machine of the character described, a plurality of delivery mechanisms, actuating mechanism including a motor, a motor-control switch, a detent individual to each delivery mechanism, manually-operable means for selectively releasing said detents and closing said switch, means common to said delivery mechanisms for normally preventing operation thereof, coin-operable means for rendering said preventing means inoperative, a second motor-control switch, means for automatically opening and closing said second switch, means for automatically opening said first switch, means for locking said manually-operable means and coin-operable means for releasing said locking means.

36. In a vending machine of the character described, a plurality of delivery mechanisms, actuating mechanisms including a motor and a clutch, a motor-control switch, a detent individual to each delivery mechanism, manually operable means for selectively releasing said detents, closing the motor-control switch and rendering said clutch operative, means common to said delivery mechanisms for normally preventing operation thereof, coin-operable means for rendering inoperative such preventing means, a second motor-control switch, means operated by the motor for automatically opening and closing said second switch and means operable by said delivery mechanism for automatically opening said first switch and rendering said clutch inoperative, means for locking said manually operable means and coin operable means for releasing said locking means.

37. In a vending machine of the character described, a magazine for articles to be vended, means for ejecting restraining means for maintaining said ejecting means in set position, means for continuously exerting force on said ejecting means tending to operate the same, articles from said magazine, coin-operable means for rendering said restraining means inoperative means for resetting the ejecting means and means for preventing operation of said coin-operable means when the magazine is empty.

38. In a vending machine of the character described, a magazine for articles to be vended, mechanism for ejecting an article from said magazine, means for continuously existing force on said ejecting mechanism tending to operate the same, means for feeding articles into position to be ejected, means normally preventing actuation of said ejecting mechanism, coin-operable means for rendering inoperative said preventing means, means for resetting the ejecting means and means actuated by the article feeding means for rendering inoperative said coin-operable means when the magazine is empty.

39. In a vending machine, delivery mechanism, means for continuously applying force to said delivery mechanism tending to actuate the same, means for normally preventing operation of the delivery mechanism, a member movable to move said preventing means into inoperative position, a second movable member, means to position a coin between said movable members whereby movement of the second is communicated to the first to render said preventing means inoperative.

40. In a vending machine, delivery mechanism, means continuously exerting force on said delivery mechanism tending to operate the same, restraining means for maintaining said delivery mechanism in set position, operating means for releasing said restraining means and resetting said delivery mechanism after actuation, said means comprising a motor, a shaft, a cam on said shaft cooperating with said restraining means to hold the delivery mechanism in set position when the cam is at rest, release the restraining mechanism when the cam is partially rotated and reset the delivery mechanism when the cam is further rotated, a clutch between said motor and said shaft, a motor-control switch, a member operative in one position to effect closing of said switch and to render said clutch operative and operative in another position to effect opening of said switch and to render said clutch inoperative, a second motor-control switch and means controlled by rotation of the shaft for closing said second switch after a slight rotation of said shaft and opening said second switch after a predetermined amount of rotation of the shaft.

41. In a vending machine delivery mechanism, means continuously exerting force on said delivery mechanism tending to operate the same, restraining means for maintaining said delivery mechanism in set position, operating means for releasing said restraining means and resetting said delivery mechanism after actuation, said means comprising a motor, a shaft, a cam on said shaft cooperating with said restraining means to hold the delivery mechanism in set position when the cam is at rest, release the restraining mechanism when the cam is partially rotated and reset the delivery mechanism when the cam is further rotated, a clutch between said motor and said shaft, a motor-control switch, a member operative in one position to effect closing of said switch and to render said clutch operative and operative in another position to effect opening of said switch and to render said clutch inoperative, a second motor-control switch, means controlled by rotation of the shaft for closing said second switch after a slight rotation of said shaft and opening said second switch after a predetermined amount of rotation of the shaft, means comprising a push bar for moving said member, means effective upon operation of said delivery mechanism for releasing said push bar from said member, means for normally preventing operation of said delivery mechanism, coin-testing mechanism including coin-operable means for rendering inoperative said preventing means, means for locking the push rod in normal position and coin-operable means for releasing said locking means.

42. In a vending machine, a plurality of delivery mechanisms, means continuously exerting force on said delivery mechanism tending to operate the same, restraining means for maintaining said delivery mechanism in set position, operating means for releasing said restraining means and resetting the delivery mechanism after actuation, said means comprising a motor, a shaft, a cam on said shaft cooperating with said restraining means to hold the delivery mechanism in set position when the cam is at rest, release the restraining means when the cam is partially rotated and reset the delivery mechanism when the cam is further rotated, a clutch between said motor and said shaft, a motor-control switch, a member operative in one position to effect closing of the switch and to render said clutch operative and operative in another position to effect opening of said switch and to render said clutch inoperative, a second motor-control switch, means controlled by rotation of said shaft for opening said second switch during a small portion of the shaft's rotation and closing said second switch during the remaining portion of its rotation, coin-testing mechanism, means controlled by said coin-testing mechanism for controlling operation of said delivery mechanisms, a detent individual to each delivery mechanism, and push rods for selectively releasing said detent and operating said member.

43. In a vending machine, a plurality of delivery mechanisms, means continuously exerting force on said delivery mechanism tending to operate the same, restraining means for maintaining said delivery mechanisms in set position, operating means for releasing said restraining means and resetting the delivery mechanism after actuation, said means comprising a motor, a shaft, a cam on said shaft cooperating with said restraining means to hold the delivery mechanism in set position when the cam is at rest, release the restraining means when the cam is partially rotated and reset the delivery mechanism when the cam is further rotated, a clutch, a motor-control switch, a member operative in one position to effect closing of the switch and to render said clutch operative and operative in another position to effect opening of said switch and to render said clutch inoperative, a second motor-control switch, means controlled by rotation of said shaft for opening said second switch during a small portion of the shaft's rotation and closing said second switch during the remaining portion of said rotation, coin-testing mechanism, means controlled by said coin-testing mechanism for controlling operation of said delivery mechanisms, a detent individual to each delivery mechanism, push rods for selectively releasing said detent and operating said member, and means effective upon operation of any delivery mechanism to permit movement of said member relative to said push rod.

44. In a vending machine, delivery mechanism, means continuously exerting force on said delivery means tending to operate the same, restraining means for maintaining said delivery means in set position, actuating means for releasing said restraining means and resetting said delivery mechanism after actuation, said means comprising a motor, a cam cooperating with the restraining means to hold the delivery mechanism in set position when the cam is at rest, release the restraining means when the cam is partially rotated and reset the delivery mechanism when the cam is further rotated, a clutch between said cam and motor, a motor control circuit, means for closing and breaking said circuit and for simultaneously rendering said clutch operative and inoperative, a push rod for controlling the operation of said last named means, and means effective upon operation of the delivery mechanism to remove said circuit and clutch controlling means from the control of said push rod.

45. In a vending machine, delivery mechanism, means continuously exerting force on said delivery means tending to operate the same, restraining means for maintaining said delivery mechanism in set position, operating means comprising a motor, a shaft, a cam on said shaft cooperating with the restraining means to hold the delivery mechanism in set position when the cam is at rest, release the restraining means when the cam is partially rotated and reset the delivery mechanism when the cam is further rotated, a clutch between said motor and said shaft, a motor control circuit, means for closing and opening said circuit and for simultaneously rendering said clutch operative and inoperative, a push rod for controlling the operation of said last named means, means effective upon operation of the delivery mechanism to remove said circuit and clutch controlling means from the control of said push rod, a second motor control circuit and means for opening the circuit during a small portion of the shaft's rotation and closing said circuit during the remaining portion of the shaft's rotation.

46. In a vending machine, a delivery mechanism, means continuously exerting force on said delivery means tending to operate the same, restraining means for maintaining said delivery mechanism in set position, operating means comprising a motor, a cam cooperating with the restraining means to hold the delivery mechanism in set position when the cam is at rest, release the restraining means when the cam is partially rotated and reset the delivery mechanism when the cam is further rotated, a clutch between said shaft and said motor, a motor control circuit, means for closing and opening said circuit and for simultaneously rendering said clutch operative and inoperative, a push rod for operating said means, means effective upon operation of said delivery mechanism for removing said circuit and clutch controlling means from the control of said push rod and a detent for said delivery mechanism, said detent being operable by said push rod.

47. In a vending machine a delivery mechanism, means continuously exerting force on said delivery means tending to operate the same, restraining means for maintaining said delivery means in set position, operating means for releasing said restraining means and resetting said delivery mechanism after actuation, said means comprising a motor, a shaft, a cam cooperating with the restraining means to hold the delivery mechanism in set position when the cam is at rest, release the restraining means when the cam is partially rotated and reset the delivery mechanism when the cam is further rotated, a clutch between said motor and said shaft, a motor control circuit, means for closing and opening said circuit and for simultaneously rendering said clutch operative and inoperative, a push rod for operating said means, means effective upon operation of said delivery mechanism for removing the circuit and clutch controlling means from the control of said push rod, a detent for said delivery mechanism, said detent being operable by said push rod, a second motor control circuit and means for opening said circuit during a small portion of the shaft's rotation and closing said circuit during the remainder of the shaft's rotation.

48. In a vending machine, a magazine, means for ejecting articles therefrom, restraining means for maintaining said ejecting means in set position, means for continuously exerting force on said ejecting means tending to operate the same, means rendered operative by a coin for rendering said restraining means inoperative, means for resetting said ejecting means, and means for preventing a coin from rendering said last named means operative when said magazine is empty.

49. In a vending machine, a magazine, means for ejecting articles therefrom, restraining means for maintaining said ejecting means in set position, means for continuously exerting force on said ejecting means tending to operate the same, means operated by a coin for rendering said restraining means inoperative, means for resetting said ejecting means and means for causing a coin to be returned without operating said last named means when said magazine is empty.

50. In a vending machine, a magazine, means for ejecting articles therefrom, actuating means, means including a push rod for controlling said actuating means, restraining means for maintaining said ejecting means in set position, means for continuously exerting force on said ejecting means tending to operate the same, coin-operated means for rendering said restraining means inoperative, means for resetting said ejecting means, means for presenting a coin in position to operate said coin-operated means and means operable by said push rod to cause said coin to be returned without operating said restraining means when the magazine is empty.

51. In a vending machine, a magazine, means for delivering articles therefrom, restraining means for maintaining said delivery means in set position, means for continuously exerting force on said ejecting means tending to operate the same, coin operated means for rendering inoperative said restraining means, means for resetting said delivery means, and means for rendering said coin-operated means inoperative when said magazine is empty.

52. In a vending machine, a testing mechanism comprising a spring-pressed anvil having a recess in its head, a plunger in alinement with said anvil, means to position and hold a token of proper diameter between said anvil and plunger, means to reciprocate said plunger and means to release said holding means at the instant that the distance between the anvil and the plunger equals the thickness of a good coin.

53. In a vending machine, a testing mechanism comprising a spring-pressed anvil having a recess in its head, a plunger in alinement with said anvil, means to position and hold a token of standard coin diameter between said plunger and anvil, means to reciprocate said plunger, means to release said holding means at the instant that the distance between the anvil and the plunger equals the thickness of a good coin, article-delivering means, means to prevent operation of said delivery means, and means operable by said anvil for rendering said preventing means inoperative.

54. In a vending machine, a testing mechanism comprising a spring-pressed anvil having a recess in its head, a plunger in alinement with said anvil, means to position and hold a token of standard coin diameter between said plunger and anvil, means to reciprocate said plunger, means to release said holding means at the instant that the distance between the anvil and the plunger equals the width of a good coin, article-delivering means, means to prevent operation of said delivery means, means operated by said anvil for rendering said preventing means inoperative, means for returning tokens of insufficient thickness or diameter and means for collecting other tokens.

55. In a vending machine, a testing mechanism comprising a spring-pressed anvil having a recess in its head, a plunger in alinement with said anvil, means to position and hold a token of standard coin diameter between said plunger and anvil, means to reciprocate said plunger, means to release said holding means when said plunger is at a predetermined distance from said anvil, article-delivery means and means operated by said anvil to control the operation of said delivery means.

56. In a vending machine, a testing mechanism comprising a spring-pressed anvil having a recess in its head, a chute extending across the head of said anvil, magnetic means in said chute, a stop to support a token in alinement with the head of said anvil, a plunger in alinement with said anvil, means to reciprocate said plunger, means to release said stop when the distance between the anvil and plunger equals the thickness of a good coin, and means to render said magnetic means ineffective after said plunger has been operated.

57. In a vending machine, a coin-testing mechanism comprising a spring-pressed anvil having a recess in its head, a chute extending across the head of said anvil, magnetic means in said chute, a stop to support a token in alinement with the head of said anvil, a plunger in alinement with said anvil, means to reciprocate said plunger, means to release said stop when the distance between the anvil and plunger equals the thickness of a good coin, means to render said magnetic means ineffective after said plunger has been operated, means for returning tokens of insufficient thickness or diameter, and means for collecting all other tokens.

58. In a vending machine, a coin-testing mechanism comprising a spring-pressed anvil having a recess in its head, a chute extending across the head of said anvil, magnetic means in said chute, a stop to support a token in alinement with the head of said anvil, a plunger in alinement with said anvil, means to reciprocate said plunger, means to release said stop when the distance between the anvil and plunger equals the thickness of a good coin, means to render said magnetic means ineffective after said plunger has been operated, delivery means and means operated by said anvil to control the operation of said delivery means.

59. In a vending machine, a coin-testing mechanism comprising a spring-pressed anvil, a plunger in alinement with said anvil, means to engage the rim of a coin to position it between said plunger and anvil, means to reciprocate said plunger and means to release said coin engaging means when said plunger has approached to a predetermined distance from the anvil.

60. In a vending machine, a coin-testing mechanism comprising a spring-pressed anvil, a plunger in alinement with said anvil, means to engage the rim of a coin and position it between said anvil and plunger, means to reciprocate said plunger, a coin magazine, and means controlled by said anvil for ejecting coins from said magazine.

61. In a vending machine, a coin-testing mechanism comprising a spring-pressed anvil having a recess, a plunger in alinement with said recess, means to engage the rim of a coin and position it between said plunger and anvil, means to reciprocate said plunger, means to release said coin-engaging means when the distance between the anvil and plunger equals the thickness of a good coin, a coin magazine and means controlled by said anvil for ejecting coins from said magazine.

62. In a vending machine, a coin-testing mechanism comprising a spring-pressed anvil having a recess in its head, a chute extending across the head of said anvil, magnetic means in said chute, a plunger in alinement with said recess, means to engage the rim of a coin and position it between said plunger and anvil, means to reciprocate said plunger, means to release said coin-engaging means when the distance between the anvil and plunger equals the thickness of a good coin, means to render said magnetic means ineffective after said plunger has been operated, a coin-magazine and means controlled by said anvil for ejecting coins from said magazine.

63. In a vending machine, a push rod, coin-operated means, a slide for locking said push rod in either of two positions and resilient means connecting said slide and coin-operated means.

64. In a vending machine, a push rod, coin-operated means, a slide for locking said rod in either of two positions, a lever actuated by said coin-operated means and a pair of oppositely arranged resilient members connecting said lever and slide.

65. In a vending machine, a push rod, said rod being provided with oppositely arranged shoulders, a slide having an aperture through which said push rod extends, coin-operated means, a lever actuated by said coin-operated means and a pair of oppositely arranged resilient members connecting said lever and said slide.

66. In a vending machine, a push rod, said rod being provided with oppositely arranged shoulders, a slide having an aperture through which said push rod extends, coin-operated means, yielding means connecting said slide and coin-operated means for actuating the former by the latter.

67. In a vending machine, a push rod, operating means including a motor, a motor control switch operable by said push rod, coin-operated means, means actuated by said coin-operating means for locking said push rod in either of two positions and means actuated by said operating means for re-setting said coin-operated means.

68. In a vending machine, a push rod, operating means including a motor, a motor control switch operated by said push rod, coin-operated means, a slide for locking said push rod in either of two positions, a lever actuated by said coin-operated means, a pair of oppositely arranged resilient members connecting said lever and slide, and means actuated by said operating means for re-setting said coin-operated means.

69. In a vending machine, a push rod having oppositely arranged shoulders, operating means including a motor, a motor control switch operated by said push rod, coin-operated means, a slide having an aperture through which said push rod extends, a lever operated by said coin-operated means, a pair of oppositely arranged resilient members connecting said lever and slide, and means actuated by said operating means for re-setting said coin-operated means.

70. In a vending machine, article-delivery means, means for preventing operation of said delivery means, coin-testing mechanism including coin-operable means, means operated by said coin operable means for rendering inoperative said preventing means, a coin magazine, means for ejecting a predetermined number of coins from said magazine upon release of said preventing means, and means for preventing the insertion of a coin into said coin-operated means when the number of coins in said magazine decreases to a predetermined minimum.

71. In a vending machine, a push rod, actuating means including a motor and a clutch, a motor control switch, means controlled by said push rod for closing and opening said switch and for simultaneously rendering said clutch operative and inoperative, coin-operated means, means actuated by said coin-operated means for locking said push rod in either of two positions, means operated by said actuating means for releasing the switch and clutch actuating means from the control of said push rod, and means for re-setting said coin-operated means.

72. In a vending machine, a delivery mechanism, actuating mechanism comprising a motor and a clutch, a motor control circuit, means for closing and opening said circuit and for simultaneously rendering said clutch operative and inoperative, a push rod for controlling the operation of said last-named means, means effective upon operation of the delivery mechanism to remove said means from the control of said push rod, a second motor circuit, means operable by the motor for closing and opening said second circuit, coin-operated means, a slide through which said push rod extends, oppositely-disposed shoulders on said push rod to be alternately engaged by said slide, resilient means connecting said slide and said coin-operated means, and means operated by said actuating mechanism for re-setting said coin-operated means.

73. In a vending machine, a plurality of devices for testing coins of different denominations, a coin magazine, means for singly ejecting coins from said magazine and means controlled by said coin-testing devices for selectively operating said ejecting means.

74. In a vending machine, a plurality of devices for testing coins of different denominations, a magazine for coins of a single denomination, means for singly ejecting coins from said magazine, a plurality of operating means for said ejecting means, each operating means being effective to operate said ejecting means a different number of times, and means controlled by said coin testing devices for selectively effecting actuation of said operating means.

75. In a vending machine, a plurality of mechanisms for testing coins of different denominations, a magazine for coins of a single denomination, means for singly ejecting coins from said magazine, a plurality of operating means for said ejecting means, each operating means being effective to operate the ejecting means a predetermined number of times, and means controlled by each coin-testing mechanism for effecting operation of one of said operating means.

76. In a vending machine, a plurality of devices for testing coins of different denominations, a magazine for coins of a single denomination, means for singly ejecting coins from said magazine and means controlled by each coin-testing device to effect operation of said ejecting means a predetermined number of times.

77. In a vending machine, delivery means, means for preventing operation of said delivery means, a plurality of coin-testing devices, members connected to said coin-testing devices and operable thereby to render inoperative said preventing means, a magazine for coins of a single denomination, means for singly ejecting coins from said magazine and means controlled by said members for selectively effecting operation of said ejecting means a predetermined number of times.

78. In a vending machine, delivery means, a plurality of devices for testing coins of different denominations, a magazine for coins of a single denomination, means for preventing operation of said delivery means, members connected to said coin-testing device and operable thereby to render inoperative said preventing means, means for singly ejecting coins from said magazine, and means controlled by said coin-testing devices for selectively operating said ejecting means.

79. In a vending machine, article-delivery means, a plurality of devices for testing coins of different denominations, means controlled by said coin-testing devices to prevent operation of said delivery means, a magazine of coins of a single denomination, means for singly ejecting coins from said magazine and means operable upon the release of said preventing means for operating said ejecting means a predetermined number of times.

80. In a vending machine, article-delivery means, a plurality of devices for testing coins of different denominations, means controlled by said coin-testing devices to prevent operation of said delivery means, means operable by said coin-testing means for rendering inoperative said preventing means, a magazine for coins of a single denomination, means for singly ejecting coins from said magazine and means operable by said coin-testing devices coincident with the release of said preventing means for selectively operating said ejecting means a predetermined number of times.

81. In a vending machine, a device for testing coins of different denominations, a coin magazine, means for singly ejecting coins from said magazine, means controlled by said coin-testing means for selectively operating said ejecting mechanism, and means for preventing the insertion of a coin into said coin-testing mechanism when the number of coins in said magazine is less than a predetermined number.

82. In a vending machine, a device for testing coins of different denominations, a magazine for coins of a single denomination, means for singly ejecting coins from said magazine, a plurality of operating means for said ejecting means, each operating means being effective to operate said ejecting means a different number of times, means controlled by said coin-testing mechanisms for selectively effecting operation of said operating means, and means for preventing the insertion of a coin into certain of said coin-testing devices when the number of coins in said magazine is less than a predetermined number.

83. In a vending machine, delivery means, means for preventing operation of said delivery means, coin-testing devices, members connected to said coin-testing devices and operable thereby to render inoperative said preventing means, a magazine for coins of a single denomination, means for singly ejecting coins from said magazine, means controlled by said members for selectively operating said ejecting means a predetermined number of times, and means for preventing the insertion of a coin into certain of said coin-testing mechanisms when the number of coins in said magazine is less than a predetermined number.

84. In a vending machine, article-delivery means, devices for testing coins of different denominations, means controlled by said coin-testing devices to prevent operation of said delivery means, a magazine of coins of a single denomination, means for singly ejecting coins from said magazine, means operable upon the release of said preventing means for operating said ejecting means a predetermined number of times, and means for preventing the insertion of a coin into certain of said coin-testing mechanisms when the number of coins in said magazine is less than a predetermined number.

85. In a vending machine, article-delivery means, devices for testing coins of different denominations, means to prevent operation of said delivery means, means operable by said coin-testing devices for rendering inoperative said preventing means, a magazine for coins of a single denomination, means for singly ejecting coins from said magazine, means operable by said coin-testing devices coincident with the release of said preventing means for selectively operating said ejecting means a predetermined number of times, and means for preventing the insertion of a coin into certain of said coin-testing devices when the number of coins in said magazine is less than a predetermined number.

86. In a vending machine, a spring-pressed anvil, a plunger in alinement therewith, means to position a coin between said plunger and anvil, means to reciprocate said plunger to cause reciprocation of said anvil through the medium of the interposed coin, means for temporarily retarding the return movement of said anvil, merchandise delivery mechanisms, means for continuously applying force to said delivery mechanism tending to operate it and means controlled by said anvil for preventing actuation of said delivery mechanism.

87. In a vending machine, a spring-pressed anvil, a plunger in alinement therewith, means to position a coin between said plunger and anvil, means to reciprocate said plunger to cause reciprocation of said anvil through the medium of the interposed coin, means for temporarily retarding the return movement of said anvil, a chute to receive the coin when thus released, merchandise delivery mechanism, means for continuously applying force to said delivery mechanism tending to operate it and means controlled by said anvil for preventing actuation of said delivery mechanism.

88. In a vending machine, a spring-pressed reciprocable anvil, a reciprocating plunger, means to interpose a coin between said plunger and anvil, means to reciprocate said plunger and thereby cause reciprocation of said anvil through the medium of the interposed coin, means to release the coin-holding means when the distance between the plunger and the anvil equals the thickness of a good coin, means for temporarily preventing return movement of said anvil, and coin chutes in alinement with the positions assumed by a coin at the ends of the anvil stroke.

89. In a vending machine of the character described, a holder for articles to be vended, mechanism for delivering said articles, coin-controlled restraining means for maintaining said delivery mechanism, in set position, means for continuously exerting force on said delivery mechanism tending to operate the same and means for preventing release of said restraining means upon depletion of the supply of articles.

90. In a vending machine of the character described, a supply of articles to be vended, mechanism for delivering said articles, means for continuously exerting force on said delivery mechanism tending to operate the same, means operable to maintain said delivery mechanism in set position when the machine is at rest and to release said mechanism during operation of the machine and re-set the same after each operation thereof, coin-releasable restraining means for said delivery mechanism, and means for preventing the release of the restraining means when the supply of articles is depleted.

91. In a vending machine of the character described, delivery mechanism, means for continuously exerting force on said delivery mechanism tending to operate the same, means to maintain said delivery mechanism in set position when said machine is at rest and operable to release said mechanism during operation of the machine and also to re-set said mechanism, coin-controlled restraining means for said delivery mechanism, and means for preventing release of said restraining means by spurious coins.

92. In a vending machine of the character described, delivery mechanism, means to maintain said merchandise delivery mechanism in set position when the machine is at rest and operable to release said mechanism during operation of the machine and also to reset the same after each operation, coin-controlled restraining means for said delivery mechanism, a holder for coins and means for ejecting one or more coins upon release of said restraining means.

93. In a vending machine of the character described, a holder for articles to be vended, mechanism for delivering said articles, coin-controlled restraining means for maintaining said delivery mechanism in set position, means for continuously exerting force on said delivery mechanism tending to operate the same, a holder for a supply of coins, and means for ejecting a predetermined number of said coins upon release of said restraining means.

94. In a machine of the character described, a holder for articles to be vended, mechanism for deliverying said articles, means to maintain said delivery mechanism in set position when the machine is at rest and operable both to release said delivery mechanism during the operation of the machine and also to re-set the same, coin-controlled restraining means for said delivery mechanism, a holder for coins, and means for delivering a predetermined number of said coins upon release of said restraining means.

95. In a machine of the character described, a holder for articles to be vended, mechanism for delivering said articles, means to maintain said delivery mechanism in set position when the machine is at rest and operable both to release said delivery mechanism during the operation of the machine and also to re-set the same, coin-controlled restraining means for said delivery mechanism, a holder for coins, means for delivering a predetermined number of said coins upon release of said restraining means, and means for preventing release of said restraining means by spurious coins.

96. In a vending machine of the character described, a holder for a supply of articles to be vended, mechanism for delivering said articles, coin-controlled restraining means for maintaining said delivery mechanism in set position, means for continuously exerting force on said delivery mechanism tending to operate the same, means for preventing the release of said restraining means upon depletion of the supply of articles, and means for preventing the release of said restraining means by spurious coins.

97. In a vending machine of the character described, a holder for a supply of articles to be vended, delivery mechanism, means for continuously exerting force on said delivery mechanism tending to operate the same, means to maintain said delivery mechanism in set position when said machine is at rest and operable also to release said mechanism during operation of the machine and also to re-set said mechanism, coin-controlled restraining means for said delivery mechanism, means for preventing the release of said restraining means by spurious coins, and means for preventing the release of said restraining means when the supply of articles is depleted.

98. In a vending machine, a plurality of devices for testing coins of different denominations, article-delivery mechanism controlled by said coin-testing devices, a magazine for coins of a single denomination, means for singly ejecting coins from said magazine and means controlled by said coin-testing devices for selectively operating said ejecting means.

99. In a vending machine, delivery mechanism, restraining means therefor, means to apply bending pressure to a coin, means operable through the medium of a coin, if it resists bending to release said restraining means, and means for preventing the further application of pressure in the event that the coin bends.

100. In a vending machine of the character described, delivery mechanism, restraining means therefor, a movable member having spaced projections, means to locate a coin in contact with said projections, a plunger movable into contact with said coin between said projections, means operable by said movable member to release said restraining means, and means to prevent further operation of said plunger in the event of yielding by said coin.

101. In a vending machine, coin-testing mechanism comprising, means to apply bending pressure to a coin, and means operable upon bending of a coin to prevent further application of pressure.

In testimony whereof, I have signed my name to this specification.

ANDREW M. ROBINSON.

CERTIFICATE OF CORRECTION.

Patent No. 1,911,207. May 30, 1933.

ANDREW M. ROBINSON.

It is hereby certified that error appears in the printed specification of the above numbered patent requiring correction as follows: Page 21, line 117, claim 37, strike out the words and comma "articles from said magazine," and insert the same after "ejecting" in line 115; page 22, lines 85, 86 and 87, claim 42, and line 118, claim 43, for "mechanism" read "mechanisms"; and that the said Letters Patent should be read with these corrections therein that the same may conform to the record of the case in the Patent Office.

Signed and sealed this 15th day of August, A. D. 1933.

(Seal)

M. J. Moore.
Acting Commissioner of Patents.